United States Patent
Nakano et al.

(10) Patent No.: US 7,039,012 B2
(45) Date of Patent: May 2, 2006

(54) PROCESS EXECUTION METHOD AND APPARATUS

(75) Inventors: Takahiro Nakano, Yokohama (JP); Masaaki Iwasaki, Tachikawa (JP); Masahiko Nakahara, Yokohama (JP); Tadashi Takeuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 895 days.

(21) Appl. No.: 10/114,481

(22) Filed: Apr. 3, 2002

(65) Prior Publication Data

US 2003/0021228 A1    Jan. 30, 2003

Related U.S. Application Data

(63) Continuation of application No. 09/048,120, filed on Mar. 26, 1998, now Pat. No. 6,400,819, which is a continuation-in-part of application No. 08/824,338, filed on Mar. 26, 1997, now Pat. No. 5,944,778.

(30) Foreign Application Priority Data

Mar. 28, 1996  (JP) .................................. 8-073673
Mar. 27, 1997  (JP) .................................. 9-075018

(51) Int. Cl.
 *G06F 9/00*    (2006.01)
(52) U.S. Cl. ..................... 370/230; 709/100; 709/102
(58) Field of Classification Search ........ 370/229–235, 370/445, 447, 461–462; 709/100–106; 710/224–229, 263
See application file for complete search history.

(56) References Cited

U.S. PATENT DOCUMENTS 5,247,671 A    9/1993  Adkins et al.
5,255,371 A   10/1993  Latimer et al. ............... 710/24
5,528,513 A    6/1996  Vaitzblit et al. ............. 709/102
5,566,169 A   10/1996  Rangan et al. ............... 370/412

(Continued)

FOREIGN PATENT DOCUMENTS

JP    3155241    7/1991

(Continued)

OTHER PUBLICATIONS

Davoli et al, Real Time Systems: A Tutorial, University of Bologna, pp. 1-28, 1993.*

(Continued)

*Primary Examiner*—Frank Duong
(74) *Attorney, Agent, or Firm*—Mattingly, Stranger, Malur & Brundidge, P.C.

(57) ABSTRACT

Periodic process scheduling method of computer system includes steps of receiving requests for periodical execution of processes each with period of execution and execution time, securing allocation time for process having shorter period than the other processes to be executed in each of respective periods of execution for process, securing another allocation time for part of another process within first of respective periods of execution of process other than allocation time in first of the allocation time for process if full execution time of another process cannot be secured within first of respective periods of execution of process, and starting execution of process in secured allocation time and another process in secured another allocation time. A data transfer management method for effectively reducing collision in data transfer includes steps of storing data length (M) of packets capable of being transferred in predetermined transmission time interval, storing predetermined transmission time interval (t), accumulating quantity of packets to be transferred on communication stream in predetermined transmission time interval, and limiting quantity of packets to be transferred to value not greater than data length.

8 Claims, 49 Drawing Sheets

U.S. PATENT DOCUMENTS

| | | | |
|---|---|---|---|
| 5,699,361 A * | 12/1997 | Ding et al. | 370/431 |
| 5,892,968 A * | 4/1999 | Iwasaki et al. | 710/1 |
| 5,944,778 A * | 8/1999 | Takeuchi et al. | 709/100 |
| 6,337,850 B1 * | 1/2002 | Nakano et al. | 370/230 |

FOREIGN PATENT DOCUMENTS

| | | |
|---|---|---|
| JP | 8226404 | 9/1996 |

OTHER PUBLICATIONS

Ghosh et al, A Survey of Real-Time Operating Systems-Draft, Georgia Institute of Technology, pp. 1-61, 1994.*

N. Nishio et al., "Conductor-Performer: A Middle Ware Architecture for Continuous-Media Applications", 1$^{st}$ International Workshop on Real Time Operating Applications, 1994.

M. Isawaki et al., "A Micro-kernel for Isochronous Video-Data Transfer", Systems Development Lab. Hitachi, Ltd., Mar. 15, 1997.

Philippe Robin et al., Implementing a QoS Controlled ATM Based Communication System in Chorus, Dept. of Computing, Lancaster University Mar. 19, 1994, pp. 1-21.

Digital Equipment Corporation, Guide to DEC Threads, Jul. 1994.

J. Stankovic et al, "The Spring Kernel: A New Paradigm for Real-Time Operating Systems", 8283 Operating Systems Review (SIGOPS), July. 23, 1989, vol. 23, No. 3, pp. 54-71.

K. Ramaritham et al, "Scheduling Algorithms and Operating Systems Support for Real-Time Systems", 8078 Proceedings of the IEEE, vol. 82, No. Jan. 1994, No. 1, pp. 55-67.

C. Venkatramani, et al, "Design, Implementation, and Evaluation of a Software-based Real-time Ethernet Protocol", Department of Computer Science State University of New York at Stony Brook, SIGCOMM 1995, pp. 27-37.

C. Venkatramani, et al "The Design, Implementation and Evaluation of RETHER: A Real-time Ethernet Protocol", A Dissertation, Nov. 1996, pp. 1-125.

Govindan et al, "Scheduling and IPC Mechanisms for Continuous Media", ACM Symposium on Operating System Principles, pp. 1-13, 1991.

Yau, et al, "Operating System Techniques for Distributed Multimedia" University of Texas, pp. 1-22, Jul. 17, 1995.

* cited by examiner

FIG.8

|  | "Interval" VALUE | "Length" VALUE |
|---|---|---|
| PROCESS GROUP A | 8 | 2 |
| PROCESS GROUP B | 16 | 3 |
| PROCESS GROUP C | 32 | 7 |

FIG.9

| PROCESS GROUP | TIME | END FLAG | |
|---|---|---|---|
| A | 2 | TRUE | ~901 |
| B | 3 | TRUE | ~902 |
| C | 1 | FALSE | ~903 |
| OTHERS |  |  | ~904 |
| A | 2 | TRUE | ~905 |
| C | 6 | TRUE | ~906 |
| OTHERS |  |  | ~907 |
| A | 2 | TRUE | ~908 |
| B | 3 | TRUE | ~910 |
| OTHERS |  |  | ~911 |
| A | 2 | TRUE | ~912 |
| OTHERS |  |  | ~913 |

FIG.16

```
1601  create_proc_group(MYSELF, slave_pid_array, proc_array_number, &pgroupid);
1602  alloc_time_slot(pgroupid, interval, length);
1603  for(l=0;l<NTINES;l++)|
1604         /* CONTINUOUS MEDIA PROCESSING CORRESPONDING TO ONE PERIOD */
1605         proc_raise_handoff(nextpid, PRIORITY_DEPRESSED);
1606  |
1607  dealloc_time_slot(pgroupid);
1608  destroy_proc_group(pgroupid);
1609  exit(0);
```

FIG.17

```
1701  for(l=0;l<NTINES;l++)|
1702         /* CONTINUOUS MEDIA PROCESSING CORRESPONDING TO ONE PERIOD */
1703         proc_raise_handoff(nextpid, PRIORITY_DEPRESSED);
1704         (proc_raise_cancel(myself, PRIORITY_DEPRESSED);)
1705  |
1706  exit(0);
```

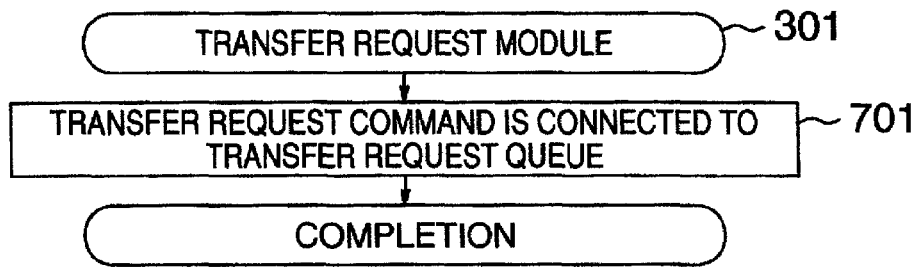
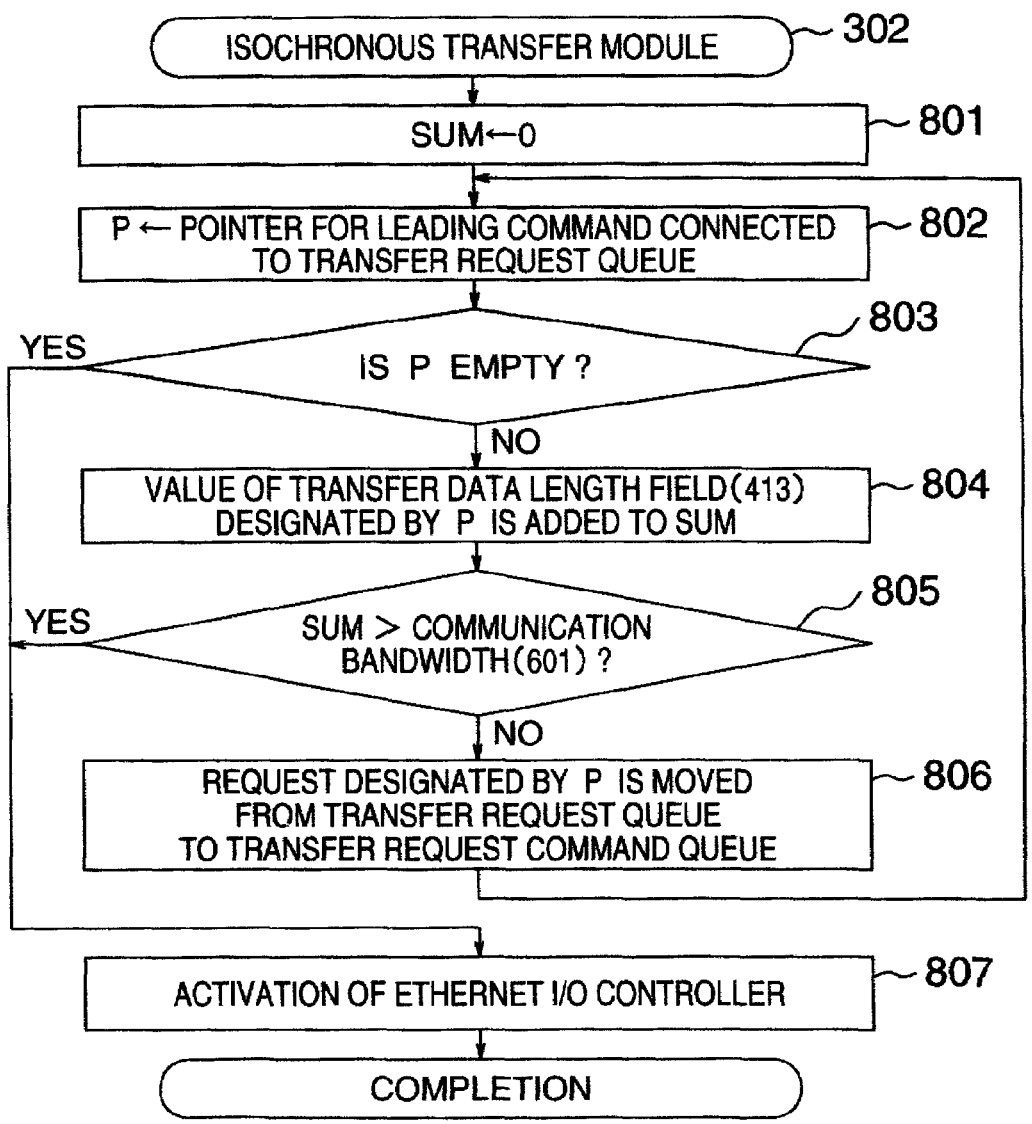

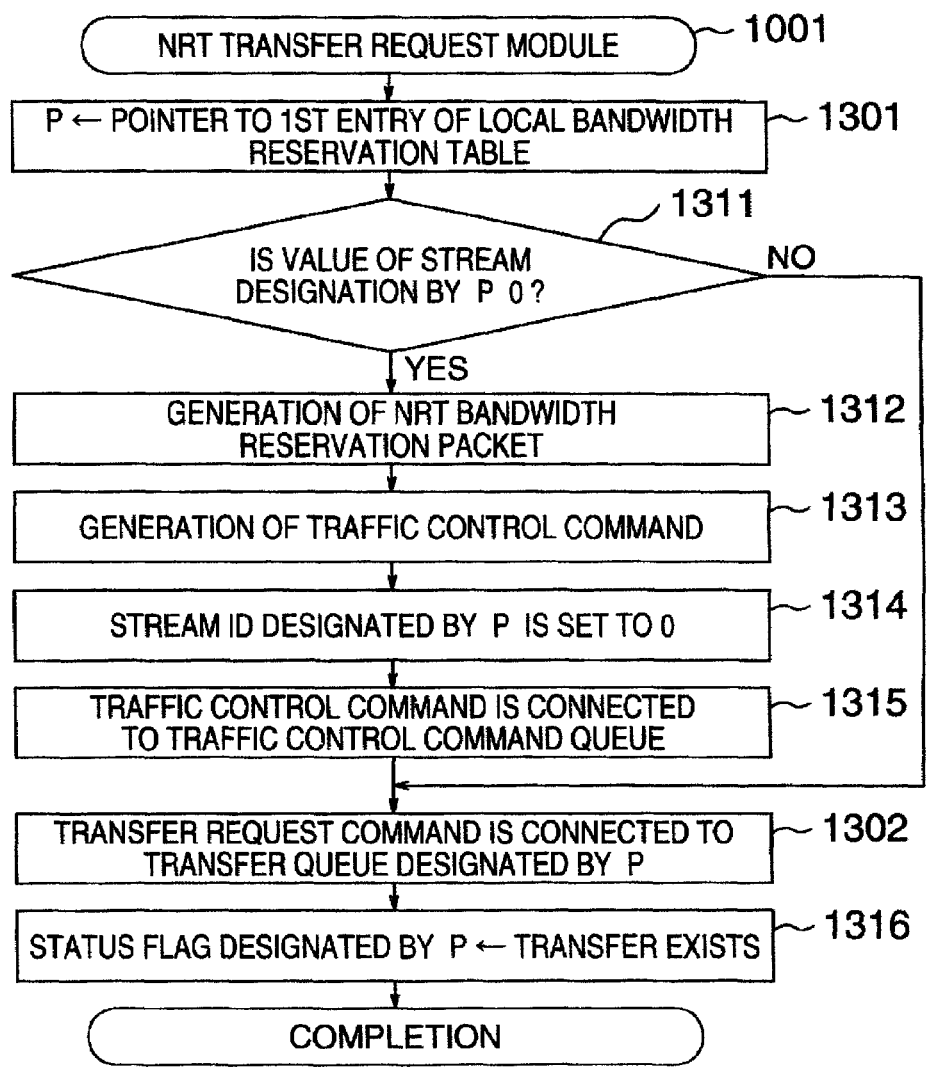

PROCESS EXECUTION METHOD AND APPARATUS

CROSS REFERENCE TO RELATED APPLICATION

This application is a continuation application of an application Ser. No. 09/048,120 entitled METHOD AND APPARATUS FOR EXECUTING COMMUNICATION IN REAL-TIME AND DATA STRUCTURE FOR REAL-TIME DATA COMMUNICATION filed by T. Nakano et al. on Mar. 26, 1998 now U.S. Pat. No. 6,400,819 which is continuation-in-part of patent application Ser. No. 08/824,338 entitled "PERIODIC PROCESS SCHEDULING METHOD" filed by T. Takeuchi et al. on Mar. 26, 1997 now U.S. Pat. No. 5,944,778.

BACKGROUND OF THE INVENTION

The present invention relates to a scheduling method of a process of a computer system, and in particular to a process scheduling for periodically starting each process and bandwidth assurance in data communication using a CSMA/CD system.

C. Venkatramani, et al, Design, Implementation, and Evaluation of a Software-based Real-Time Ethernet Protocol, SIGCOMM '95 Cambridge, pp. 27–37, and C. Venkatramani, The Design, Implementation, and Evaluation of RETHER: A Real-Time Ethernet Protocol, Dept. of Computer Science, State University of New York at Stony Brook, 1996, pp. 1–125 describe an Ethernet protocol, hardwares and real-time and non-real-time communication.

JP-A-3-155241 teaches a LAN system using synchronous and asynchronous communication transfer slots.

Conventionally as the scheduling method of a process for conducting continuous media, a scheduling method using the "Conductor/Performer" model is known. (Nishio et al., "Conductor/Performer," 1st International Workshop on Real-Time Operating Systems and Applications, 1994.) The term "continuous media processing" means processing for converting and transferring data obtained by digitizing images or speech.

In the case where only one stream exists in a system, this method assures any process belonging to the stream of being periodically scheduled. Herein, however, the term "stream" means a group of processes delivering worked continuous media data directly or indirectly to each other. Each of processes belonging to the same stream are provided with the unique order of conducting the work processing of continuous media data. The top process obtains input of the continuous media data from an external device (such as a video digitizer). Each of subsequent processes receives continuous media data worked by a process immediately preceding in order from the immediately preceding process, conducts data work (such as compression processing) to be conducted by itself, and delivers continuous media data worked by itself to a process immediately succeeding in order. The last process outputs continuous media data to the external device (such as a network adapter).

A summary of a scheduling method using a Conductor/Performer model will be hereafter described. For each stream, one periodically driven Conductor process is prepared. The order of Performer processes (i.e., processes belonging to the stream) to be started by the Conductor process is registered beforehand. In accordance with this registered order, the Conductor process starts a Performer process. Therefore, each of both the Conductor process and the Performer processes holds a message queue for wakeup notice of its own process. Wakeup of another process is conducted by transmitting a message to a message queue held by the process.

The Conductor process is driven at time intervals each equal to a specified period. In accordance with the registered order of the Performer processes, the Conductor process repetitively issues a call (function call) for transmitting a message to a message queue owned by the next Performer process in the order and waiting the arrival of a message at a message queue owned by the Conductor process. In other words, the Conductor process repeats the wakeup of a Performer process and sleep lasting until the started Performer process completes the execution of one period. If the last Performer process in order has completed execution, the Conductor process sleeps until the next periodically driven trigger is applied by a timer interrupt.

On the other hand, a Performer process wakes up upon receiving a message from the Conductor process, and conducts continuous media processing corresponding to one period. Upon completing the continuous media processing corresponding to one period, the Performer process issues a call for transmitting a message to a message queue owned by the Conductor process and waiting for the arrival of a message at a message queue owned by its own process. The Performer process sleeps until a message for notifying the wakeup of the next period is transmitted from the Conductor process.

In the case where only one stream exists in the system, the above described scheduling method assures a CPU of being periodically allocated to a Performer process.

The communication methods that have been used ordinarily in the LAN include a CSMA/CD system. Data transfer in data communication using this CSMA/CD system is executed in the following procedures.

a. A node or a computer requesting data transfer confirms the status of a stream.

b. Data transfer is commenced when the stress is empty, and is held on till the stream is empty, when the stream is not empty.

c. The node transferring the data compares the transmitted data with the status of the stream, and a plurality of nodes execute simultaneously the data transfer on the same stream and monitor whether or not any data collision occurs.

d. When the node transferring the data detects the data collision before the transfer is completed, it stops the transfer and transmits a collision signal representing the occurrence of the data collision to all the nodes on the stream.

e. The node transferring the data similarly stops the data transfer when it receives the collision signal before the data transfer is completed.

f. When the node transferring the data stops the data transfer in the case of the procedure d or e, a wait time is secured at random and then the data transfer procedure is repeated once again from the beginning.

g. When the data transfer is completed successfully by the procedures a to f, normal transfer completion is returned to the transfer request.

h. When the data transfer proves failure more than a predetermined number of times due to the data collision by the procedures a to d, the data transfer is stopped and a transfer error is sent back to the transfer request.

The node to which the data transfer is generated from the application, or the like, commences the data transfer at any time by the procedures described above.

According to this communication method, the stream is not occupied even during the transfer of large quantities of data and the node to which the data transfer request is generated can start the data transfer by interrupting the transfer of large quantities of data. Therefore, this method has been used widely in the conventional data transfer which does not need the real-time feature.

In the data transfer of the CSMA/CD system, however, the loss of a packet or a lump of data as the data transfer unit, and delay, occur due to the collision with other data transfer. The problem of the loss of the packet, etc. can be solved by detecting time-out and executing re-transfer of the data in the data transfer that does not need the real-time feature. Nonetheless, the existing LAN using the CSMA/CD system cannot easily achieve communication that guarantees the real-time feature because the delay of the packet and the data re-transfer spoil the real-time feature of the communication.

A multimedia LAN system as one of the examples of the prior art technologies for solving such a problem is described in JP-A-3-155241.

The multimedia LAN system includes a specific apparatus for establishing synchronism as a whole among all the computers constituting the LAN system. To establish this synchronism throughout the whole LAN system, a time-slot for synchronization signal transfer, a time-slot for synchronous data transfer and a time-slot for asynchronous data transfer are disposed so that real-time multimedia data are transferred in a predetermined time interval in the time-slot for synchronization transfer while the time-slot for asynchronous signal transfer makes it possible to execute data transfer not requiring real-time feature by using an access system such as a CSMA/CD system.

In the scheduling method according to the Conductor/Performer model, the following problems occur in the case where a plurality of streams exist in a system.

(a) The priority of each of the Conductor processes and Performer processes does not change with time. In the case where Conductor processes having different drive periods are mixedly present, the execution start interval of the Conductor processes varies. In other words, when a Conductor process has been waked up, there is a possibility that another Conductor process or another Performer process having the same priority or higher priority is executing. In other words, access contention of the CPU time occurs between the Conductor process waked up and another Conductor process or another Performer process. As a result, the execution start interval of the Conductor process varies, and the execution interval of subsequent Performer process also varies.

(b) Since wakeup notice is conducted by inter-process communication (IPC), function calls of message transmission and message reception occur and overhead caused by wakeup notice is large.

These problems make it difficult to realize continuous media processing required to yield high throughput, such as real time MPEG compression processing of multimedia data. Unless in such processing the buffer management at the time of continuous media data input is conducted without use of an interrupt, sufficient throughput is not obtained because of the interrupt overhead. Even in the case where a plurality of streams exist in the system, therefore, it is necessary to keep the execution interval of a Performer process constant as far as possible and it is necessary for a Performer process to spontaneously change over the input buffer without a notice using an interrupt. In the same way, the overhead of the IPC used for wakeup notice also decreases the throughput.

Furthermore, in the scheduling method according to the Conductor/Performer model, processing for a deadline miss exception (such a state that the processing corresponding to one period could not be completed within a specified time from driving of the Conductor process) is conducted by signal notification to the Conductor process. Since a signal handler has typically the same priority as a subject process does, there is a possibility that execution of a process of another stream will be delayed by the signal handler processing. In other words, there is a possibility that the processing delay of one stream will cause a processing delay of another stream.

A video conference system and a video-on-demand system are those applications which process consecutive media generated by digitizing speeches and dynamic images in real-time in a distributed environment using a network. Unless the communication data quantity per unit time is assured in the data communication in these applications, the data transfer cannot meet a playback processing of the consecutive media, so that the playback processing becomes incomplete and the interruption of the speech and disturbance of the images occur. In other words, to accomplish these applications, a data communication assuring the bandwidth, which in turn assures the communication data quantity per unit time, becomes essentially necessary.

The multimedia LAN system described above assures the bandwidth by using the time-slot for synchronization signal transfer and the time-slot for asynchronous signal transfer but when compared with the conventional LAN system using the CSMA/CD system, this system involves the problem that a specific apparatus which enables all the computers constituting the LAN system to establish synchronism throughout the whole LAN system must be provided. In other words, the existing LAN apparatus cannot be applied as they are and the change of the LAN specification is unavoidable.

SUMMARY OF THE INVENTION

An object of the present invention is to provide a periodic process scheduling method of a computer system, whereby:

(a) the execution interval of a process which conducts continuous media processing is kept constant, even in the case where a plurality of streams are present in a system;

(b) overhead required to control the wakeup and sleep of processes is reduced; and (c) a signal handler for conducting the recovery processing on a processing delay is executed, and thereby a processing delay of another stream is not caused even if a processing delay is incurred in one stream.

Another object of the present invention is to provide a periodic process scheduling method of a computer system, whereby when an asynchronous event such as arrival of a network packet has occurred, the execution interval of the processes which conduct continuous media processing is prevented from varying.

To solve the problem described above, it is an object of the present invention to provide a system which can execute data communication assuring the real-time feature on the conventional LAN employing the CSMA/CD system.

It is another object of the present invention to provide a method and a system for controlling a transfer bandwidth in such a manner as to reduce packet collision during the data transfer.

In accordance with one aspect of the present invention, the above described object is achieved by a periodic process scheduling method of a computer system, the computer system including a plurality of process groups, each of the process groups including at least one periodically executed process, the plurality of process groups being executed in parallel, the periodic process scheduling method including the steps of specifying a wakeup interval period and a required CPU time per period for each of the process groups, and securing a CPU allocation time so as to prevent collision between a CPU allocation time of a specified process group and a CPU allocation time of another process group, and adjusting the CPU allocation time and the wakeup period so as to maintain the wakeup interval period of each of specified process groups.

In accordance with another aspect of the present invention, a method for waking up a process scheduled according to the above described process scheduling method further includes the steps of responding to arrival of time when one of the process groups should be waked up, conducting wakeup by changing execution priority of a process belonging to this process group to the highest priority in the system, and thereafter maintaining the highest priority for CPU allocation time consecutively allocated.

In accordance with another aspect of the present invention, the above described process wakeup method further includes the steps of responding to elapse of the CPU allocation time consecutively allocated and consumption of the required CPU time, changing execution priority of a process waked up from the highest priority to reference priority, and notifying this process of timeout.

In accordance with still another aspect of the present invention, an asynchronous event method includes the steps of responding to occurrence of an asynchronous event needing reception of information such as arrival of a network packet during execution of a process having the highest priority in a system, immediately suspending the execution of the process running with the highest priority, securing an information receiving buffer, preparing for reception of the information, thereafter resuming the execution of the process suspended in execution, and referring to received information and conducting processing by using a periodically waked up process.

In accordance with the present invention, there is provided a method of managing data communication comprising: a step of storing a plurality of transfer data lengths (M) that can be transferred within a predetermined transmission time interval, a step of storing said predetermined transfer time interval (t), a step of accumulating the quantity of data to be transferred through a communication stream within said predetermined transmission time interval, and a step of limiting the quantity of said data to be transferred to the value of said data lengths. It is possible to add a step of limiting the quantity of said data to be transferred within said predetermined transmission time interval to a value not greater than the balance obtained by subtracting a predetermined data length margin from the value of said data length. It will be possible to add a step of setting the time under the maximum data blank state, which is inputted by a client and is handled as the time used consecutively, as the time interval in which the transfer of a series of data is to be completed, a step of setting an allowable time determined to a considerably greater time by a server on the basis of said consecutive use time, and a step of detecting that the data received exceeds said consecutive use time. It will be able to provide a step of subtracting a data transfer bandwidth from said data length to cope with a request requesting the use of said data transfer bandwidth from one of a plurality of clients connected to said communication stream, a step of checking whether or not to release said data transfer bandwidth when non-reception of data is detected during said consecutive use time, and a step of adding said data transfer bandwidth to said data length when said data transfer bandwidth is released. It is possible to add a step of accumulating allocated bandwidths when the bandwidths of said communication stream are allocated so as to cope with the request requesting the use of the bandwidths of said data communication bandwidths so as to transmit a series of data from a plurality of clients connected to said communication stream, a step of checking whether or not to release said allocated data communication bandwidths when non-reception of data is detected during a predetermined consecutive use time of a series of data transfer, and subtracting a series of said data communication bandwidths from said accumulated bandwidths when said data communication bandwidths are released.

When a plurality of computers transfer simultaneously packets in a network employing a control mechanism for detecting the collision of the packets due to this simultaneous transfer and re-transferring automatically the packets and a computer network system in which these computers are connected by this network, the present invention holds temporarily the execution of the packet transfer request generated from a program operating on each computer, limits the data quantity transferred from each computer per unit time, and executes transfer control so that the traffic of the whole network does not exceed a predetermined value within the unit time. In this way, the present invention reduces the collision probability of the packets due to the simultaneous transfer and assures with a high probability that the relay time required for the packet transfer falls within an allowable value.

In the network and the computer network system described above, the present invention provides a traffic control mechanism including bandwidth allocation application means which uses at least one of the computers connected to the network as a global bandwidth reservation management node, and applies a bandwidth allocation request designating the bandwidth or a bandwidth allocation request not designating the bandwidth to the global bandwidth reservation management node before each computer which is to transfer the data starts the data transfer to the computer on the reception side, bandwidth allocation decision means which decides the bandwidth allocated to each computer from the bandwidth that the global bandwidth reservation management node can utilize on the network, the bandwidth allocation request designating the bandwidth applied and the bandwidth allocation request not designating the bandwidth which is applied, bandwidth allocation result report means which reports the allocation bandwidth so decided to the computer which applies the request or all the computers connected to the network, and transfer data quantity change means which sets a transmitting data quantity per unit time when each computer accepts the bandwidth allocation result. Using this traffic control mechanism, the present invention executes the traffic control so that the traffic of the entire network does not exceed a predetermined value within the unit time.

Before the data transfer not requiring the real-time feature is started, the bandwidth allocation request not designating the bandwidth is applied to the global bandwidth reservation management node and after this bandwidth allocation is accepted, the data quantity to be transmitted per unit time, which does not require the real-time feature, is set. On the other hand, before the data transfer requiring the real-time feature is started, the bandwidth allocation request designating the bandwidth is applied to the global bandwidth reservation management node and after this bandwidth allocation result is accepted, the data quantity to be transmitted per unit time, which requires the real-time feature, is set. As a result, even when the communication requiring the real-time feature and the communication not requiring the real-time feature exist in mixture, the real-time feature can be guaranteed with a high probability.

Other objects, features and advantages of the present invention will become apparent from reading the following description of the embodiments taken in conjunction with the accompanying drawing.

BRIEF DESCRIPTION OF THE DRAWING

FIG. 8 is a diagram showing input data for the creation example of a time slot table;

FIG. 9 is a diagram showing the configuration of a scheduling table;

FIG. 16 is a diagram showing the program of a group master process;

FIG. 17 is a diagram showing the program of a slave process;

FIG. 29 is a flowchart of a transfer request module in the embodiment 4;

FIG. 30 is a flowchart of an isochronous transfer module;

FIG. 34 is an explanatory view of a local bandwidth reservation table in the embodiment 5;

FIG. 35 is a flowchart of an NRT transfer request module of ordinary nodes in the embodiment 5;

DESCRIPTION OF THE EMBODIMENTS

Figure 1:
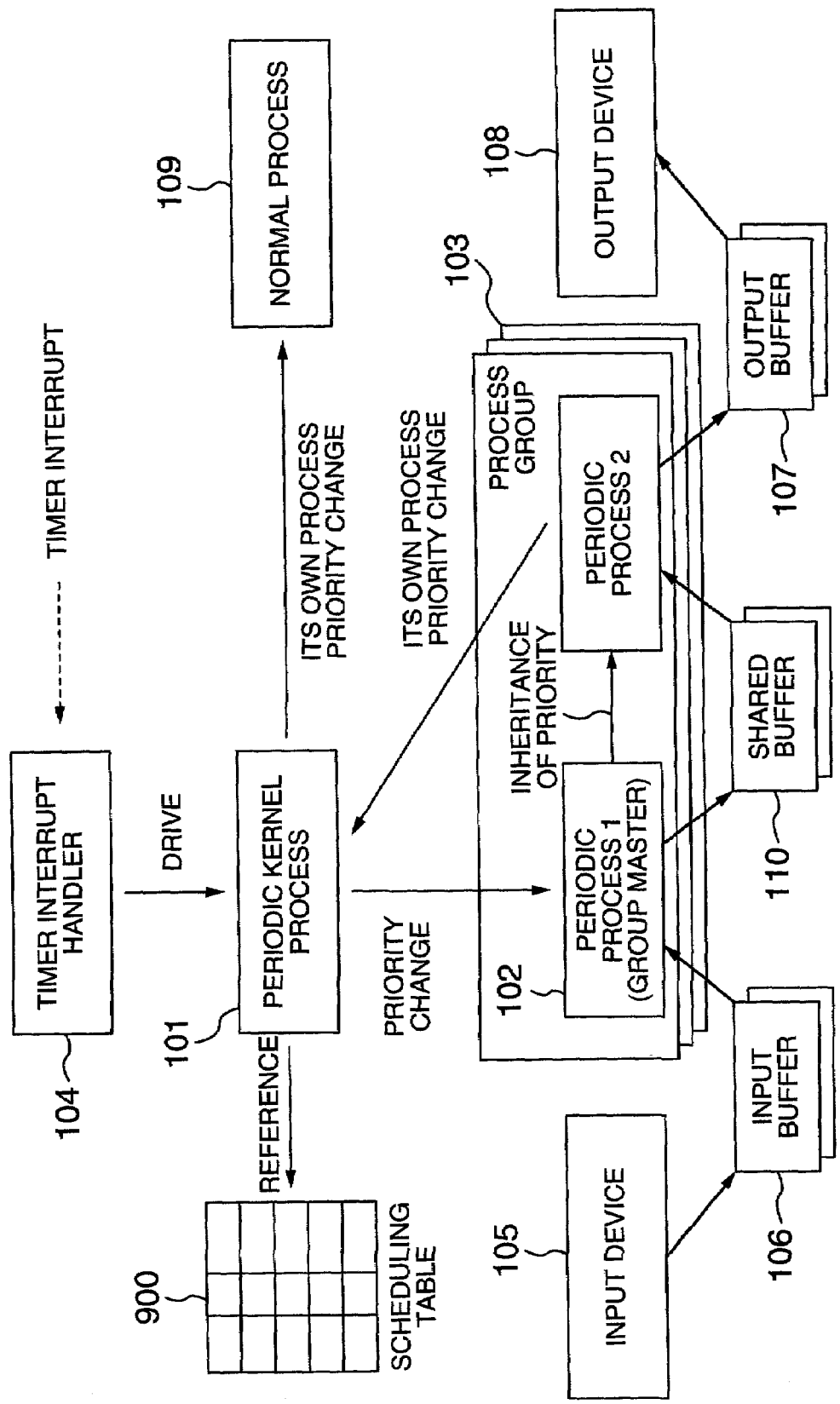
FIG. 1 is a diagram showing the process wakeup and data flow in a scheduling method according to an embodiment of the present invention.

Hereafter, embodiments of the present invention will be described in detail by referring to the drawing.

First Embodiment

The flow of process wakeup and the flow of continuous media data for implementing a process scheduling method of a computer system according to an embodiment of the present invention is shown in FIG. 1. In the system, one periodic kernel process 101 exists. The periodic kernel process 101 is a control process periodically driven by timer interrupt handler 104. By referring to a scheduling table 900, the periodic kernel process 101 selects the next process (hereafter referred to as periodic process) group 102 which should process continuous media data. By changing the priority of the selected periodic process group 102, the periodic kernel process 101 implements the periodic scheduling of each periodic process 102. If a periodic process 102 to be scheduled does not exist, the periodic kernel process 101 schedules another normal process 109. Details of this operation will be described afterwards.

At least one periodic process 102 which processes the same continuous media data forms one process group 103. Periodic processes belonging to the process group 103 are given predetermined processing order. A periodic process 102 which is the first in processing order is driven preferentially by a change of priority conducted by the periodic kernel process 101. The periodic process which is the first in processing order reads continuous media data supplied from an input device 105 via an input buffer 106, and works upon the data. The worked data are delivered to a periodic process 102 which is the next in processing order via a shared buffer 110. The priority of a periodic process 102 in the process group 103 is inherited one after another. A periodic process 102 which is the last in processing order outputs data to an output device 108 via an output buffer 107 and lowers the priority of its own process. Thereby, processing of one period of this process group 103 is substantially terminated. In the system, a plurality of process groups 103, such as a process group for processing sound information and a process group for processing movie information, may exist.

By the way, a scheduler which is not illustrated is called by a function call to create a scheduling table 900 and drive a specified process. The scheduler is a collection of program modules which are activated by a called process and which conduct processing concerning the scheduling.

In the process group, a group master process exists. The group master process is a process which is at the head in processing order among processes belonging to the process group. Processes belonging to the process group other than the group master process are called slave processes. Creation and deletion of the process group 103 are conducted by the group master process by using the following interface.

<Function Name>
create_proc_group (master_pid, slave_pid_array, proc_array_number, pgroupid)

<Argument>
master_pid: process ID of the group master process
slave_pid_array: array of slave process IDs forming the group
proc_array_number: the number of slave process IDs forming the group
pgroupid: an ID of the generated process group is returned <Return Value>
SUCCESS: Termination or various error codes <Description>
The "create_proc_group" function generates a process group having, as the group master, a process specified by "master_pid." The generated process group is formed by process groups specified by "slave_pid_array" and "proc_array_number" in addition to the process specified by "master_pid." A generated process group ID is returned to "pgroupid." It is premised that individual processes having process IDs specified by "master_pid" and "slave_pid_array" have already been generated.

<Function Name>
destroy_proc_group(pgroupid)

<Argument>
pgroupid: process group ID

<Return Value>
SUCCESS: Termination or various error codes

<Description>
The "destroy_proc_group" function deletes a process group specified by "pgroupid."

Figure 2:
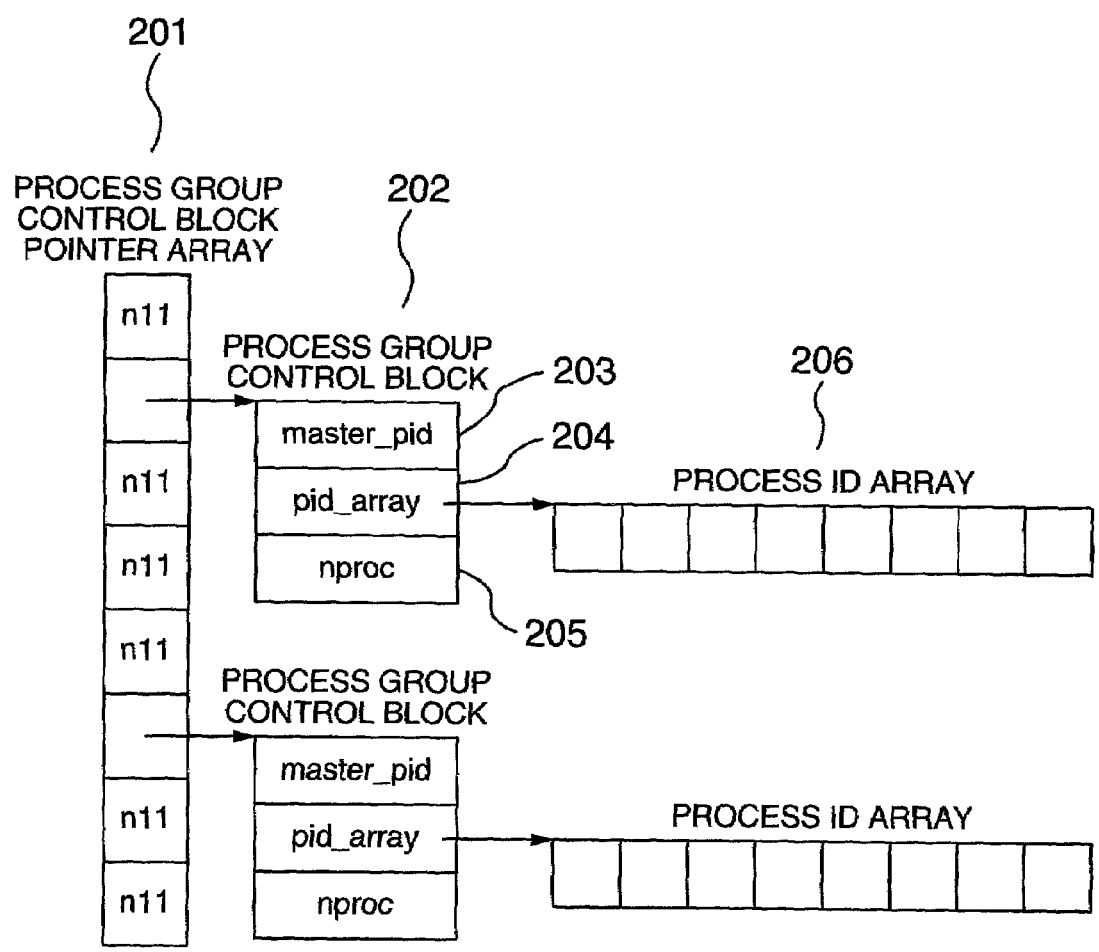
FIG. 2 is a diagram showing the structure of data for managing a process group.

The data structure of array data and a control block used to manage the process group is shown in FIG. 2.

The process group is managed by using a process group control block 202. The process group control block 202 includes a "master_pid" field 203, a "pid_array" field 204, and a "nproc" field 205. The "master_pid" field 203 stores the process ID of the group master process of the process group. The "pid_array" field 204 stores a pointer to a process ID array 206. The process ID array 206 is an array of process IDs of slave processes forming the process group. The "nproc" field 205 stores the number of process IDs stored in the process ID array 206. Furthermore, conversion from a process group ID to a process group control block 202 is conducted by using a process group control block pointer array 201. In other words, a pointer to the process group control block 202 is stored in an element having a process group ID as an index. In the case where a process group control group 202 corresponding to the process group ID does not exist, a "nil" pointer is stored in a corresponding element of the process group control block pointer array 201.

Figure 3:
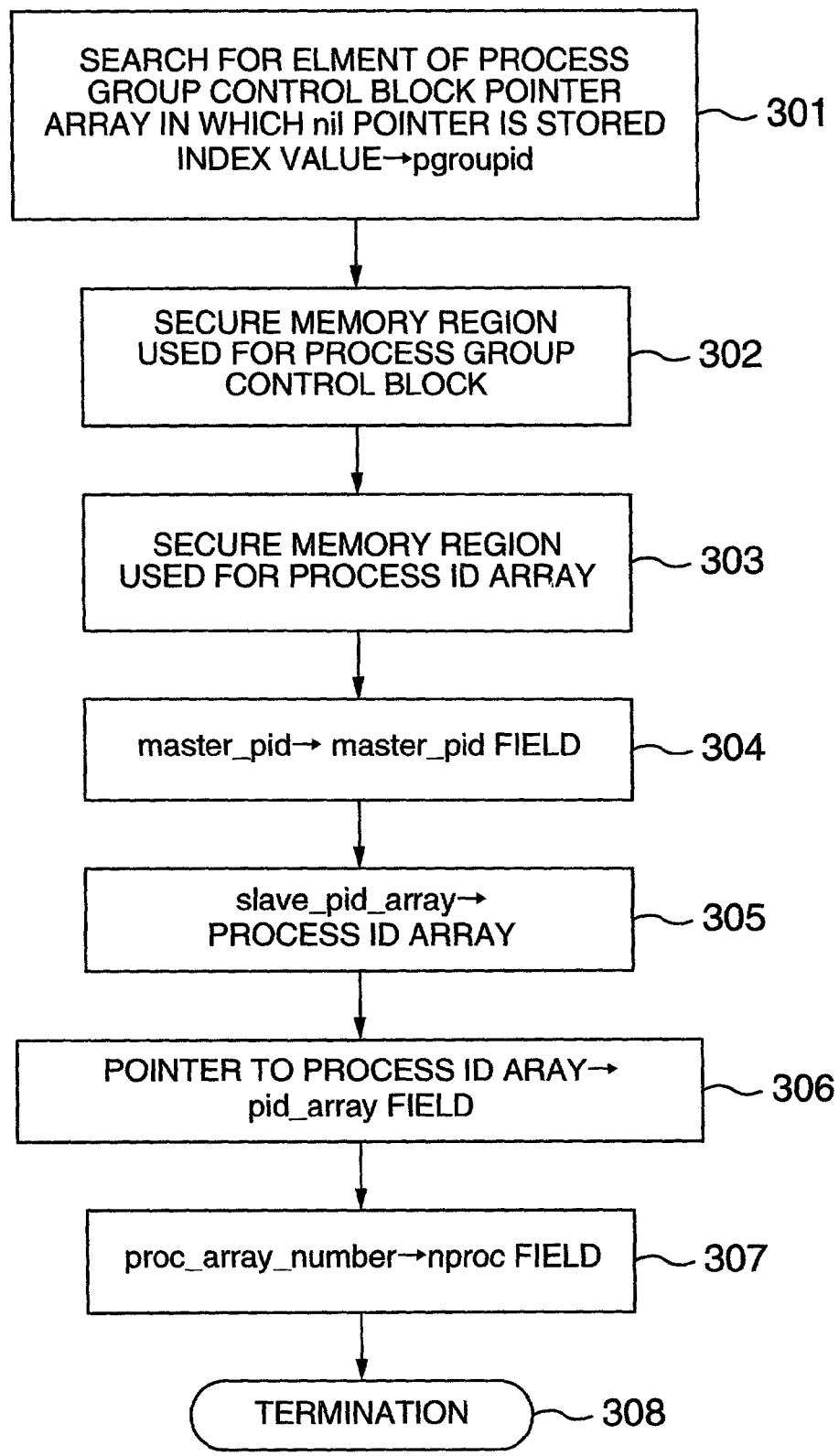
FIG. 3 is a flow chart of "create_proc_group" function.

The processing flow of the "create_proc_group" function is shown in FIG. 3.

At step 301, one element included in elements of the process control block pointer array 201 in which the "nil" pointer is stored is searched for. Its index value is used as a return value of the "pgroupid."

At step 302, a memory region used for the process group control block 202 is secured.

At step 303, a memory region used for the process ID array 206 is secured.

At step 304, the ID of the group master process specified by the argument "master_pid" of the "create_proc_group" function is stored in the "master_pid" field 203 of the process group control block 202 having a memory region secured at the step 302.

At step 305, the array of the process ID of the slave process specified by the argument "slave_pid_array" of the "create_proc_group" function is copied into the process ID array 206 having a memory region sesured at the step 303.

At step 306, a pointer to the process ID array is set in the "pid-array" field.

At step 307, the number of slave process IDs forming the process group specified by the argument "proc_array_number" of the "create_proc_group" function is stored in the "nproc" field 205 of the process group control block 202 having a memory region secured at the step 302.

Figure 4:
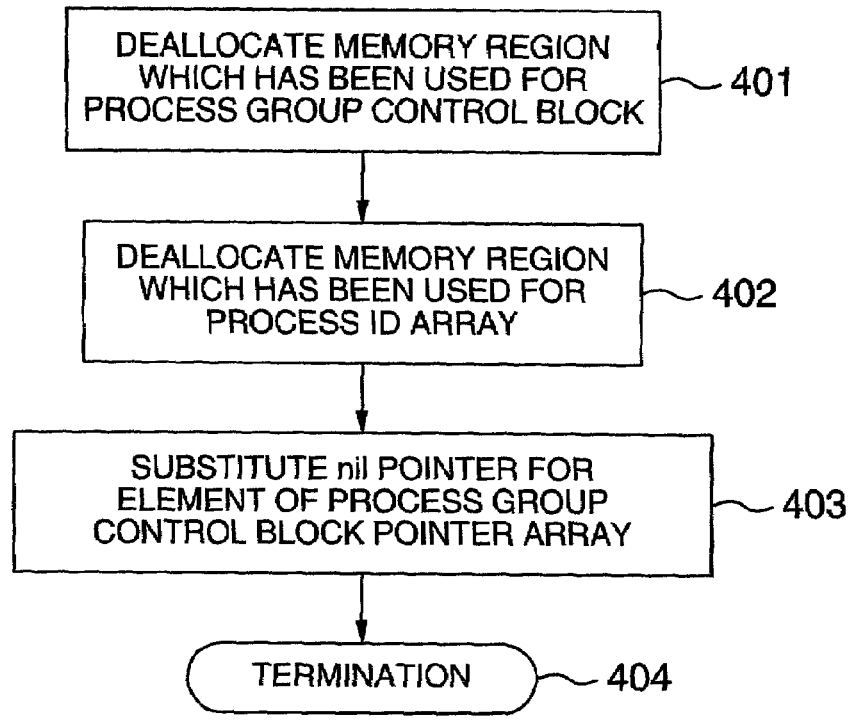
FIG. 4 is a flow chart of "destroy_proc_group" function.

The processing flow of "destroy_proc_group" function is shown in FIG. 4.

At step 401, an element of the process group control block pointer array 201 having the argument "pgroupid" of the "destroy_proc_group" function as the index is searched for, and a memory region which has been used by the process group control block indicated by that element is deallocated.

At step 402, a memory region which has been used by the process ID array 206 indicated by the "pid_array" field of the above described process group control block 202 is deallocated.

At step 403, the "nil" pointer is substituted for an element of the process group control block pointer array 201 corresponding to the process group to be deallocated.

A process group 103 becomes the unit of scheduling. By using the "alloc_time_slot" function at the time of its initializing, the group master of the process group 103 reserves the CPU allocated to the process group 103 over a specified time at intervals each equal to a specified period. If allocation of the CPU time has become unnecessary, the group master calls a "dealloc_time_slot" function and cancels its reservation.

If the "alloc_time_slot" function is called, the scheduler determines the CPU allocation sequence so as to satisfy the period and execution time per period requested by each process group, and creates a scheduling table 900. This creation algorithm will be described afterwards.

On the basis of the scheduling table 900, the periodic kernel process 101 conducts scheduling of each periodic process 102. Upon arrival at the time when the CPU should be allocated to the process group 103, the periodic kernel process 101 sets the priority of the group master process of that process group 103 to "raised." The periodic process having the priority set to "raised" is assured to have the highest priority among user processes. In addition, the process 102 having the priority set to "raised" is assured to have priority higher than that of the periodic kernel process 101.

Upon elapse of the specified time since the priority of the group master process has become "raised," the timer interrupt handler 104 sets the priority of the periodic process 102 having the priority set to "raised" among the periodic processes belonging to the process group 103 to "depressed." (The group master process can inherit the priority of another periodic process 102 belonging to the same process group 103. This will be described afterwards.) The process 102 having the priority set to "depressed" is assured to have the lowest priority among user processes.

Over the time during which the CPU should be allocated to the process group 103, any user process or periodic kernel process 101 which does not belong to the process group 103 is not scheduled so long as a periodic process 102 belonging to the process group 103 having the priority set to "raised" is in the executable state. Over the time during which the CPU should not be allocated, any periodic process 102 belonging to the process group 103 is not scheduled. A CPU time which is not allocated to any periodic process 102 is allocated to the normal process 109 or an idle process which executes an infinite loop and which is always in the executable state. By setting the priority of the idle process to the lowest priority next to "depressed," it is assured that scheduling is not conducted over the time during which the CPU should not be allocated to a periodic process 102 or the periodic kernel process 101. External specifications of the "alloc_time_slot" function and the _dealloc_time_slot_function will be described below.

<Function Name>
alloc_time_slot(pgroupid, interval, length)

<Argument>
pgroupid: process group ID assured of CPU allocation
interval: wakeup interval of process
length: execution time of process group per period to be secured <Return Value>
SUCCESS: termination
or various error codes <Description>
In the "alloc_time_slot" function, the process group specified by "pgroupid" requests the CPU to be allocated over a time specified by "length" and at a period specified by "interval." The "interval" and "length" are specified by taking a predetermined time slot as the unit. At the period specified by the "interval," the priority of the group master process becomes "raised." By using a "proc_raise_handoff" function (which will be described afterwards), the group master process can set the priority of another process belonging to the process group to "raised," and change the priority of its own process to "depressed" (or reference priority). Upon elapse of a time specified by the "length" since the priority of the group master process became "raised," the priority of a process having the priority set to "raised" and included in the processes belonging to the process group is forcibly changed to "depressed." Furthermore, a timeout signal is transmitted to that process.

The value of the "interval" must be power of 2. If a value other than that is specified, the scheduler conducts processing by assuming that a largest power value of 2 which does not exceed the specified value has been specified.

<Function Name>
dealloc_time_slot(pgroupid)

<Argument>
pgroupid: process group ID for canceling the CPU allocation assurance <Return Value>
SUCCESS: termination
or various error codes <Description>
In the "dealloc_time_slot" function, the process group specified by "pgroupid" cancels the CPU allocation request which has been held by the process group specified by "pgroupid."

Figure 5:
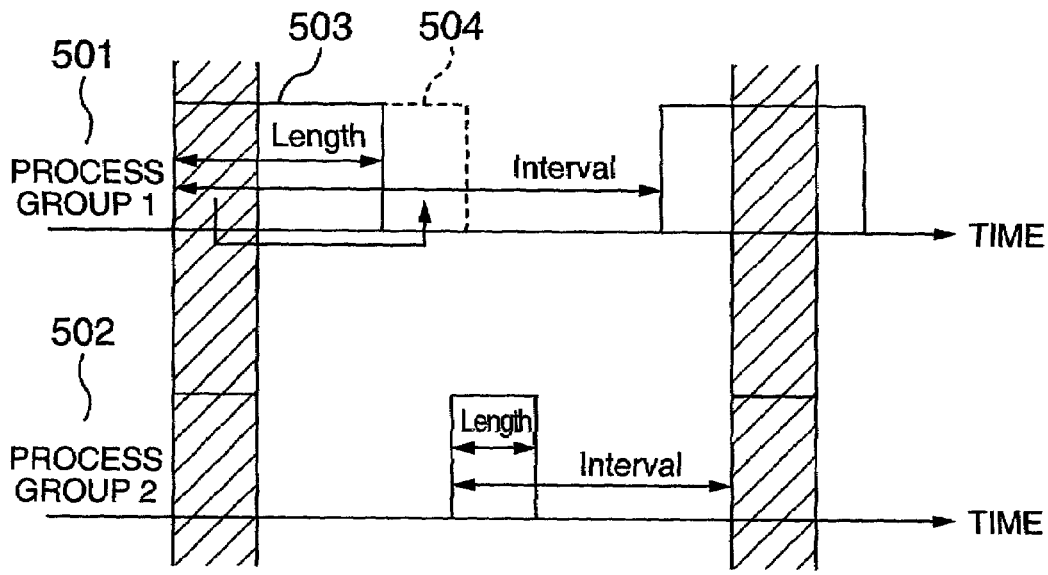
FIG. 5 is a diagram showing a method for eliminating the overlap between CPU times allocated to a process group.

Upon being requested to allocate the CPU by the "alloc_time_slot" function, the scheduler cannot always conduct scheduling of the process group 103 as requested by all process groups 103. The reason will now be described. As shown in FIG. 5, a plurality of process groups 501 and 502 cannot be scheduled at the same time. Therefore, it beomes necessary to shift the overlap time of the CPU allocation time 503 of either one of overlapping process groups 501 and 502 to a different time 504. That is the reason.

In accordance with the following algorithm, the scheduler determines the CPU allocation time of each process group and registes the result in the scheduling table 900 which will be described afterwards. The CPU allocation is conducted by taking the timer interrupt occurrence interval as the unit. By using the timer interrupt occurrence time as a boundary, the real time is divided into a group of time slots. In accordance with the following algorithm, a process group 103 to be allocated is determined for each time slot.

Figure 6:
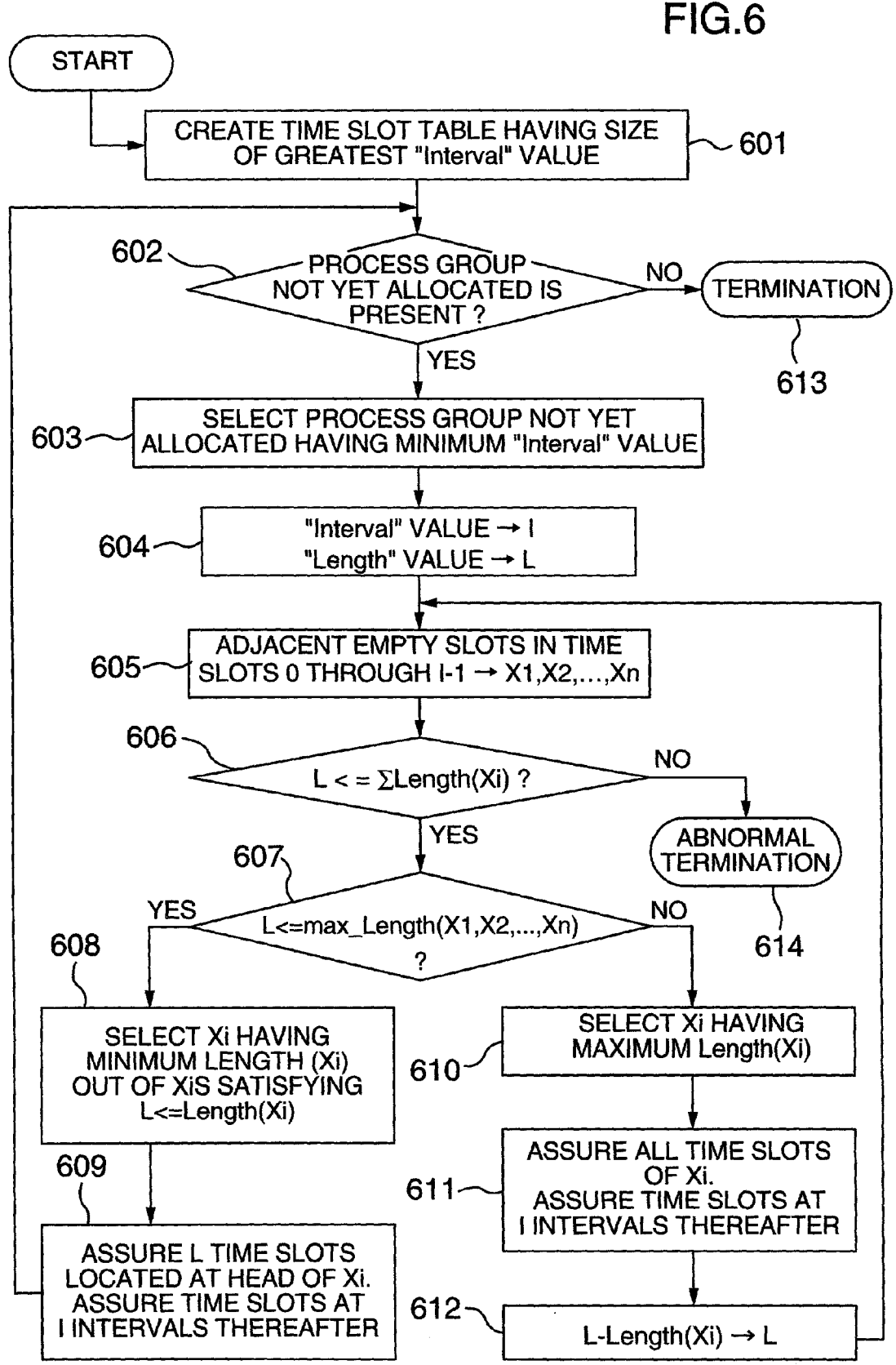
FIG. 6 is a flow chart of a time slot table creation.

The flow chart of the above described algorithm is shown in FIG. 6.

Figure 7:
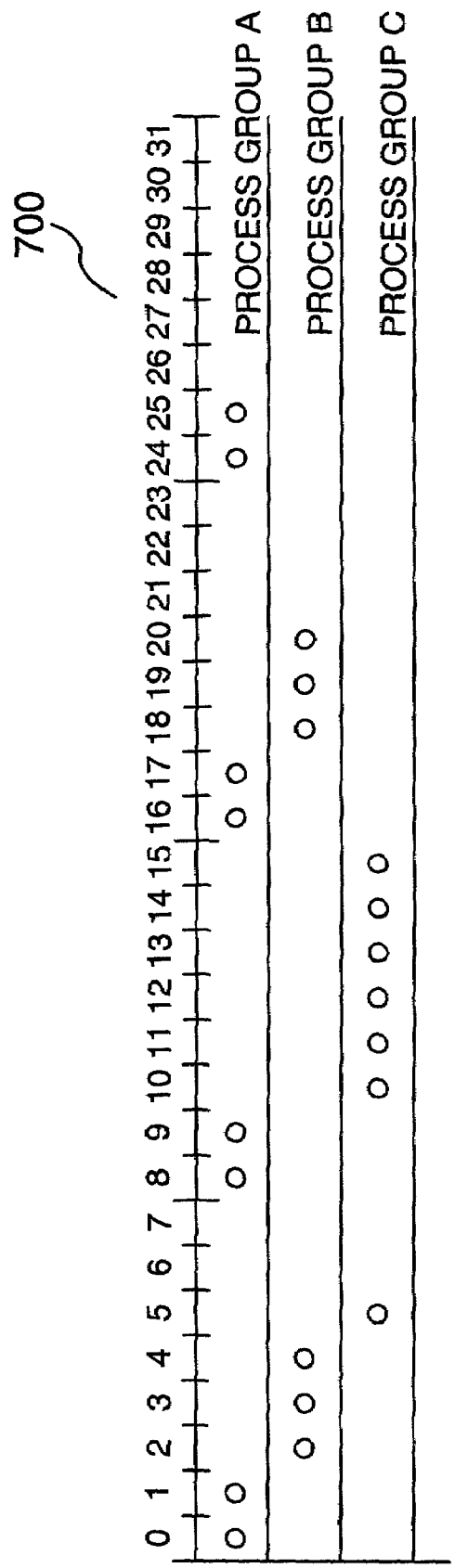
FIG. 7 is a diagram showing a result of a creation example of a time slot table.

At step 601, a time slot table 700 as shown in FIG. 7 is created. The time slot table 700 has the same size as the greatest "interval" value among "interval" values requested by a process group 103 to be allocated (i.e., a process group 103 for which a CPU allocation reservation request has already been issued by the "alloc_time_slot" function). The time slot table 700 is a one-dimensional array. In each element of the array, an ID of a process group 103 to be allocated to a corresponding time slot is stored. As an initial value of each element, an ID indicating that the time slot is not yet allocated is stored.

At step 602, it is determined whether a process group 103 for which a time slot to be allocated has not yet been determined is present. If allocation of time slots for all process groups 103 has been completed, termination takes place at step 613.

At step 603, a process group 103 which is minimum in "interval" value requested at the time of issuance of the "alloc_time_slot" function is selected out of process groups 103 for which a time slot to be allocated has not yet been determined.

At step 604, the requested "interval" value and "length" value of the process group 103 selected at the step 603 are substituted for I and L, respectively.

At step 605, time slots included in time slots 0 through I−1 and not yet allocated are collected in groups every adjacent time slots. Hereafter, time slot groups Xi (i =1, 2, . . . n) subjected to grouping at the present step are referred to as adjacent empty time slots.

If at step 606, the sum total of sizes (the number of time slots) of adjacent empty time slots obtained at the step 605 is less than L, time slot allocation satisfying requests of all process groups 103 is judged to be impossible and abnormal termination takes place (step 614).

At step 607, adjacent empty time slots obtained at the step 605 and having a maximum size are compared in magnitude with L.

If L is less, one having a minimum size is selected at step 608 out of adjacent empty time slots having at least the size of L.

At step 609, L time slots located at the head of the adjacent empty time slots selected at the step 608 are allocated to the process group 103 selected at the step 603. In addition to the time slots allocated at this time, time slots located I, 2I, 3I, . . . time slots after are also allocated to the process group 103 selected at the step 603. Thereby, time slot allocation to the process group 103 selected at the step 603 is completed, and a jump to the step 602 takes place.

If at the step 607 L is greater than the maximum adjacent empty time slot size, adjacent empty time slots having a maximum size are selected at step 610.

At step 611, all time slots belonging to the adjacent empty time slots selected at the step 610 are allocated to the process group 103 selected at the step 603. In addition to the time slots allocated at this time, time slots located I, 2I, 3I, . . . time slots after are also allocated to the process group 103 selected at the step 603.

At step 612, the L minus the size of the adjacent empty time slots selected at the step 610 is set as a new L value, and a jump to the step 605 takes place.

An example of creation of a time slot table 700 will now be described by referring to FIGS. 7 and 8. It is now assumed that the number of process groups 103 to which time slots are allocated is three. In FIG. 8, "interval" values 801 and "length" values 802 requested by each process group 103 are shown.

First of all, the time slot table 700 having a size of 32 which is the maximum value of the "interval" value 801 requested by three process groups 103 is created. Each element of the time slot table 700 is initialized to have an ID indicating that allocation has not yet been conducted.

Time slots allocated to a process group A having a minimum "interval" value 801 are determined. From time slots included in time slots 0 through 7, adjacent empty time slots are generated. In this case, one adjacent empty time slot group having a size of 8 formed by time slots 0 through 7 is generated.

The "length" value 802 equivalent to two requested by the process group A is less than the size 8 of the adjacent empty time slots thus generated. Therefore, two time slots located at the head of the adjacent empty time slots, i.e., time slots 0 and 1 are allocated to the process group A. Besides, time slots located thereafter at an interval equal to an integer times of the "interval" value 801 of eight requested by the process group A are also allocated to the process group A. Besides the time slots 0 and 1, time slots 8, 9, 16, 17, 24 and 25 are thus allocated to the process group A. In accordance therewith, corresponding elements of the time slot table 700 are updated. Thereby, allocation of time slots to the process group A is completed.

Subsequently, time slots allocated to a process group B having a second least "interval" value 801 are determined. From time slots 0 through 15, adjacent empty time slots are generated. In this case, two adjacent empty time slot groups each having a size of 6 and respectively including time slots 2 through 7 and time slots 10 through 15 are generated.

The "length" value 802 equivalent to three requested by the process group B is less than this size 6. Out of adjacent empty time slots having a size of at least 3, adjacent empty time slots having a minimum size are selected. Now, adjacent time slots formed by time slots 2 through 7 are selected. Three time slots located at the head of the adjacent empty time slots are allocated to the process group B. In other words, time slots 2 through 4 are allocated to the process group B. In the same way, time slots 18 through 20 are also allocated to the process group B. In accordance therewith, corresponding elements of the time slot table 700 are updated. Thereby, allocation of time slots to the process group B is completed.

Finally, time slots allocated to the process group C are determined. From time slots 0 through 31, adjacent empty time slots are generated. In this case, the following adjacent empty time slots are generated:

adjacent empty time slots having a size of 3 and including time slots 5 through 7;

adjacent empty time slots having a size of 6 and including time slots 10 through 15;

adjacent empty time slots having a size of 3 and including time slots 21 through 23; and adjacent empty time slots having a size of 6 and including time slots 26 through 31.

The "length" value 802 of seven requested by the process group C is greater than the maximum size 6 of the above described adjacent empty time slots. First of all, therefore, one adjacent empty time slot group having a maximum size of 6 is selected. All time slots belonging to the adjacent empty time slots, i.e., the time slots 10 through 15 are allocated to the process group C. In accordance therewith, corresponding elements of the time slot table 700 are updated.

From the "length" value 802 of seven requested by the process group C, the size 6 of the adjacent empty time slots selected before is subtracted, resulting in a difference of one. Allocation of one time slot thus left is now conducted. Adjacent empty time slots are generated again. In this case, the following adjacent empty time slots are generated:

adjacent empty time slots having a size of 3 and including time slots 5 through 7;

adjacent empty time slots having a size of 3 and including time slots 21 through 23; and adjacent empty time slots having a size of 6 and including time slots 26 through 31.

From adjacent empty time slots having a size of at least 1, adjacent empty time slots having a minimum size is selected. In this case, adjacent empty time slots formed by time slots 5 through 7 are selected. One time slot located at the head of the adjacent empty time slot, i.e., time slot 5 is allocated to the process group C. In accordance therewith, corresponding elements of the time slot table 700 are updated. Thereby, allocation of time slots to the process group C is completed.

Process groups allocated for each time slot by the processing heretofore described are determined as shown in FIG. 7. From this, the scheduler generates the scheduling table 900 shown in FIG. 9. This scheduling table 900 is a table describing the order of process groups 915 to which the CPU should be allocated and their allocation times 916 (the number of time slots). Furthermore, an end flag 917 indicates whether allocation of the process group 915 corresponding to one period is finished when the CPU allocation of that line has been completed. For example, the end flag 917 for 903 becomes OFF, i.e., FALSE, because allocation corresponding to one period is not completed even if the time slot 5 is allocated to the process group C. However, the end flag 917 for 906 becomes ON, i.e., TRUE, because allocation corresponding to one period is completed if the time slots 10 through 15 are allocated. The algorithm for converting the time slot table 700 to the scheduling table 900 is self-evident, and consequently it will not be described. An index 914 is a pointer indicating a line (entry) of the scheduling table 900 to which the CPU is subsequently allocated. A time slot for which the process group 915 specifies "OTHERS" is a time slot allocated to the normal process 109. "OTHERS" 907 indicates that if execution of the periodic process in the process group C is finished before elapse of six time slots allocated to the process group C, time slots which have become empty are allocated to the normal process 109.

Whenever the "alloc_time_slot" function is issued, the scheduler recreates the scheduling table 900 on the basis of the existing table as shown in FIG. and a request conducted by the new "alloc_time_slot" function.

In accordance with the scheduling table 900 generated according to the above described algorithm, the periodic kernel process 101 conducts scheduling of the process group 103. The periodic kernel process 101 changes the priority of a periodic process 102 belonging to the process group 103 which has requested periodic CPU allocation to "raised," "depressed," or reference priority. Thereby, the scheduling is implemented.

Furthermore, a periodic process having priority set to "raised" by the periodic kernel process 101 changes the priority of its own process to "depressed," and changes the priority of other periodic processes belonging to the same process group to "raised." As a result, handoff scheduling in the process group is implemented.

The priority changes are conducted by using "proc_raise," "proc_raise_cancel," "proc_raise_handoff," "proc_depress," and "proc_depress_cancel" functions. External specifications of these functions will be described below.

<Function Name>
proc_raise(pid, time, flags)

<Argument>
pid: process ID
time: time during which the priority is kept at "raised"
flags: flag specifying the priority obtained after a specified time has elapsed PRIORITY_NORMAL
The priority of the process is changed to the reference priority.

PRIORITY_DEPRESSED
The priority of the process is changed to "depressed." Furthermore, whether a signal is to be transmitted to a process specified by the "pid" when a specified time has elapsed is specified by the following flag.

SEND_SIGNAL
A timeout signal is transmitted to a process specified by "pid" when a specified time has elapsed.

<Return Value>
SUCCESS: termination
or various error codes

<Description>
The "proc_raise" function sets the priority of a process specified by "pid" to "raised" for a time (the number of time slots) specified by "time." In the "time," time 916 allocated to a process group to which that process belongs or INFINITY is specified. A process having priority set to "raised" is assured of having priority higher than that of any other user process.

Priorities of a plurality of processes cannot be set to "raised" simultaneously. If the present function is called when a process having the priority set to "raised" is already present, the present function returns an error.

In the case where "INFINITY" has been set in "time," the priority of the process is kept at "raised" until the "proc_raise_cancel" function or the "proc_raise_handoff" funtion is issued to the process. The "INFINITY" is specified when, for example, the timer interrupt handler 104 wakes up the periodic kernel process 101. When the periodic process 102 is to be waked up, typically the "INFINITY" is not specified.

It is now assumed that a value other than the "INFINITY" is specified in "time" beforehand. If in this case the "proc_raise_cancel" function or the "proc_raise_handoff" function is not issued to the process even when the time specified by "time" has elapsed, the priority of the process is forcibly changed according to the flag specified in "flags." If "PRIORITY_NORMAL" is specified in "flags" beforehand, the priority of the process is changed from "raised" to the reference priority. If "PRIORITY_DEPRESSED" is specified in "flags" beforehand, the priority of the process is changed from "raised" to "depressed." If "SEND_SIGNAL" is specified in "flags" beforehand, a timeout signal is transmitted to that process. The process which has received the timeout signal is waked up according to the preset priority, and the process can conduct processing for the case of timeout.

<Function Name>
proc_raise_cancel(pid, flags)

<Argument>
pid: process ID
flags: flag specifying the priority obtained after a change. The following can be specified.

PRIORITY_NORMAL
The priority of the process is changed to the reference priority.

PRIORITY_DEPRESSED
The priority of the process is changed to "depressed."

<Return Value>
SUCCESS: termination or various error codes

<Description>
According to the "flags," the "proc_raise_cancel" function changes the priority of the process set to "raised" by the "proc_raise" function. In the case where "PRIORITY_NORMAL" is specified in "flags" beforehand, the priority after the change becomes the reference priority according to the scheduling attribute. If "PRIORITY_DEPRESSED" is specified in "flags" beforehand, the priority after the change becomes "depressed."

<Function Name>
proc_raise_handoff(pid, flags)

<Argument>
pid: process ID
flags: flag specifying the priority obtained after handoff. The following can be specified.

PRIORITY_NORMAL
The priority of the process is changed to the reference priority.

PRIORITY_DEPRESSED
The priority of the process is changed to "depressed."

<Return Value>
SUCCESS: termination or various error codes

<Description>
The "proc_raise_handoff" function sets the priority of the process specified by "pid" to "raised," and changes the priority of its own process according to "flags." The process specified by "pid" must belong to the same process group as the calling process. Otherwise, an error return is caused. If "PRIORITY_NORMAL" is specified in "flags" beforehand, the priority of the calling process after handoff becomes the reference priority. If "PRIORITY_DEPRESSED" is specified in "flags" beforehand, the priority of the calling process after handoff becomes "depressed."

The priority of the calling process must be "raised." If a process having priority other than "raised" calls the present function, the error return is caused.

In the case where an upper limit time during which the priority of the calling process is kept at "raised" (i.e., in the case where something other than "INFINITY" is specified in "time" argument of the "proc_raise" function beforehand), the time during which the priority of the destination process of handoff is kept at "raised" becomes the time during which the priority of the source process of handoff is kept at "raised" and which is left at the time of calling. If an upper limit time during which the priority of the calling process is kept at "raised" is not specified, an upper limit time during which the priority of the destination process of the handoff is kept at "raised" is not present either.

<Function Name>
proc_depress(pid, time, flags)

<Argument>
pid: process ID
time: time during which the priority is kept at "depressed"
flags: flag specifying the priority obtained after a specified time has elapsed. The following flags can be specified.

PRIORITY_NORMAL
The priority of the process is changed to the reference priority.

PRIORITY_RAISED
The priority of the process is changed to "raised."

<Return Value>
SUCCESS: termination or various error codes

<Description>
The "proc_depress" function sets the priority of a process specified by "pid" to "depressed" for a time (the number of time slots) specified by "time." The process having priority set to "depressed" is assured of having priority lower than any other user process. The "proc_depress" function is issued mainly for the periodic kernel process 101 to lower the priority of its own process and wake up the normal process 109.

In the case where "INFINITY" has been set in "time," the priority of the process is kept at "depressed" until the "proc_depress_cancel" function or the "proc_raise_handoff" funtion is issued to the process.

It is now assumed that a value other than the "INFINITY" is specified in "time" beforehand. If in this case the "proc_raise_cancel" function or the "proc_depress_handoff" function is not issued to the process even when the time specified by "time" has elapsed, the priority of the process is forcibly changed according to the flag specified in "flags." If "PRIORITY_NORMAL" is specified in "flags" beforehand, the priority of the process is changed from "depressed" to the reference priority. If "PRIORITY_RAISED" is specified in "flags" beforehand, the priority of the process is changed from "depressed" to "raised".

<Function Name>
proc_depress cancel(pid, flags)

<Argument>
pid: process ID
flags: flag specifying the priority obtained after a change. The following can be specified.

PRIORITY_NORMAL
The priority of the process is changed to the reference priority.

PRIORITY_RAISED
The priority of the process is changed to "raised."

<Return Value>
SUCCESS: termination or various error codes

<Description>
According to the "flags," the "proc_depress_cancel" function changes the priority of the process set to "depressd" by the "proc_depress" function. In the case where "PRIORI- TY_NORMAL" is specified in "flags" beforehand, the priority after the change becomes the reference priority. If "PRIORITY_RAISED" is specified in "flags" beforehand, the priority after the change becomes "raised."

Figure 10:
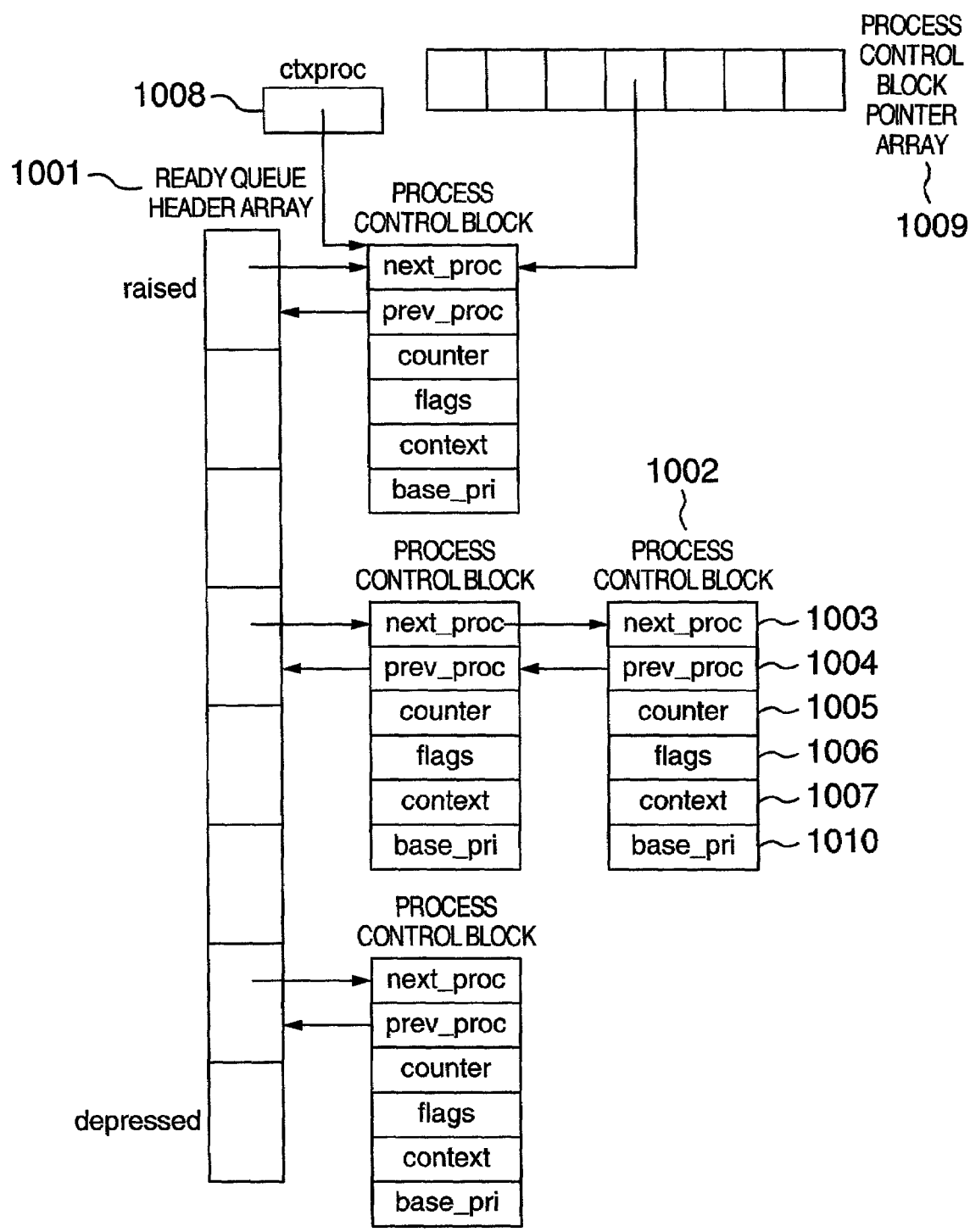
FIG. 10 is a diagram showing the structure of data for managing processes.

The data structure of array data and control block required for implementing the above described function group are shown in FIG. 10.

Process management is conducted by using a process control block 1002. According to priority, process control blocks 1002 of processes assuming the executable (ready) state are connected to bidirectional queues (hereafter referred to as bidirection ready queues) having elements of a ready queue header array 1001 as queue headers. The ready queue header array 1001 is an array of queue headers (i.e., pointers indicating a process control block) of bidirectional queues associated with respective priorities having priority as an index value. It is assumed that priority having a smaller value is higher priority. The value of the highest priority is represented by "raised," and the value of the lowest priority is represented by "depressed."

The process control block 1002 holds a "next_proc" field 1003 and a prev_proc field 1004 in order to be connected to a bidirectional ready queue associated with priority. In the "next_proc" field 1003 and the "prev_proc" field 1004, a pointer to a process control block 1002 located behind in the bidirectional queue and a pointer to a process control block 1002 located before are stored, respectively. In the "prev_proc" field 1004 of a process control block 1002 located at the head of the bidirectional ready queue, however, a pointer to an element of the ready queue header array 1001 is stored. In the "next_proc" field 1003 of a process control block located at the end of the bidirectional ready queue, a "nil" pointer is stored.

Besides them, a "counter" field 1005, a "flags" field 1006, a "context" field 1007, and a "base_pri" field 1010 are present in the process control block 1002. The "counter" field 1005 holds a remaining time (represented by the number of time slots) during which that process can maintain the priority of "raised" or "depressed." In the "flags" field 1006, there is stored a flag indicating the priority of the process to be changed after the time during the priority of "raised" or "depressed" can be maintained has elapsed. The "context" field 1007 is a region for saving the execution context of the process. In the "base_pri" field 1010, the reference priority of the process is stored at the time of process generation.

Conversion of the process ID to a process control block 1002 is conducted by using a process control block pointer array 1009. Specifically, in an element of the process control block pointer array 1009 having the process ID as an index, a pointer to a process control block 1002 is stored beforehand. In the case where the process control block 1002 corresponding to the process ID is not present, a "nil" pointer is stored beforehand in the corresponding element of the process control block pointer array 1009.

Furthermore, in "ctxproc" 1008, a pointer to the process control block 1002 of a process which is now being executed is stored.

Figure 11:
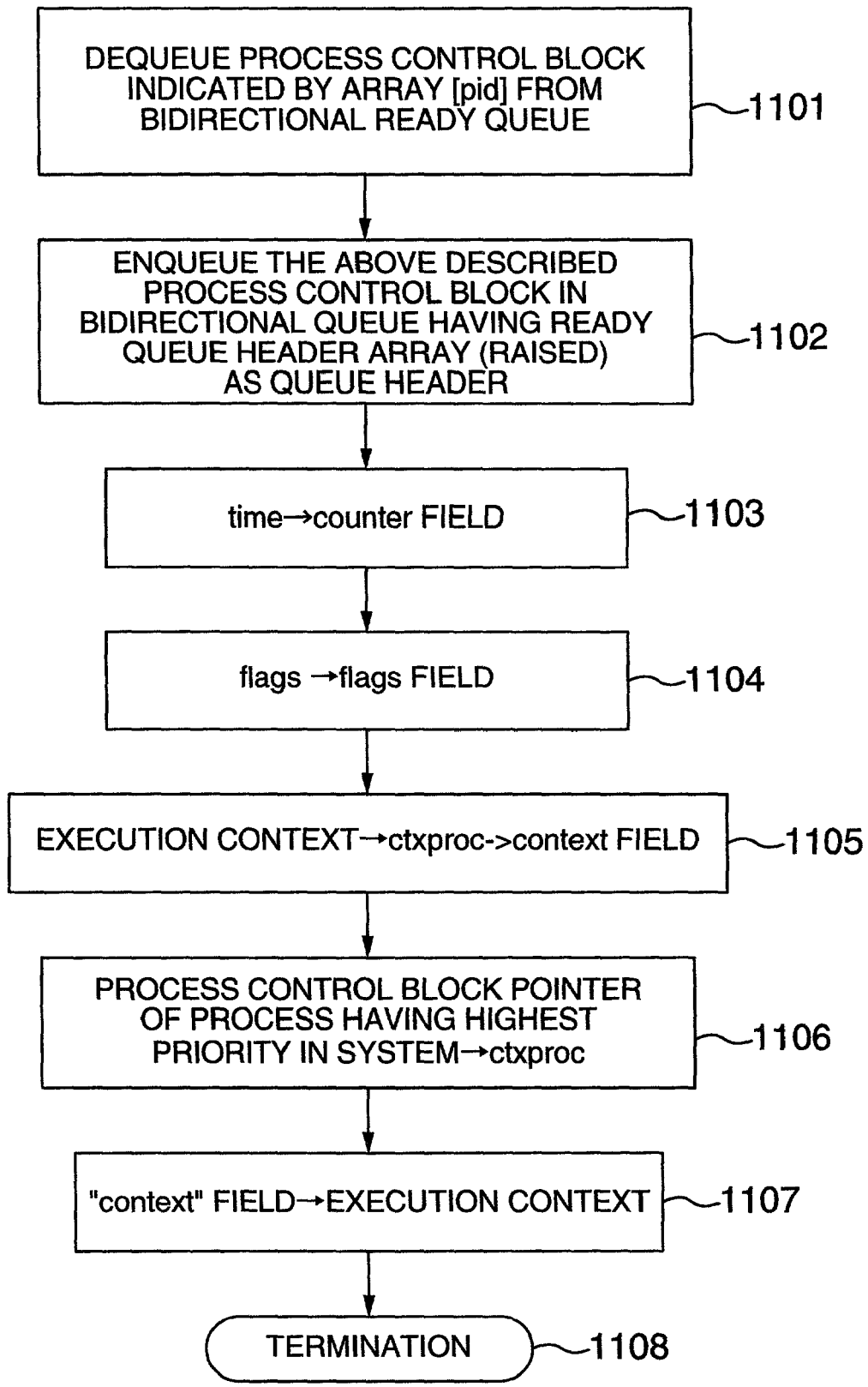
FIG. 11 is a flow chart of "proc_raise" function.

The processing flow of the "proc_raise" function is shown in FIG. 11.

At step 1101, the scheduler derives an element of the process control block pointer array 1009 having the argument "pid" of the "proc_raise" function as the index, and dequeues the process control block 1002 indicated by that element from the bidirectional ready queue.

At step 1102, an element of the ready queue header array 1001 having "raised" as the index, and the process control block 1002 derived at the step 1101 is enqueued at the end of a bidirectional ready queue having that element as the queue header.

At step 1103, the value specified by the argument "time" of "proc_raise" function is stored in the "counter" field 1005 of the process control block 1002 obtained at the step 1102.

At step 1104, the value specified by the argument "flags" of the "proc_raise" function is stored in the "flags" field 1006 of the process control block 1002 obtained at the step 1102.

At step 1105, the current execution contexts (values of various registers) are saved in the context field 1007 of the process control block 1002 indicated by "ctxproc" 1008.

At step 1106, a pointer to the process control block 1002 of the process having the highest priority in the system is stored in the "ctxproc" 1008. The process control block of the process having the highest priority in the system can be searched for by using the following procedure. Out of bidirectional ready queues stored in the ready queue header array 1001, a bidirectional ready queue having a queue length of at least 1 and having a minimum index value is first derived. The process control block 1002 queued at the head of that bidirectional ready queue becomes the derived process control block 1002. Here, the process specified by the argument "pid" of the "proc_raise" function and connected to the ready queue header array 1001 with the value of "raised" at the step 1102 is the process having the highest priority.

At step 1107, the execution context saved in the "context" field 1007 of the process control block derived at the step 1106 is restored. By the processing of the step 1107, process switching is caused and the restored process of the execution context is dispatched. If between the step 1104 and the step 1105 the process control block pointer of the process having the highest priority in the system is compared with contents of the "ctxproc" 1008 and both of them are the same, the processing of the steps 1105 through 1107 may be skipped.

The "proc_raise_cancel," "proc_raise_handoff," "proc_depress," and "proc_depress_cancel," functions can also be implemented by conducting ready queue operation similar to the steps 1101 through 1102, update of various fields of the process control block 1002 similar to the steps 1103 through 1104 (if necessary), saving of the execution context similar to the step 1105, and restoration of the execution context of the process having the highest priority in the system similar to the steps 1106 through 1107. The processing becomes similar to that of the "proc_raise" function and will not be described.

Figure 12:
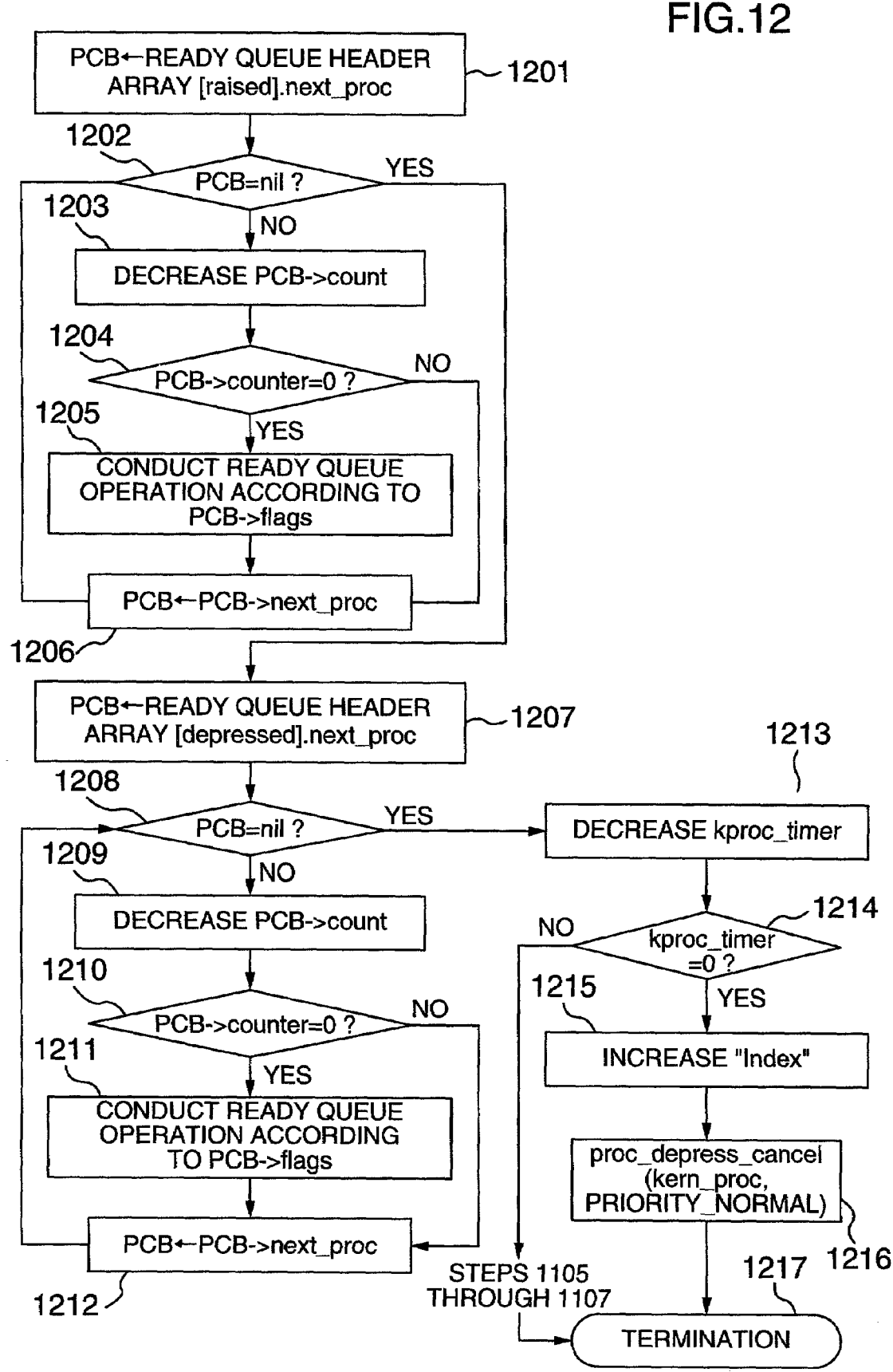
FIG. 12 is a flow chart of a timer interrupt handler.

In the case where the "proc_raise" function and the "proc_depress" function have been issued, it is necessary to determine whether the time specified by the argument "time" has elapsed since issuance of those functions. This determination is conducted in the timer interrupt handler 104 by using the "counter" field 1005 of the process control block. In addition, the timer interrupt handler 104 conducts drive processing of the periodic kernel process 101 as well. The processing flow of the timer interrupt handler 104 conducting them is shown in FIG. 12.

At step 1201, an element having the "raised" of the ready queue header array 1001 as the index is derived, and a pointer to a process control block 1002 stored in that element is substituted for a variable "PCB."

At step 1202, it is determined whether the value of the "PCB" updated at the step 1201 is a "nil" pointer. If it is a "nil" pointer, a jump to step 1207 is effected. Unless it is a "nil" pointer, a jump to step 1203 is effected.

At step 1203, the "counter" field 1005 of the process control block 1002 indicated by the "PCB" is decreased by one. In the case where "INFINITY" is stored in the "counter" field 1005 beforehand, however, nothing is conducted.

At step 1204, it is determined whether the value of the "counter" field 1005 of the process control block 1002 indicated by the "PCB" is 0. If the value of the "counter" field 1005 is 0, a jump to step 1205 is effected. If the value of the "counter" field 1005 is other than 0, a jump to step 1206 is effected.

At step 1205, ready queue operation is conducted according to the "flags" field 1006 of the process control block 1002 indicated by the "PCB." Specifically, the following operation is conducted. First of all, the process control block 1002 indicated by the "PCB" is dequeued from the bidirectional ready queue. In the case where "PRIORITY_NORMAL" is stored beforehand in the "flags" field 1006, an element having as the index a value stored in the "base_pri" field 1010 of the ready queue header array 1001 is then derived, and the process control block 1002 indicated by the "PCB" is enqueued at the end of a bidirectional ready queue having that element as the queue header. In the case where "PRIORITY_DEPRESSED" is stored beforehand in the "flags" field 1006, an element having as the index "depressed" of the ready queue header array 1001 is derived, and the process control block 1002 indicated by the "PCB" is enqueued at the end of a bidirectional ready queue having that element as the queue header.

At step 1206, the value of the "PCB" is updated to have the value of the next_proc field 1003 of the process control block 1002 indicated by the "PCB." Thereafter, a jump to the step 1202 is effected.

At step 1207, an element having the "depressed" of the ready queue header array 1001 as the index is derived, and a pointer to a process control block 1002 stored in that element is substituted for a variable "PCB."

At step 1208, it is determined whether the value of the "PCB" updated at the step 1207 is a "nil" pointer. If it is a "nil" pointer, a jump to step 1213 is effected. Unless it is a "nil" pointer, a jump to step 1208 is effected.

At step 1209, the "counter" field 1005 of the process control block 1002 indicated by the "PCB" is decreased by one. In the case where "INFINITY" is stored in the "counter" field 1005 beforehand, however, nothing is conducted.

At step 1210, it is determined whether the value of the "counter" field 1005 of the process control block 1002 indicated by the "PCB" is 0. If the value of the "counter" field 1005 is 0, a jump to step 1211 is effected. If the value of the "counter" field 1005 is other than 0, a jump to step 1212 is effected.

At step 1211, ready queue operation is conducted according to the "flags" field 1006 of the process control block 1002 indicated by the "PCB." Specifically, the following operation is conducted. First of all, the process control block 1002 indicated by the "PCB" is dequeued from the bidirectional ready queue. In the case where "PRIORITY_NORMAL" is stored beforehand in the "flags" field 1006, an element having as the index a value stored in the "base_pri" field 1010 of the ready queue header array 1001 is then derived, and the process control block 1002 indicated by the "PCB" is enqueued at the end of a bidirectional ready queue having that element as the queue header. In the case where "PRIORITY_RAISSED" is stored beforehand in the "flags" field 1006, an element having as the index "raised" of the ready queue header array 1001 is derived, and the process control block 1002 indicated by the "PCB" is enqueued at the end of a bidirectional ready queue having that element as the queue header.

At step 1212, the value of the "PCB" is updated to have the value of the "next_proc" field 1003 of the process control block 1002 indicated by the "PCB." Thereafter, a jump to the step 1208 is effected. At steps 1213 through 1216, drive processing of the periodic kernel process 101 is conducted. The periodic kernel process 101 is driven in the case where an event hereafter described has occurred.

(a) The CPU time to be allocated to the process group 915 has elapsed.

In accordance with the scheduling table 900, the periodic kernel process 101 supplies "times" 916 described in the table to process groups 915 one after another. When the "time" 916 supplied to a process group 915 has elapsed, the count of the "PCB" counter of the process having the priority of "raised" and belonging to that process group 915 becomes 0. By the steps 1204 and 1205, therefore, the priority of that process is changed to lower priority according to "PCB->flags." As a result, the periodic kernel process 101 having high priority next to the "raised" is driven. The periodic kernel process 101 changes the process group 915 to which the CPU should be allocated. In the case where there is not a process group 915 to which the CPU should be subsequently allocated, the periodic kernel process 101 changes its own priority to "depressed" and thereby carries out allocation of the CPU time to the normal process 109.

(b) Minimum interval of a process group 915 requesting allocation of the CPU (which is eight time slots in the example of FIG. 8 and hereafter abbreviated to "minimum interval") has elapsed.

In the case where there is not a process group 915 to which the CPU should be subsequently allocated, the periodic kernel process 101 changes the priority of its own process to "depressed" as described in (a). Each time the "minimum interval" elapses, however, it becomes necessary to allocate the CPU time to the process group 915 requesting the driving conducted at the "minimum interval"s. Therefore, the periodic kernel process 101 is driven at the "minimum interval" periods to allocate the CPU time to the corresponding process group.

The driving interval of the periodic kernel process 101 according to the "minimum interval" is managed by a variable "kproc_timer." When the scheduling table 900 is created by the "alloc_time_slot" function, this variable is initialized to the "minimum interval" by the scheduler.

At step 1213, the "kproc_timer" is decreased by one.

At step 1214, it is determined whether the value of the "kproc_timer" updated at the step 1213 is 0. The value of 0 indicates the driving invoking of the periodic kernel process 101 described above in (b). For the driving processing of the periodic kernel process 101, the "kproc_timer" is initialized again and thereafter a jump to step 1215 is effected.

In the case where the "kproc_timer" is other than 0, saving restoration processing of the execution context shown in steps 1105 through 1107 is executed. In the case where the CPU time to be allocated to the process group 915 has elapsed (i.e., in the case of (a) described above), the periodic kernel process 101 becomes the process holding the highest priority and the periodic kernel process 101 is driven by execution of the steps 1105 through 1107.

At step 1215, the "index" 914 of the scheduling table 900 is advanced to an entry having "OTHERS" stored in the field of the process group 915. For example, in the case where the "index" 914 indicates the entry of 906 in FIG. 9, the present step updates so that the "index" will indicate the entry of 907. Owing to the present step, the periodic kernel process 101 driven at step 1216 can start processing of allocating the CPU time to the process group 915 from the next entry with respect to the entry storing "OTHERS" in the field of the process group 915. In the case where the "index" 914 already indicates the entry storing "OTHERS" in the field of the process group 915, nothing is conducted.

At step 1216, the "proc_depress_cancel" ("kern_proc," "PRIORITY_NORMAL") function is called. The "kern_proc" represents the process ID of the periodic kernel process 101. If the priority of the periodic kernel process 101 is "depressed," the priority of the periodic kernel process 101 is changed from the "depressed" to the reference priority (high priority next to the "raised") by execution of the present function. If the priority of the periodic kernel process 101 is the reference priority, the priority is not changed by executing this function. At this time point, it is assured that a process having priority "raised" is not present. (The scheduling table 900 is set so that the CPU time will not be allocated to each process group 915 without waiting the driving invoking of the periodic kernel process 101.) Therefore, driving of the periodic kernel process 101 in the above described case (b) can be carried out.

In order to correctly decrease the count of the "PCB->counter" of the periodic process 102 at time slot intervals, the "PCB" of the periodic process 102 must be always connected to the ready queue. Therefore, such a wait that the "PCB" of the periodic process 102 is removed is inhibited. To prevent this, a method described in JP-A-8-226404 is used for mutual exclusion management between processes. As for the input/output, asynchronous input/output is entirely used.

Figure 13:
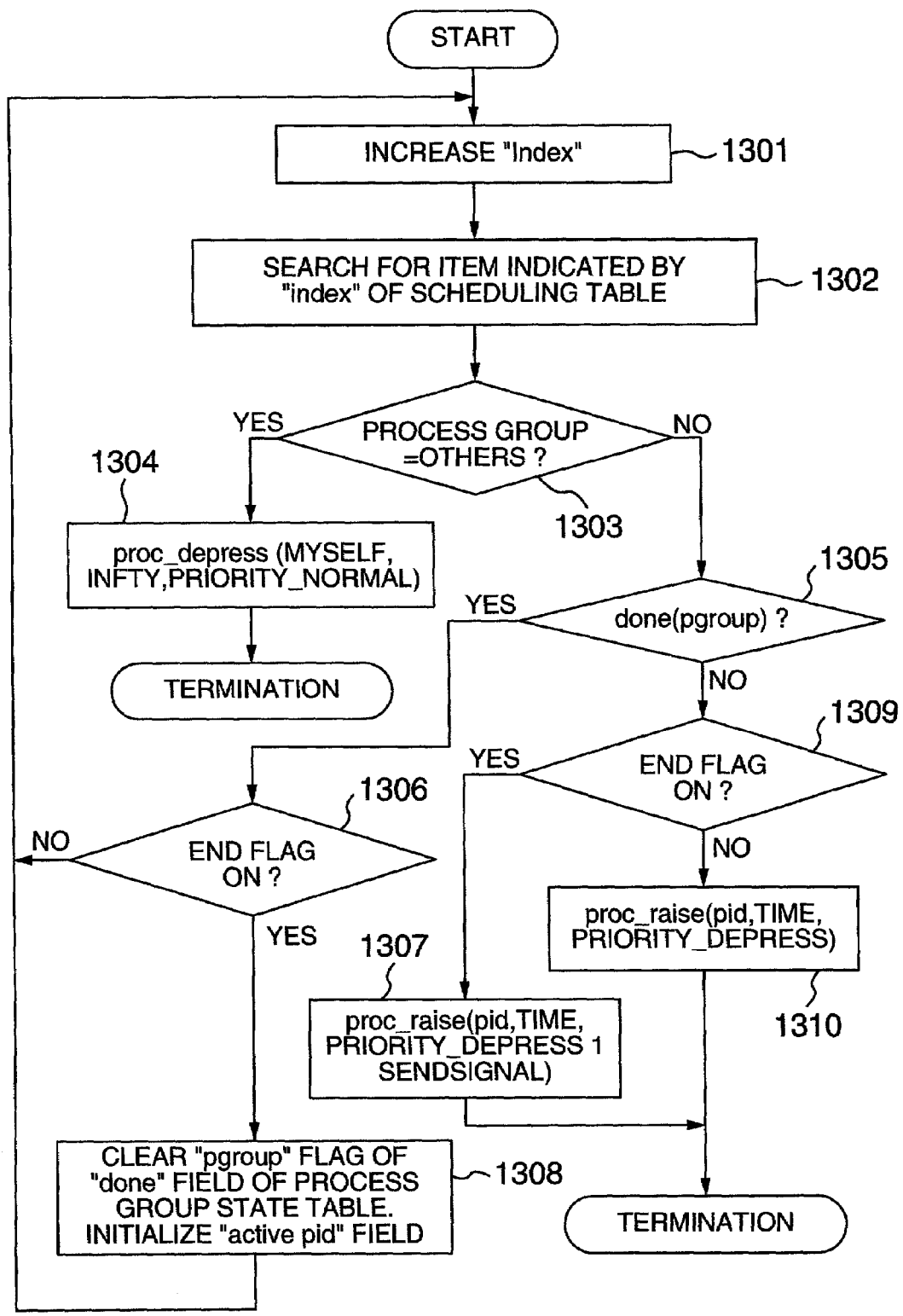
FIG. 13 is a flow chart of a periodic kernel process.

The flow chart of the operation of the periodic is shown in FIG. 13.

The periodic kernel process 101 is driven by the timer interrupt handler 104 at intervals each equal to the time 916 allocated to the process group 103 requesting the CPU allocation or the "minimum interval." In other words, the process which has been executing the timer interrupt handler 104 at that time wakes up the periodic kernel process 101. The periodic kernel process 101 operates with the reference priority.

At step 1301, the "index" 914 of the scheduling table 900 is increased by a value corresponding to one entry. The "index" 914 of the scheduling table 900 indicates an entry representing a process group 915 to which the CPU should be subsequently allocated by the periodic kernel process 101.

At step 1302, the entry of the scheduling table 900 indicated by the "index" 914 is searched for.

At step 1303, it is determined whether the field of the process group 915 of the entry obtained at the step 1302 contains "OTHERS."

If the process group 915 contains "OTHERS," the "proc_depress (MYSELF, INFINITY, PRIORITY_NORMAL)" function is called at step 1304. As a result, the periodic kernel process 101 has priority "depressed" until the "proc_depress_cancel" function is isssued. Each time the "minimum interval" of the process group 103 requesting the periodic allocation of the CPU elapses, the "proc_depress_cancel" function is isssued from the timer interrupt handler 104. Until then, the normal process 109 which does not conduct the continuous media processing (i.e., a process which does not request the periodic scheduling by using the "alloc_time_slot" function) is subjected to scheduling.

Figure 14:
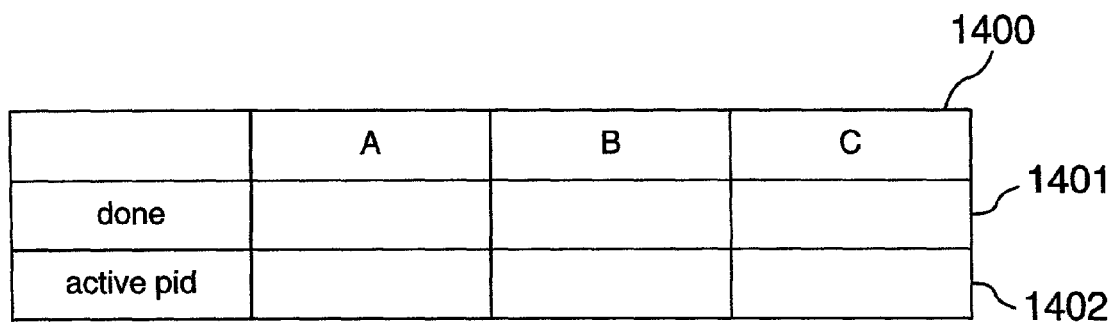
FIG. 14 is a diagram showing the configuration of a scheduling table.

If the process group 915 does not contain "OTHERS," it is determined at step 1305 whether the process group 915 to which the CPU should be subsequently allocated has completed the execution corresponding to one period. This is judged by using a flag of a "done" field 1401 of a process group state table 1400 as shown in FIG. 14. The "done" field 1401 is a field for describing whether the execution corresponding to one period has been completed, for each of process groups 103 requesting the periodic scheduling by using the "alloc_time_slot" function. A periodic process 102 belonging to a process group 103 requesting the periodic scheduling issues the "proc_raise_cancel" function to its own process when the execution corresponding to one period has been completed as described afterwards. The "done" flag of the process group 103 that the periodic process 102 which has called this function belongs to is set within the processing routine of this function.

In the case where the process group 915 of the entry obtained at the step 1302 has completed the execution corresponding to one period, the end flag 917 of that entry is searched for at step 1306.

If the end flag 917 is "FALSE," a return to step 1301 is effected.

If the end flag 917 is "TRUE," a corresponding flag of the "done" field 1401 of the process group state table 1400 is cleared at step 1308. In addition, an "active pid" field 1402 is also initialized. This initializing method will be described below. Thereafter, a return to the step 1301 is effected.

In the case where the execution correpsonding to one period has been judged uncompleted at the step 1305, the end flag 917 of the entry obtained at the step 1302 is inspected at step 1309.

If the end flag 917 is "TRUE," "proc_raise (pid, TIME, PRIORITY_DEPRESS | SENDSIGNAL)" is issued at step 1307. In the "pid," the process ID stored in the "active pid" field 1402 of the process group state table 1400 is used. In the "TIME," the value of the time field 916 of the entry is used. The "active pid" field 1402 of the process group state table 1400 represents which periodic process 102 belonging to the process group 103 is now executing the continuous media processing. Immediately after this step, the periodic process 102 specified by the "pid" is scheduled over the time specified by the "TIME."

At step 1308, the corresponding entry is initialized. At step 1308, the entry in the "active pid" field 1402 corresponding to the process group 915 selected at the step 1302 is initialized to have the process ID of the group master of that process group 915. Furthermore, if the "proc_raise_handoff" function is issued, in that processing routine the corresponding entry of the "active pid" field 1402 is updated to have a process ID of the handoff destination. If the "proc_raise_cancel" function is issued and the end flag 917 is "TRUE," in that processing routine the corresponding entry of the "active pid" field 1402 is initialized.

If the end flag 917 is judged to be "FALSE" at the step 1309, "proc_raise (pid, TIME, PRIORITY_DEPRESS)" is issued at step 1310 and processing is terminated. The method for setting the "pid" and "TIME" is similar that of the step 1307. In this case as well, the periodic process 102 specified by the "pid" is scheduled over the time specified by the "TIME" immediately after this step.

Figure 15:
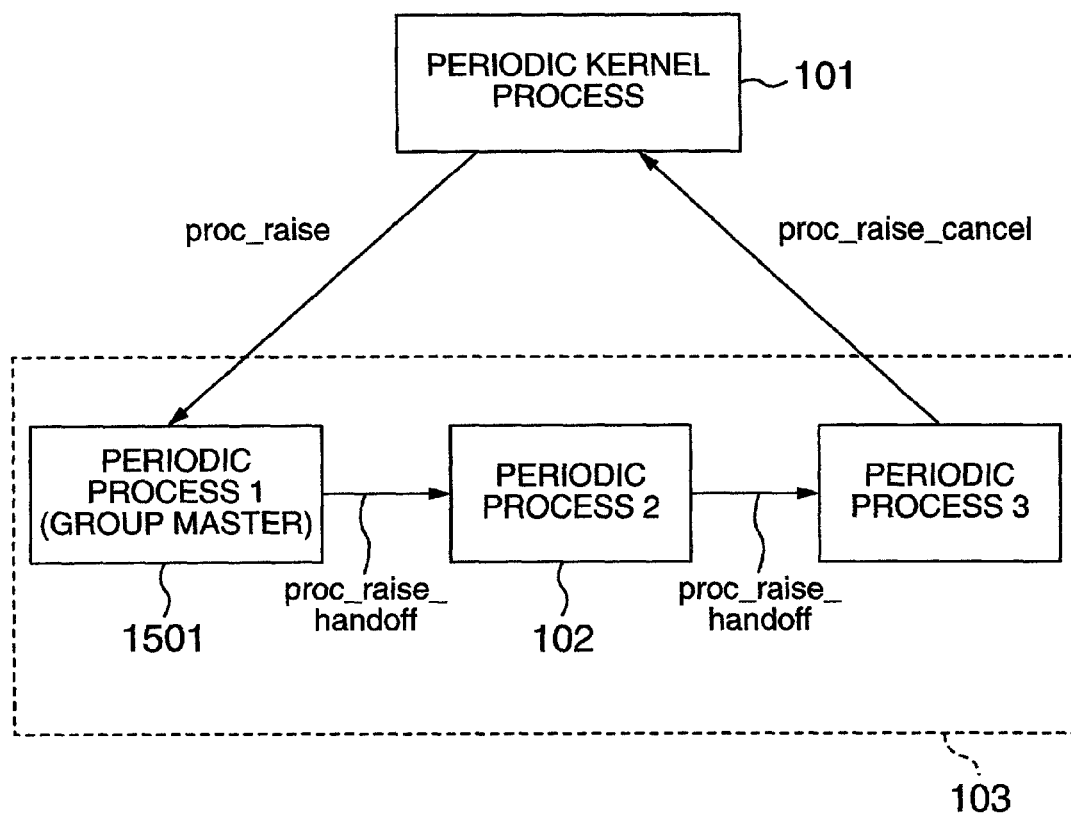
FIG. 15 is a diagram showing the flow of wakeup of continuous media processing process.

Operation of the periodic processes 102 belonging to the process group 103 requesting the periodic scheduling is shown in FIGS. 15 through 17.

FIG. 15 is a diagram showing the wakeup sequence of periodic processes 102 belonging to a process group 103.

The processing order of periodic processes 102 belonging to a process group 103 is predetermined. A group master process 1501 of the process group 103 is made "raised" in priority by the "proc_raise" function of the periodic kernel process 101 to conduct wakeup. By using the "proc_raise_handoff" function, each process 102 belonging to the process group 103 gives its priority to the next periodic process 102 in order. The priority of its own process 102 after inheritance becomes "depressed." By using the "proc_raise_cancel" function, the last periodic process 102 in order completes execution corresponding to one period.

FIG. 16 is a program showing the operation of the group master process 1501.

In a 1601st line, a process group 103 having its own process as the group master process 1501 is created. Thereafter, this process group 103 becomes the unit of scheduling.

In a 1602nd line, it is requested to allocate the CPU time specified by "length" at intervals specified by "interval" to the process group 103 created in the 1601st line. After issuance of this function, the "proc_raise" function is issued to the group master process 1501 by the periodic kernel process as shown in FIG. 15.

A 1603rd line through a 1606th line form a loop for conducting the continuous media processing. After the continuous media processing corresponding to one period has been conducted, the "proc_raise_handoff" function is called and the priority of a process 102 belonging to the process group 103 created in the 1601st line to be subsequently processed is set to "raised" in the 1605th line. The priority of its own process becomes "depressed."

If the execution loop of the continuous media processing has been executed a predetermined number of times, the CPU time allocation request issued in the 1602nd line is canceled in a 1607th line.

Furthermore, in a 1608th line, the process group 103 created in the 1601st line is deleted.

FIG. 17 is a program showing the operation of the slave process 102.

A 1702nd line through a 1704th line form a loop for conducting the continuous media processing.

After the continuous media processing corresponding to one period has been conducted, the "proc_raise_handoff" function is called and the priority of a process 102 belonging to the process group 103 created in the 1601st line to be subsequently processed is set to "raised" in the 1703rd line. The priority of its own process becomes "depressed." However, the last periodic process 102 in order issues the "proc_raise_cancel" function and changes the priority of its own process to "depressed" in the 1704th line. If the execution loop of the continuous media processing has been executed a predetermined number of times, the program is terminated.

In the case where the execution corresponding to one period has not been completed in the CPU allocation time corresponding to one period, a timeout signal is transmitted to the process 102 registered in the "active pid" field 1402 of the process group state table 1400. In addition, a flag indicating "IN_SIFNAL_TRANSACTION" set in the flag in the "done" field 1401 of the process group table 1400.

As for the process group 103 having this flag set therein, the execution end judgment of the process group 915 at the step 1305 is always "TRUE." Furthermore, clearing the "done" field 1401 at the step 1308 is not conducted either. In other words, the signal handler is scheduled and executed with the reference priority of the periodic process 102 in the same way as the normal process 109. As a result, it can be assured that the processing delay of one stream does not affect the processing of another stream.

According to the first embodiment, a single periodic kernel process 101 conducts periodic scheduling of all process groups 103 on the basis of the scheduling table 900. Therefore, the execution of the periodic process 102 is not delayed due to occurrence of access contention among a plurality of process groups 103 for the CPU time. Furthermore, after the execution priority of a periodic process 102 has been changed, wakeup of the periodic process depending upon the process dispatch is conducted. As compared with the case a periodic process is waked up via interprocess communication, therefore, the overhead caused by the wakeup notice is reduced. Furthermore, the signal handler processing for a process which has exhausted the specified CPU time and caused timeout is executed with the reference priority of that process. Therefore, the signal handler processing is prevented from causing an execution delay of another process group.

Second Embodiment

Figure 18:
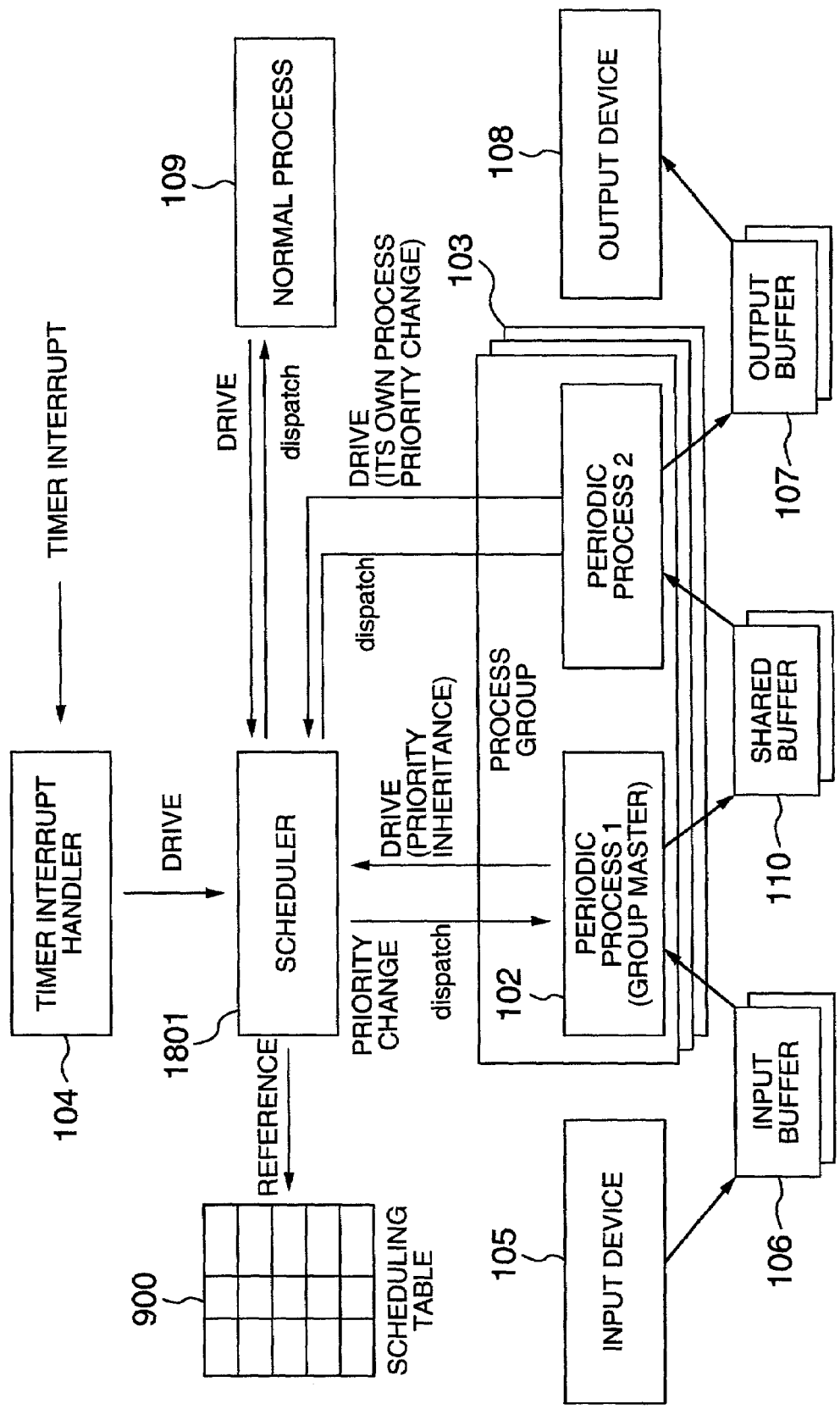
FIG. 18 is a diagram showing process wakeup and data flow in a scheduling method according to another embodiment of the present invention.

In the first embodiment, process switching is conducted from the process executing the timer interrupt handler 104 to the periodic kernel process 101 at intervals each equal to the "time" 916 allocated to the process group 103 or the "minimum interval." At this time, therefore, the overhead of the process switch intervenes. In a second embodiment, a module (hereafter referred to as scheduler) for controlling the process scheduling instead of the periodic kernel process 101 is installed, and the timer interrupt handler 104 and the scheduler are executed in the same process. Thereby, the overhead of the process switch from the timer interrupt handler 104 to the periodic kernel process 101 is reduced. The configuration of a system for implementing the present invention by using the scheduler is shown in FIG. 18. While the operation of the scheduler in the present embodiment will be described afterwards by referring to FIG. 20, it is different from the operation of the conventional scheduler shown in the steps 1105 through 1107.

In the system, one scheduler 1801 is present. The scheduler changes the priority of the periodic process, determines a process to be subsequently scheduled, and conducts the dispatch operation of that process. The scheduler is periodically called by a timer interrupt handler 104. In addition, also when a periodic process 102 conducting the continuous media processing gives the priority to the next periodic process 102 in processing order, and when the last process 102 in processing order completes the execution corresponding to one period and changes the priority of its own process, the scheduler is called in the processing routine of each function. Theses scheduler calling methods will be described in detail afterwards.

In the same way as the first embodiment, periodic processes 102 which process the same continuous media processing data form a process group 103. The creation and deletion of the process group 103 are conducted by using the above described "create_proc_group" and "destroy_proc_group" functions. A periodic process 102 which is the first in processing order in the process group 103 reads continuous media data from an input device 105 via an input buffer 106, and works upon the data. The worked data are delivered to a periodic process 102 which is the next in processing order via a shared buffer 110. A periodic process 102 which is the last in processing order outputs data to an output device 108 via an output buffer 107.

A process group 103 becomes the unit of scheduling. By using the above described "alloc_time_slot" function at the time of its initializing, a group master process of the process group 103 reserves allocation of the CPU to the process group 103 over a specified time at intervals each equal to a specified period. If allocation of the CPU time has become unnecessary, the group master calls the above described "dealloc_time_slot" function and cancels its reservation.

If the "alloc_time_slot" function is called, the scheduler determines the CPU allocation sequence so as to satisfy the period and execution time per period requested by each process group, and creates a scheduling table 900. This creation algorithm was described with reference to the first embodiment.

On the basis of the scheduling table 900, the scheduler 1801 conducts scheduling of each periodic process 102. Upon arrival at the time when the CPU should be allocated to the process group 103, the scheduler 1801 sets the priority of the group master process of that process group 103 to "raised." (In other words, the scheduler 1801 calls the above described "proc_raise" function.) Upon elapse of the specified time since the priority of the group master process has become "raised," the scheduler 1801 called by the timer interrupt handler 104 sets the priority of the periodic process 102 having the priority set to "raised" among the periodic processes belonging to the process group 103 to "depressed." This method of calling the scheduler from the timer interrupt handler and operation of the scheduler will be described in detail afterwards. Over the time during which the CPU should be allocated to the process group 103, any user process which does not belong to the process group 103 is not scheduled so long as a periodic process 102 belonging to the process group 103 having the priority set to "raised" is in the executable state. Over the time during which the CPU should not be allocated, any periodic process 102 belonging to the process group 103 is not scheduled. A CPU time which is not allocated to any process group 103 is allocated to the normal process 109 or an idle process.

As described above, the scheduler 1801 can be called by the timer interrupt handler 104 or a periodic process 102 requesting a priority change of its own process or another process. The form of a command list used to call the scheduler is shown in FIG. 19.

Figure 19:
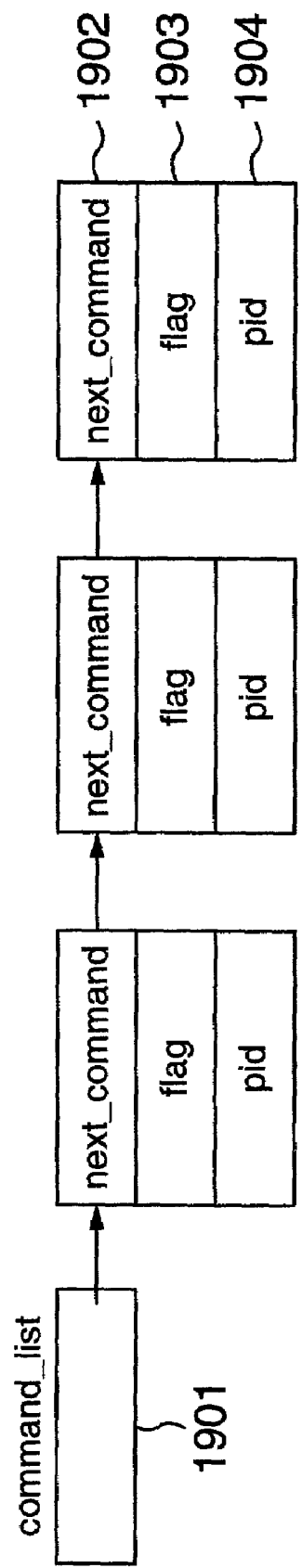
FIG. 19 is a diagram showing the configuration of a command list.

The timer interrupt handler 104 or a periodic process 102 attempting to call the scheduler 1801 specifies a pointer 1901 to an entry located at the head of the command list shown in FIG. 19, as the argument of its calling function. The command list shows scheduler operation orders in a list form. Each entry of the command list is formed by a "next_command" field 1902, a "flag" field 1903, and a "pid" field 1904. In the "next_command" field 1902, a pointer to the next entry is stored. The value of the "next_command" field of the entry located at the end of the list is "nil." In the "flag" field, "HANDOFF," "CANCEL," "INTERVAL," or "TIMER" can be specified. The "pid" field has a meaning only when the "flag" field holds "HANDOFF."

Each time the timer interrupt handler 104 conducts driving, it delivers a command list having an entry with "TIMER" stored in the "flag" to the scheduler 1801. At intervals each equivalent to the "minimum interval" of the process group 103 requesting the CPU allocation, the timer interrupt handler 104 also delivers an entry having "INTERVAL" stored in the "flag" to the scheduler besides the above described entry. Therefore, it is necessary for the timer interrupt handler 104 to judge the "minimum interval" by using the above described "kproc_timer."

In the case where a periodic process 102 gives its priority to the next periodic process in processing order, it delivers a command list having an entry with "HANDOFF" stored in the "flags" and an ID of the next periodic process 102 in processing order stored in the "pid" to the scheduler.

In the case where the last periodic process 102 in processing order completes the execution corresponding to one period and changes the priority of its own process to "depressed," the last periodic process delivers a command list having an entry with "CANCEL" stored in "flags" to the scheduler.

Figure 20:
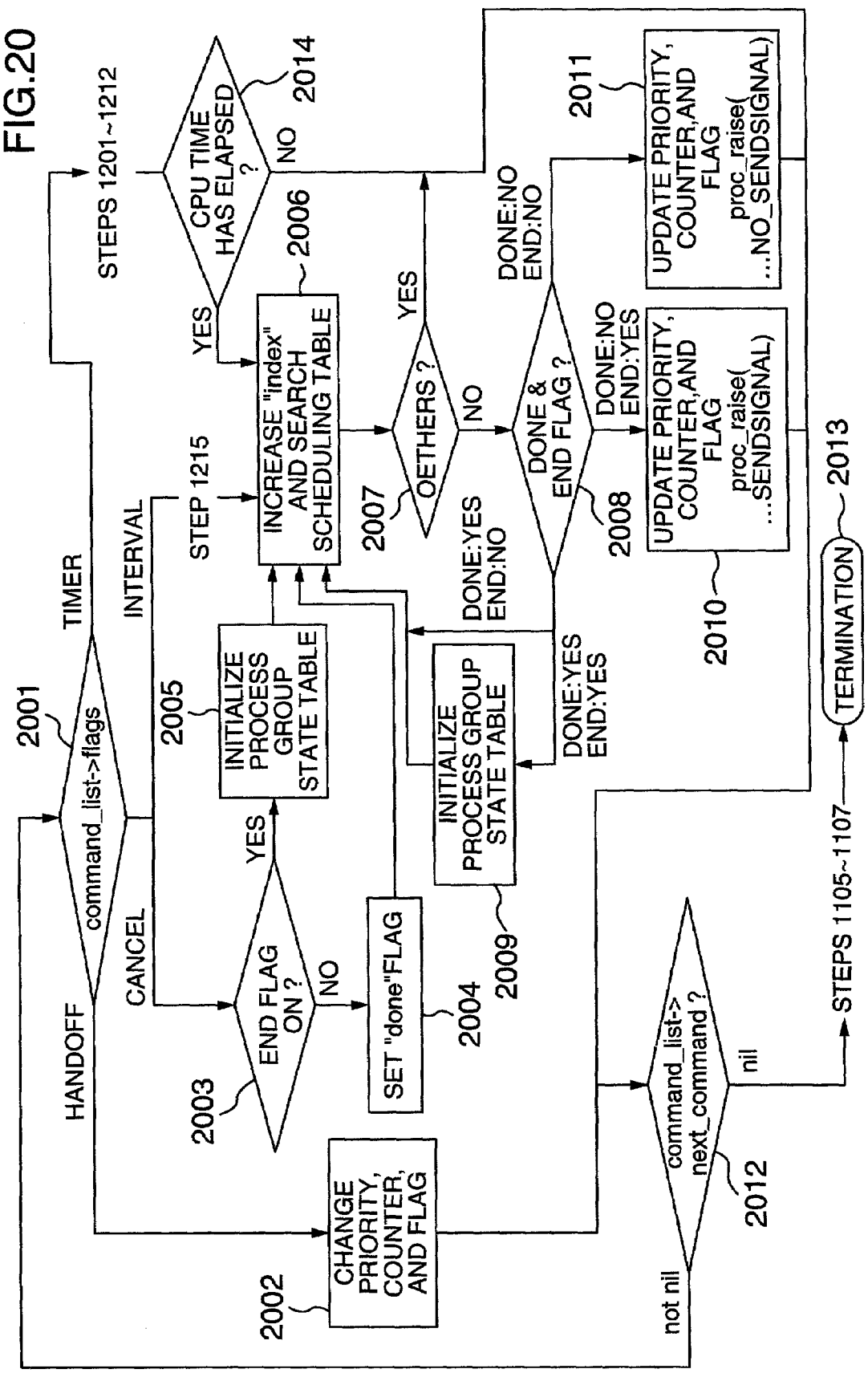
FIG. 20 is a flow chart of a scheduler.

Finally, the operation flow of the scheduler which receives the above described command list and conducts driving will now be described by referring to FIG. 20.

At step 2001, the scheduler searches for the "flag" field of an entry located at the top of the delivered command list. If the "flag" field indicates "HANDOFF," a jump to step 2002 is effected. If the "flag" field indicates "CANCEL," a jump to step 2003 is effected. If the "flag" field indicates "INTERVAL," the step 1215 is executed and then a jump to step 2006 is effected. If the "flag" field indicates "TIMER," the steps 1201 through 1212 are executed. If at step 2014 the process is a process the "PCB->counter" of which has been judged to be 0, i.e., a process for which the CPU time 916 allocated to the process group 915 has elapsed, and the "flag" field indicated by the "next_command" does not hold the "INTERVAL," a jump to step 2006 is effected. In the case where this condition is not satisfied, a jump to step 2012 is effected.

At step 2002, the priority of the periodic process 1202 functioning as the inheritance source of the priority, the priority of the periodic process 1202 functioning as the inheritance destination, and the counter field 1005 and the flag field 1006 in the process control block 1002 are updated. This updating method becomes similar to the flow chart shown in FIG. 11, and consequently it will not be described. Then, a jump to the step 2012 is effected.

At step 2003, the end flag 917 of a process group to which the CPU time has been allocated immediately before the wakeup of the scheduler (an entry indicated by the index 914 of the scheduling table 900) is searched for. If the end flag 917 is ON, a jump to step 2005 is effected. If the end flag 917 is OFF, a jump to step 2004 is effected.

At step 2004, the "done" field 1401 of the corresponding entry of the process group state table 1400 is set, and a jump to the step 2006 is effected.

At step 2005, the same operation as the step 1308 is conducted and a jump to the step 2006 is effected.

At step 2006, the same operation as the steps 1301 through 1302 is conducted and a jump to the step 2007 is effected.

At step 2007, it is inspected whether the field of the process group 915 of the entry obtained at the step 2006 indicates "OTHERS." If it indicates "OTHERS," a jump to step 2012 is effected. If it indicates something other than "OTHERS", a jump to step 2008 is effected.

At step 2008, the end flag 917 of the entry indicated by the index 914 increased at the step 2006 and the "done" field 1401 of the process group state table 1400 corresponding to that entry are searched for. If both bits are set, a jump to step 2009 is effected. If only the "done" field is set beforehand, a jump to step 2006 is effected. If only the end flag is set beforehand, a jump to step 2010 is effected. If both the "done" field and the end flag are cleared beforehand, a jump to step 2011 is effected.

At step 2009, the same operation as the step 1308 is conducted and a jump to step 2006 is effected.

At step 2010, the priority of the periodic process 102 functioning as the group master process 1501 of the process group 103 registered in the entry which is in turn indicated by the index 914 is changed to the "raised" over a time specified by the "time" field 916 of the entry, and the priority of the process and the "counter" field 1005 and the "flag" field 1006 of the corresponding process control block 1002 are updated in order to transmit a signal after an elapse of that time. This updating method becomes similar to the flow chart shown in FIG. 11 and consequently it will be omitted. Thereafter, a jump to the step 2012 is effected.

At step 2011, the priority of the periodic process 102 functioning as the group master process 1501 of the process group 103 registered in the entry which is in turn indicated by the index 914 is changed to the "raised" over a time specified by the "time" field 916 of the entry, and the priority of the process and the "counter" field 1005 and the "flag" field 1006 of the corresponding process control block 1002 are updated in order to transmit a signal after elapse of that time. This updating method becomes similar to the flow chart shown in FIG. 11 and consequently it will be omitted. Thereafter, a jump to the step 2012 is effected.

At the step 2012, the "next_command" field of the entry processed at the steps 2001 through 2011 is searched for. If that value is not "nil," a jump to the step 2001 is effected. If that value is "nil," the steps 1105 through 1107 are executed and thereafter termination is conducted.

Third Embodiment

If a number of asynchronous events such as arrival of network packets occur while the system is operating according to the scheduling method of a periodic process of the first or second embodiment, then execution of the periodic process 102 is obstructed and the jitter of the driving period interval of the periodic process 102 becomes large. In other words, asynchronous event processing such as receiving processing of network packets requires response performance of some degree. If the asynchronous event processing takes preference and the priority of the process conducting that processing is made higher than that of the periodic process 102, a delay might be incurred in the execution time of the periodic process 102. In the third embodiment, the interrupt handler conducting the processing of receiving the network packets is provided with a hierarchical structure. In the timer interrupt handler 104, the periodic kernel process 101, the scheduler 1801, and the process group 103 of the first and second embodiments, there are no changes. The third embodiment is carried out so as to reinforce the first or second embodiment. By taken an interrupt handler conducting the processing of receiving the network packets as an example of the asynchronous interrupt handler, the configuration and operation method of the interrupt handler will hereafter be described.

Figure 21:
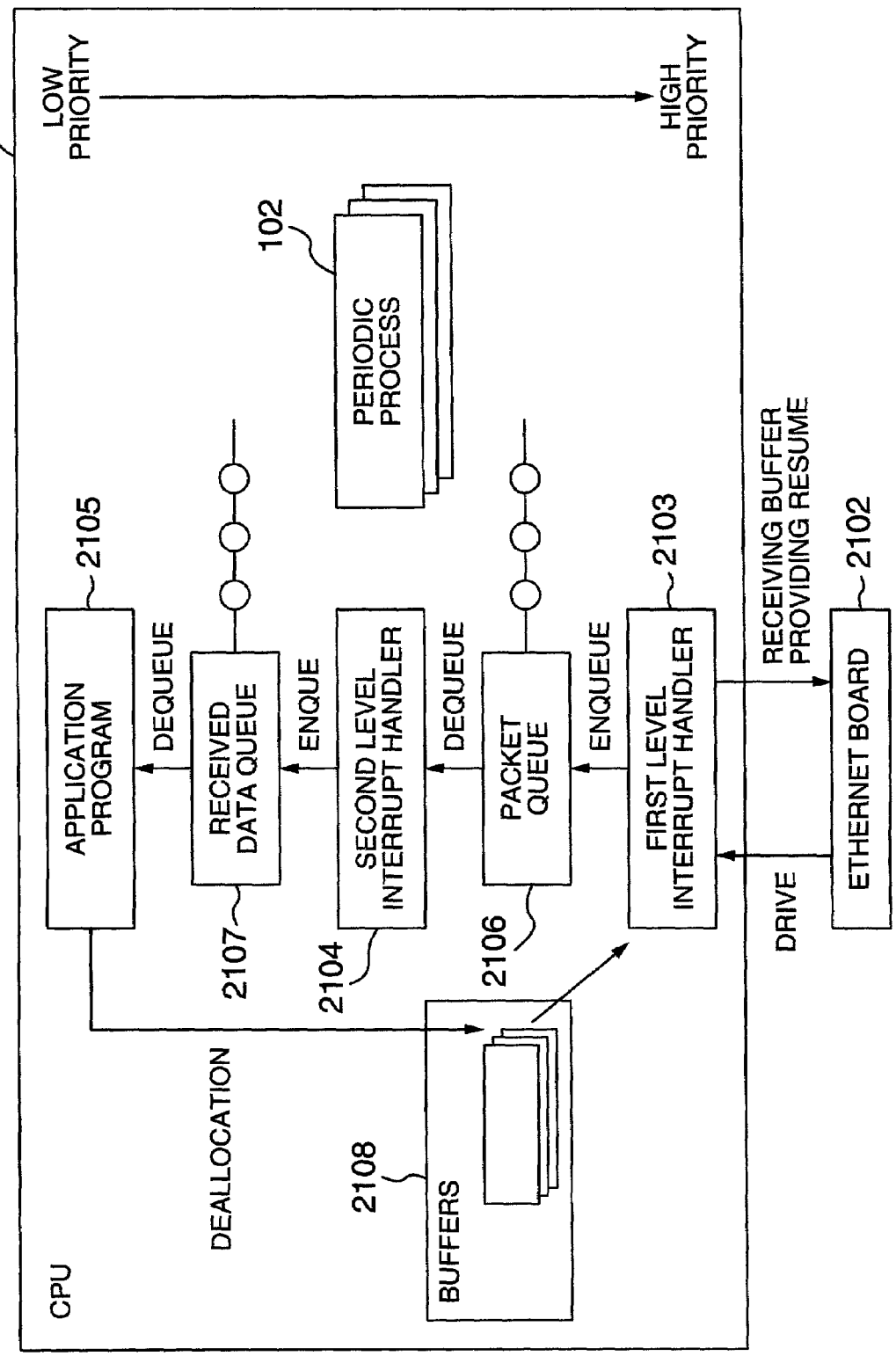
FIG. 21 is a diagram showing the configuration of a network packet receiving system according to another embodiment of the present invention.

FIG. 21 shows the configuration of the system around the present interrupt handler and the configuration of the interrupt handler. The timer interrupt handler 104, the periodic kernel process 101, and the scheduler 1801 are not illustrated.

The present system includes a CPU 2101 and an ethernet board 2102 as hardware. Upon receiving a packet, the ethernet board 2102 functions to notify the CPU 2101 of arrival of the packet and drive, on the CPU 2101, a routine (interrupt handler) for conducting packet receiving processing. Besides a first level interrupt handler 2103 driven by packet receipt, a second level interrupt handler 2104 and an application program 2105 are provided on the CPU 2101. As one of the periodic processes, the second level interrupt handler 2104 is periodically driven by the periodic kernel process 101 or the scheduler 1801 according to the above described scheduling method. The application program 2105 is a business program for processing the received packet, and it is run by a periodic process 102 or the normal process 109.

Figure 22:
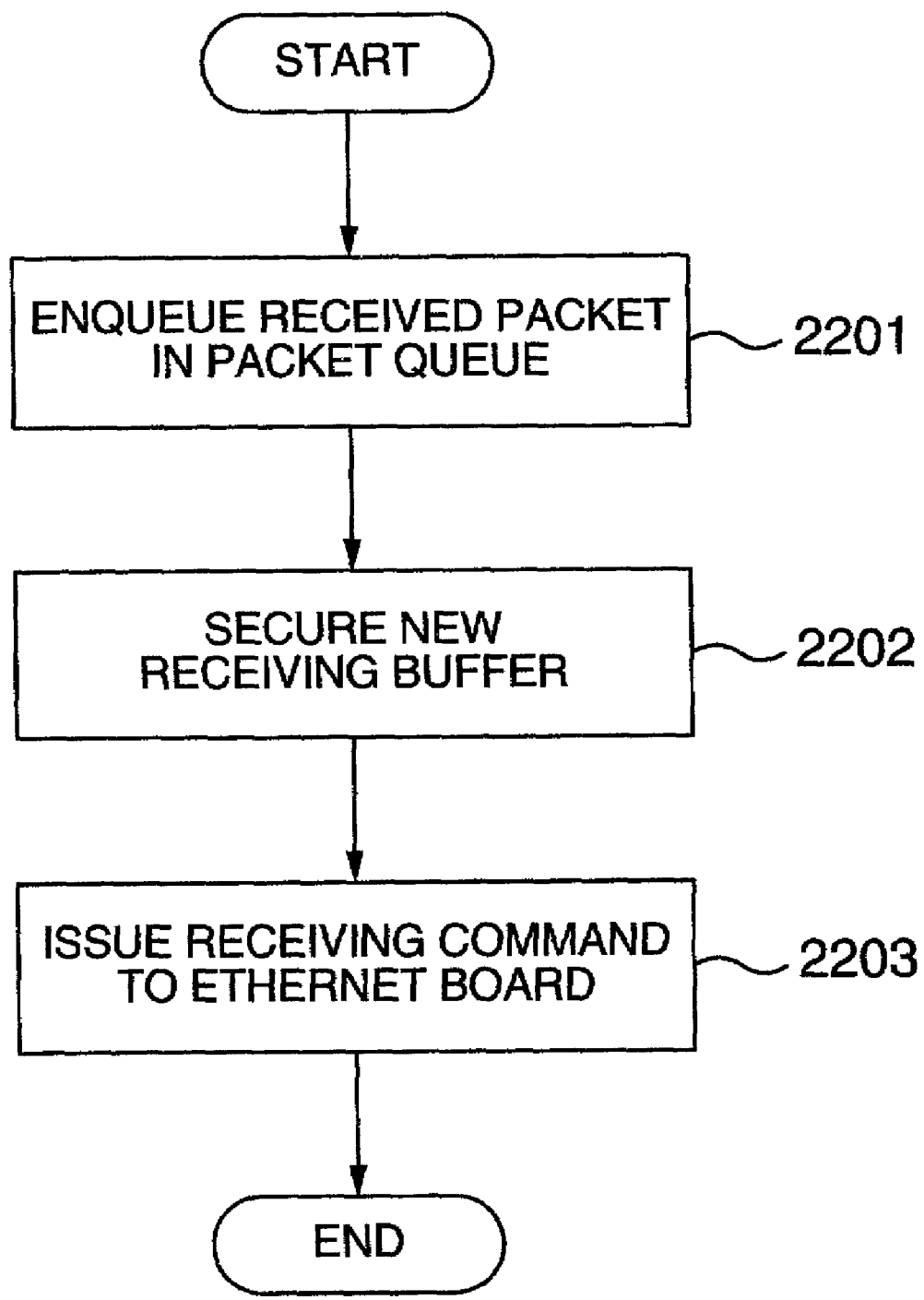
FIG. 22 is a flow chart of first level interrupt handler.

The operation flow of the first level interrupt handler 2103 is shown in FIG. 22.

As described above, the first level interrupt handler 2103 is driven upon a notice of packet arrival given by the ethernet board 2102. At step 2201, the received packet is first enqueued in a packet queue 2106. At step 2202, one receiving buffer is secured out of free buffers 2108. At step 2203, a command requesting the receiving buffer secured at the step 2202 to receive packets is issued to the ethernet board 2102. In other words, all that the first level interrupt handler 2103 performs is to secure the receiving buffer and prepares for packet receiving, and the first level interrupt handler 2103 does not conduct at all the processing of referring to information stored in the receiving buffer. The ethernet board 2102 cannot receive packets which arrive until execution of the step 2203 since notification of packet arrival. Because the address of the receiving buffer which should store received packets is not specified by the first interrupt handler 2103. If a packet arrives during that time, therefore, the ethernet board 2102 fails in packet receiving and that packet is lost, but that time is limited to a minimum.

The second level interrupt handler 2104 is periodically driven with the specified period. A packet enqueued by the first level interrupt handler 2103 and linked to the packet queue 2106 is dequeued, and protocol processing is conducted by referring to the dequeued packet. If received data to be delivered to the application program 2105 are obtained as a result of this protocol processing, the received data are enqueued in a received data queue 2107. Therefore, the second level interrupt handler 2104 is scheduled simply as one of periodic processes 102 belonging to a certain process group 103.

The application program 2105 functions to dequeue the received data enqueued in the received data queue 2107 and deallocate the receiving buffer storing the received data.

In the case where a packet has arrived during execution of a periodic process 102, the execution of the periodic process is suspended and execution of the first interrupt handler 2103 is started. By conducting the execution of the first interrupt handler 2103 with the highest priority, loss of a packet is prevented from being caused due to a failure of the ethernet board 2102 in receiving a packet. In other words, by applying the third embodiment to the first or second embodiment, the probability of the packet loss and the execution delay of the periodic process 102 are reduced and both of these advantages are reconciled as compared with the conventional case where the first level interrupt handler 2103 and the second level interrupt handler 2104 are processed by one packet receiving interrupt handler.

The second level interrupt handler 2104 is scheduled as a periodic process 102. Until the time when the CPU 2101 is allocated to its own process is reached, therefore, the second level interrupt handler 2104 does not start the execution even if the packet queue has a packet queued therein. Immediately upon completion of the execution of the first level interrupt handler 2103, therefore, the execution of the periodic process is resumed. By thus providing the interrupt handler with a hierarchical structure, the execution suspension time of the periodic process 102 caused by arrival of a packet can be suppressed to only the execution time of the first level interrupt handler 2103.

Furthermore, the second level interrupt handler 2104 is assured of periodic driving. Until a time corresponding to the driving period elapses since arrival of a packet, therefore, the second level interrupt handler 2104 is driven at least once without fail. In other words, the upper limit of the time required until a packet is enqueued in the received data queue 2107 since arrival of the packet becomes also the driving period of the second level interrupt handler 2104. Thus the response performance of the network packet receiving processing can also be assured.

The periodic process scheduling method according to the first through third embodiments of the present invention have been described in detail. The program for executing the scheduling method in each embodiment is stored in a recording medium such as a hard disk or a CD-ROM as the OS of the computer to be used. Alternatively, the process scheduling program according to the present invention may be downloaded into a resident memory from an external server.

Hereinafter, the forth embodiment (embodiment 4) of the present invention will be explained in detail with reference to FIGS. 23 to 30. Constituent elements relating to the present invention will be first described briefly and then a processing procedure and a data structure will be explained in detail.

A network (LAN) dealt with in the present invention and the system constituent elements of both hardwares and softwares will be explained initially.

Figure 23:
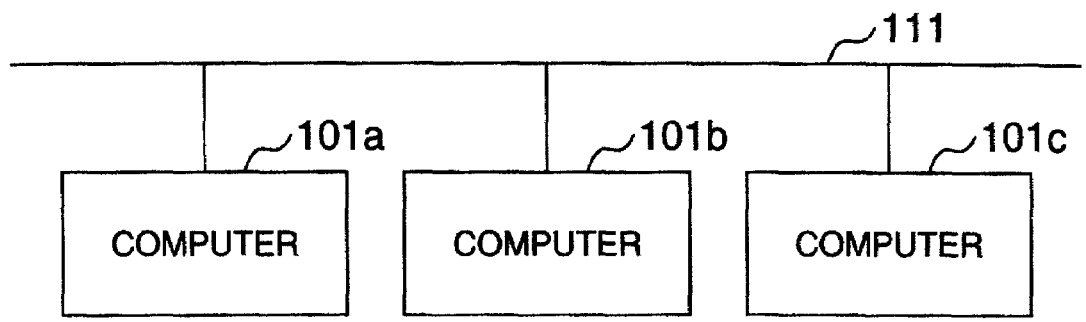
FIG. 23 is an explanatory view of constituent elements of a LAN according to the embodiment 4 of the present invention.

FIG. 23 depicts the connection state of the LAN constituent elements in the present invention. At least two computers (three, in the embodiment shown in FIG. 23) 101a, 101b and 101c are connected in the LAN through an Ethernet 111 which is a CSMA/CD system network having a re-transfer function.

Figure 24:
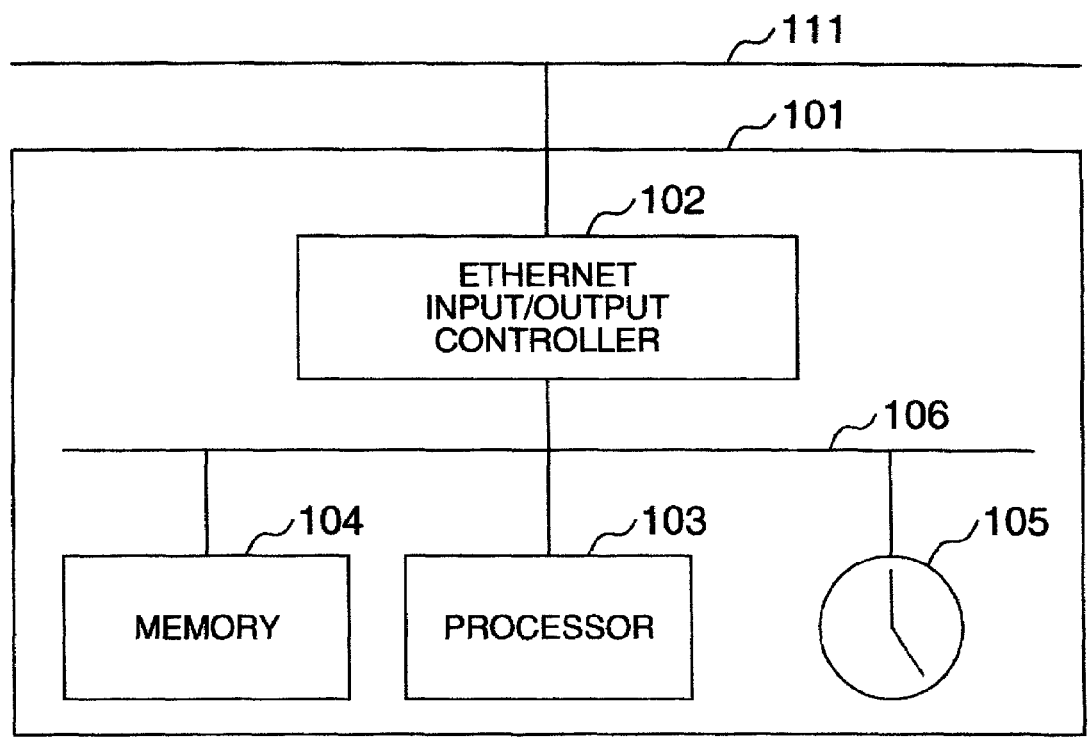
FIG. 24 is an explanatory view of hardware constituent elements.

FIG. 24 shows the hardware constituent elements in this embodiment. The computer 101 represents the hardware configuration of the computers 110a, 101b and 101c shown in FIG. 23. A processor 103, a main memory 104, an external timer 105 and an Ethernet input/output controller 102 are connected to one another in this computer 101 through a bus 106. The network 111 is connected to the Ethernet input/output controller 102.

The Ethernet input/output controller has a DMA transfer function and transfers the data between the main memory 104 and the Ethernet input/output controller 102 in accordance with a command from the processor 103. The command from the processor 103 to the Ethernet input/output controller 102 is given as an input/output command on the main memory 104. The Ethernet input/output controller 102 has a function of collectively processing a command chain formed by connecting a plurality of input/output commands by a pointer. The Ethernet input/output controller 102 has a function of generating an external interrupt to the processor when a processing of a series of input/output commands is completed.

The external timer 105 has a function of generating in a predetermined interval an external interrupt to the processor 103, and this interrupt time interval can be controlled by an operating system OS.

Figure 25:
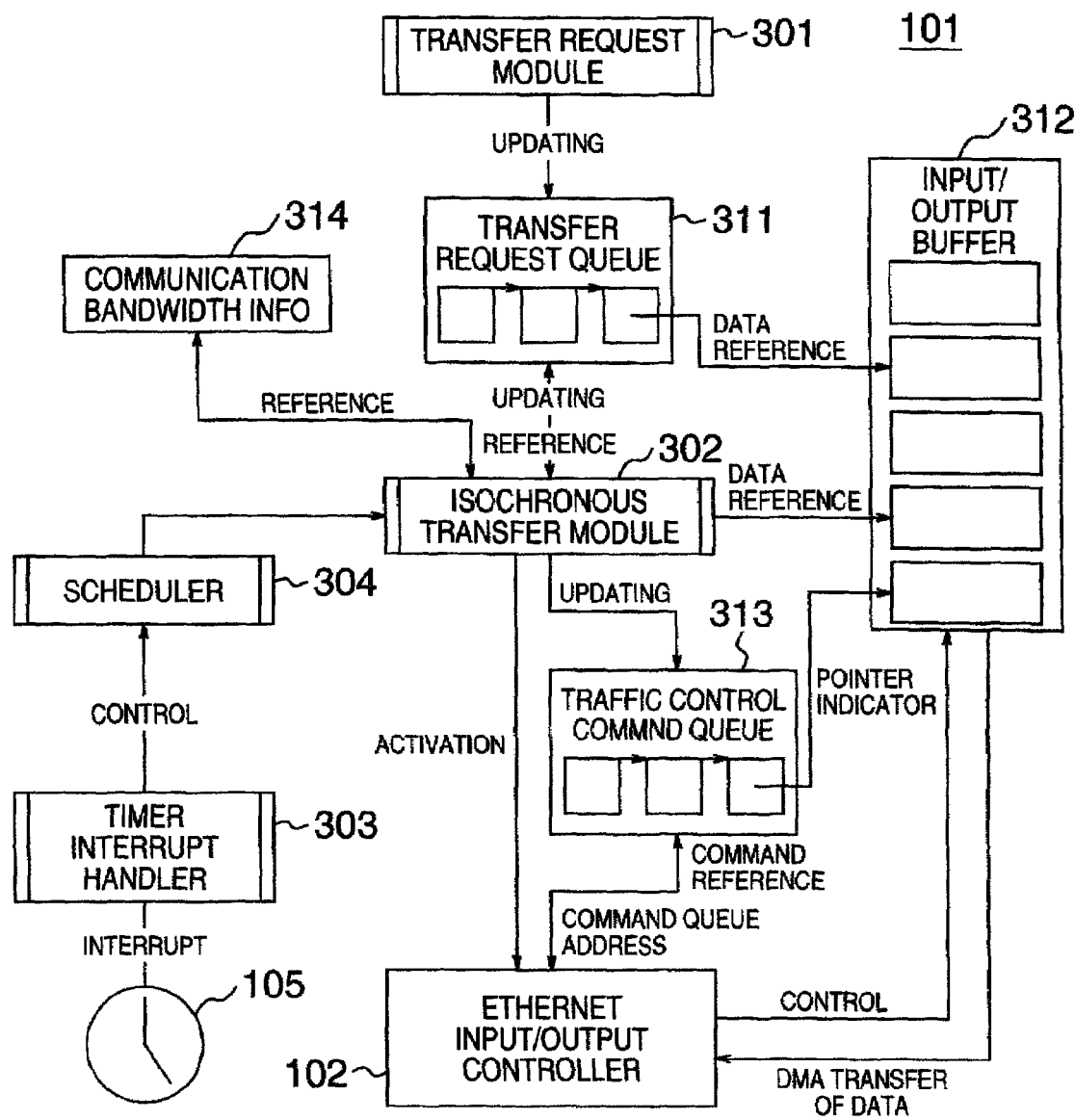
FIG. 25 is a block diagram of software constituent elements of the embodiment 4.

FIG. 25 shows several constituent elements associated with a computer software used in this embodiment. The hardwares such as the Ethernet input/output controller 102 and the transfer request module 301 are controlled by the operating system (not shown) lest an application program or a user process is illegally used. The user process indirectly utilizes these hardwares by generating a system call.

To process the data input/output or the transfer request generated from the user process, an input/output buffer 312, control data such as a transfer request queue 311, a transfer request command queue 313, and communication bandwidth information 314, and software modules such as a communication bandwidth information, etc. a transfer request module 301, an isochronous transfer module 302, a timer interrupt handler 303, a scheduler 304, etc. exist inside the operating system.

When the timer interrupt is generated at a predetermined timing, the processor interrupts the program which is presently executed, and activates the timer interrupt handler 303. This handler 303 activates in turn the isochronous transfer module 302 through the scheduler 304.

When the interrupt is generated from the Ethernet input/output controller 102, the processor 103 interrupts the program which is executed at present, and activates an input/output interrupt handler 305. This handler 305 activates in turn the isochronous transfer module 302 through the scheduler 304.

Next, the principal data structures and the processing procedures will be explained with reference to FIGS. 25 to 29.

Figure 26:
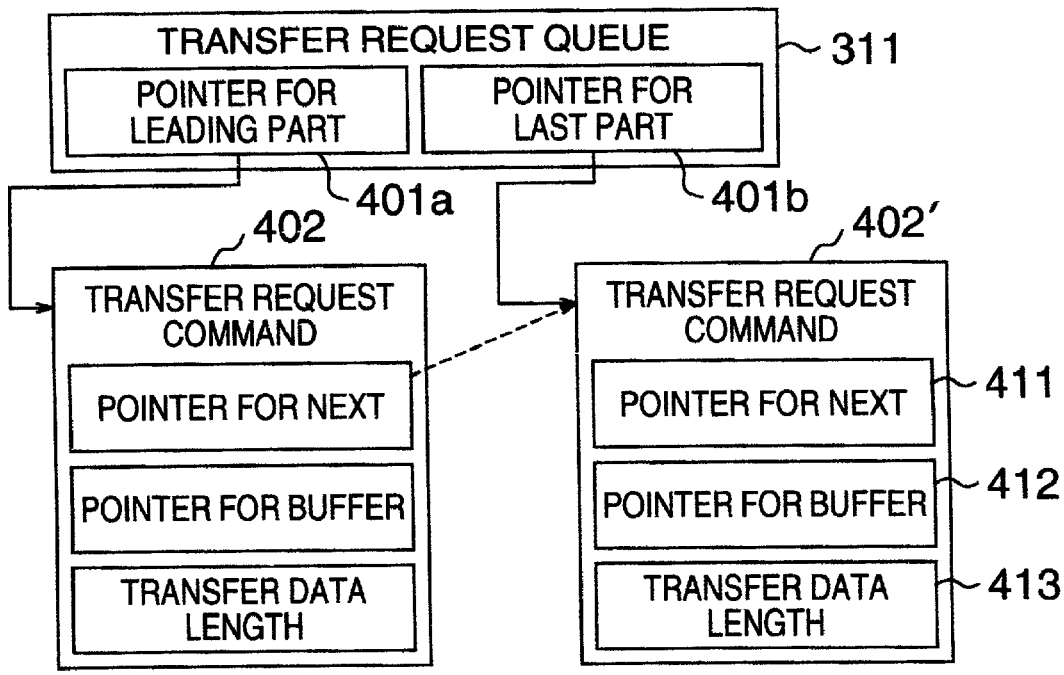
FIG. 26 is a block diagram of the structure of a transfer request.

FIG. 26 shows the structure of a transfer request queue 311 and that of a transfer request command 402. Transfer request commands 402 and 402' are connected to the transfer request queue 311.

Each transfer request command 402, 402' has the following fields.

1) pointer 411 for next request:
A pointer indicating a next request for chaining a plurality of transfer request commands.

2) buffer address 412:
This represents the leading address of a buffer having transfer data.

3) transfer data length 413:
This designates the size of the transfer data in a byte unit.

Figure 27:
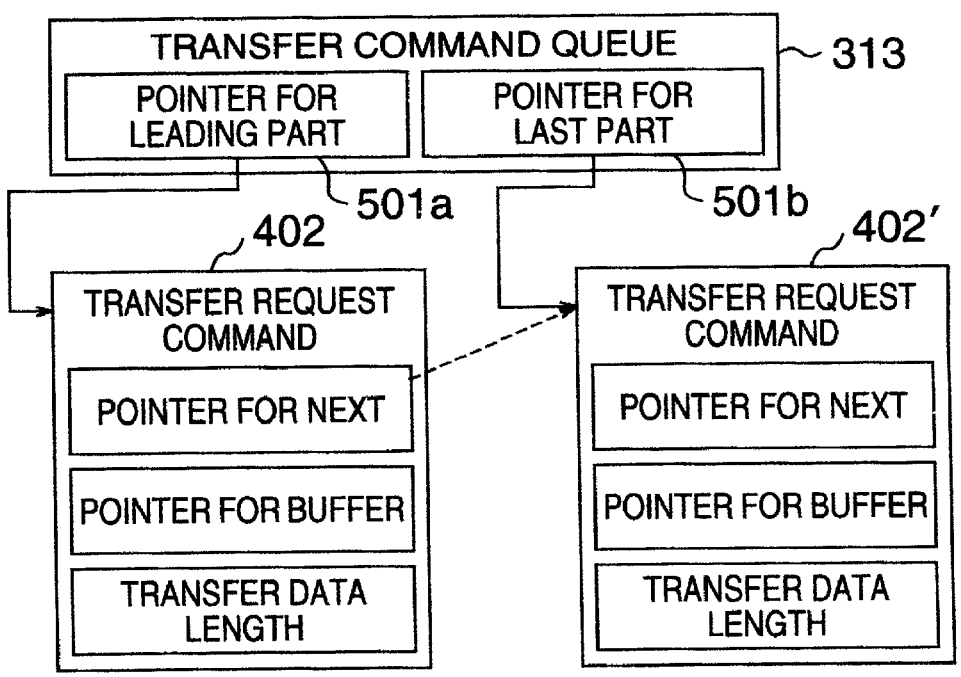
FIG. 27 is a block diagram of the structure of a transfer command.

FIG. 27 shows the structure of the transfer command queue 313. The transfer request commands 402 and 402' are connected to the transfer command queue 313.

Figure 28A:
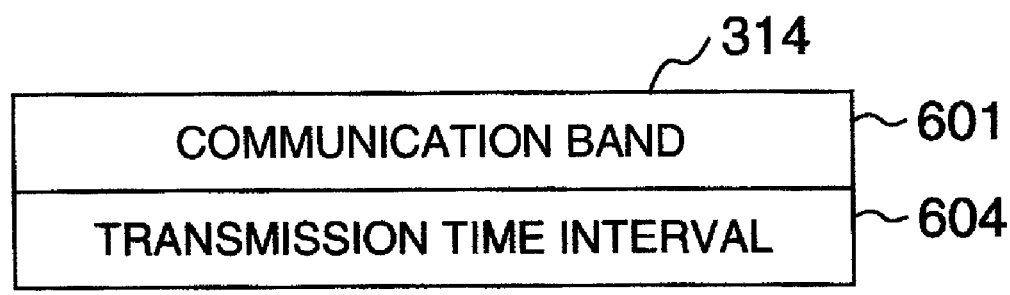
FIG. 28A is an explanatory view of the structure of a communication bandwidth information in the embodiment 4.

FIG. 28A shows the structure of the communication bandwidth information 314. The communication bandwidth information 314 has the following fields.

a) communication bandwidth M 601:
This represents the upper limit value of the data length that can be transferred in each cycle of a plurality of packets transferred intermittently by the computer 101. This value M [byte] is calculated by the formula (1) given below, where C is the number of computers connected to the LAN (sets), V is the physical bandwidth of the LAN [byte/sec], t is the transfer cycle [sec] and R is a margin bandwidth as the data length secured for each transfer cycle 604:

$$M=(V \times t-R)/c \qquad (1)$$

b) transfer cycle t 604:
This represents the transfer cycle determined primarily by the LAN system of the present invention, and is assumed as 0.04 [sec], for example.

Figure 28B:
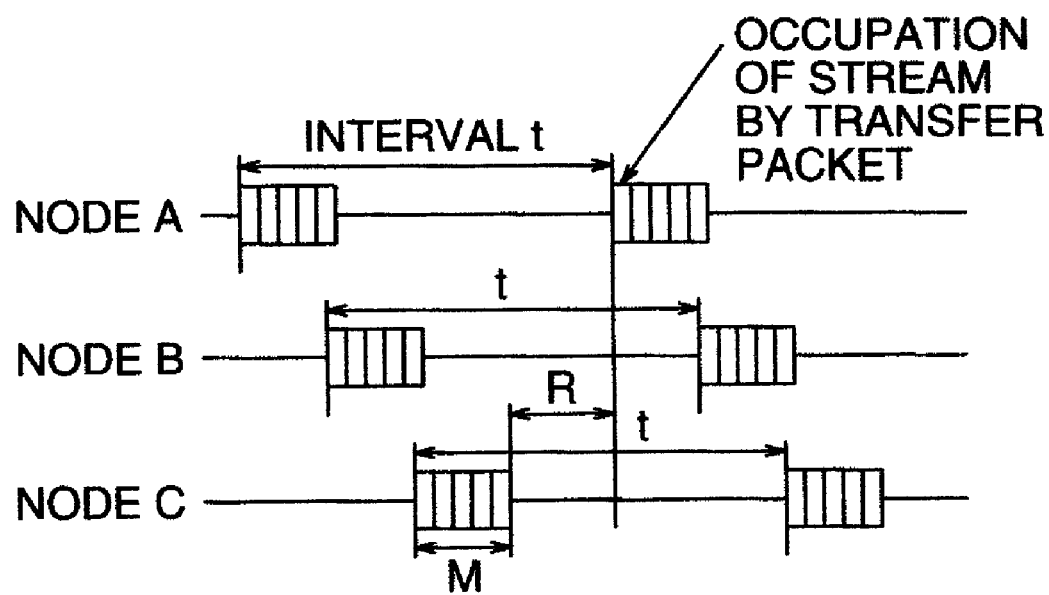
FIG. 28B is a timing chart showing the relationship between transfer and cycle in a plurality of nodes.

FIG. 28B shows the time relationship among the transfer cycle, the margin bandwidth, the communication bandwidth M and the number of modes C=3.

Next, the processing flow of the principal software modules shown in FIG. 25 will be explained.

FIG. 29 shows the processing flow of the transfer request module 301. The transfer request module provides means which enables the application to transfer data. The processor 103 generates afresh the transfer request command 402 at the step 701, stores the address of the transfer buffer in a buffer address field and stores the transfer data length in the byte unit in a transfer data length field 413. The transfer request command 402 generated at the step 701 is connected to the transfer request queue 311 at the step 702.

FIG. 30 shows the processing flow of the isochronous transfer module 302. The isochronous transfer module 302 is activated in the interval 604 of the transfer cycle. The value of a local variable sum representing the transfer request data length is cleared to 0 at the step 801. The address for the leading transfer request command 402 connected to the transfer request queue 311 is substituted for the local variable P representing the pointer for the transfer request at the step 802. When the value of the local variable P is NULL at the step 803, the flow proceeds to the step 807 and when the value is other than NULL, the flow proceeds to the step 804. At this step 804, the value of the transfer data length field 413 of the transfer request command 402 designated by the local variable P is added to the local variable sum. Next, whether or not the value of the local variable sum exceeds the communication bandwidth 601 of the communication bandwidth reservation 314 is checked at the step 805, and when if does not, the flow proceeds to the step 806. When the value sum exceeds the communication bandwidth 601, the flow proceeds to the step 807. At the step 806, the transfer request 402 designated by the local variable P is shifted from the transfer request queue 311 to the transfer request command queue 313 and then the flow proceeds to the step 802. At the step 807, on the other hand, after the pointer of the leading transfer command 402 of the transfer request command queue 313 is designated to the Ethernet input/output controller 102 and then activation is effected.

When activated by the isochronous transfer module 302, the Ethernet input/output controller 102 sends the data in accordance with the pointer 412 for the buffer and with the transfer data length field 413 in the connection sequence from the designated transfer request command 402 to the next pointer field 411 to the network 111 through the input/output buffer 312.

Because all the computers 110a, 101b and 101c connected to the network 111 follow the afore-mentioned formula (1), the quantity of the data delivered to the network 111 does not exceed the quantity of the data that can be transferred within the transfer cycle 604. Further, the delay due to the re-transfer can be absorbed inside the transmission interval time 604 by providing a bandwidth margin. For, the Ethernet 111 is a CSMA/CD system network having a re-transfer function and even when a collision occurs, re-transfer proves successful within the transmission interval time 604 as a margin is provided in such a manner as to secure an empty area for the data transfer within the interval time 604 set in the time in which the re-transfer function operates sufficiently. As a result, the probability of completion of the transfer can be improved.

Next, the fifth embodiment (embodiment 5) of the present invention which can achieve real-time communication by utilizing this operation will be explained in detail with reference to FIGS. 31 to 60. The constituent elements of this embodiment will be described first and then the processing procedures and the data structure will be explained in detail.

Figure 31:
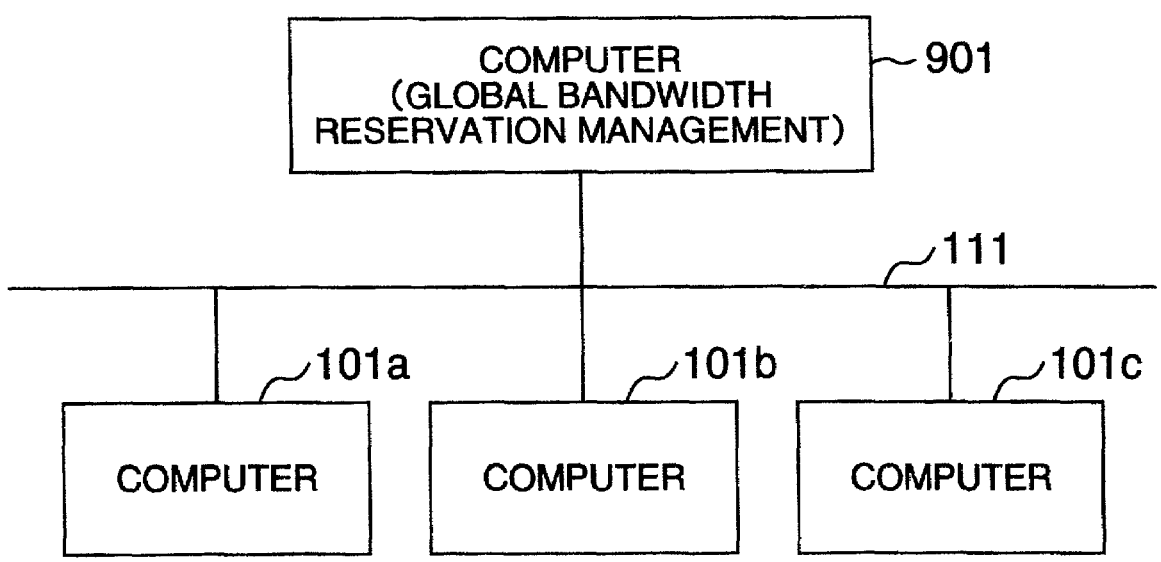
FIG. 31 is an explanatory view of constituent elements of a LAN in the embodiment 5 of the present invention.

FIG. 31 shows the LAN constituent elements of the present invention. In addition to the construction shown in FIG. 23, a computer 901 for globally managing the transfer requests from a plurality of nodes connected to the LAN is shown connected to the LAN. The hardware construction of the computer 901 does not at all alter from the construction of the computer 101 shown in FIG. 24.

Figure 32:
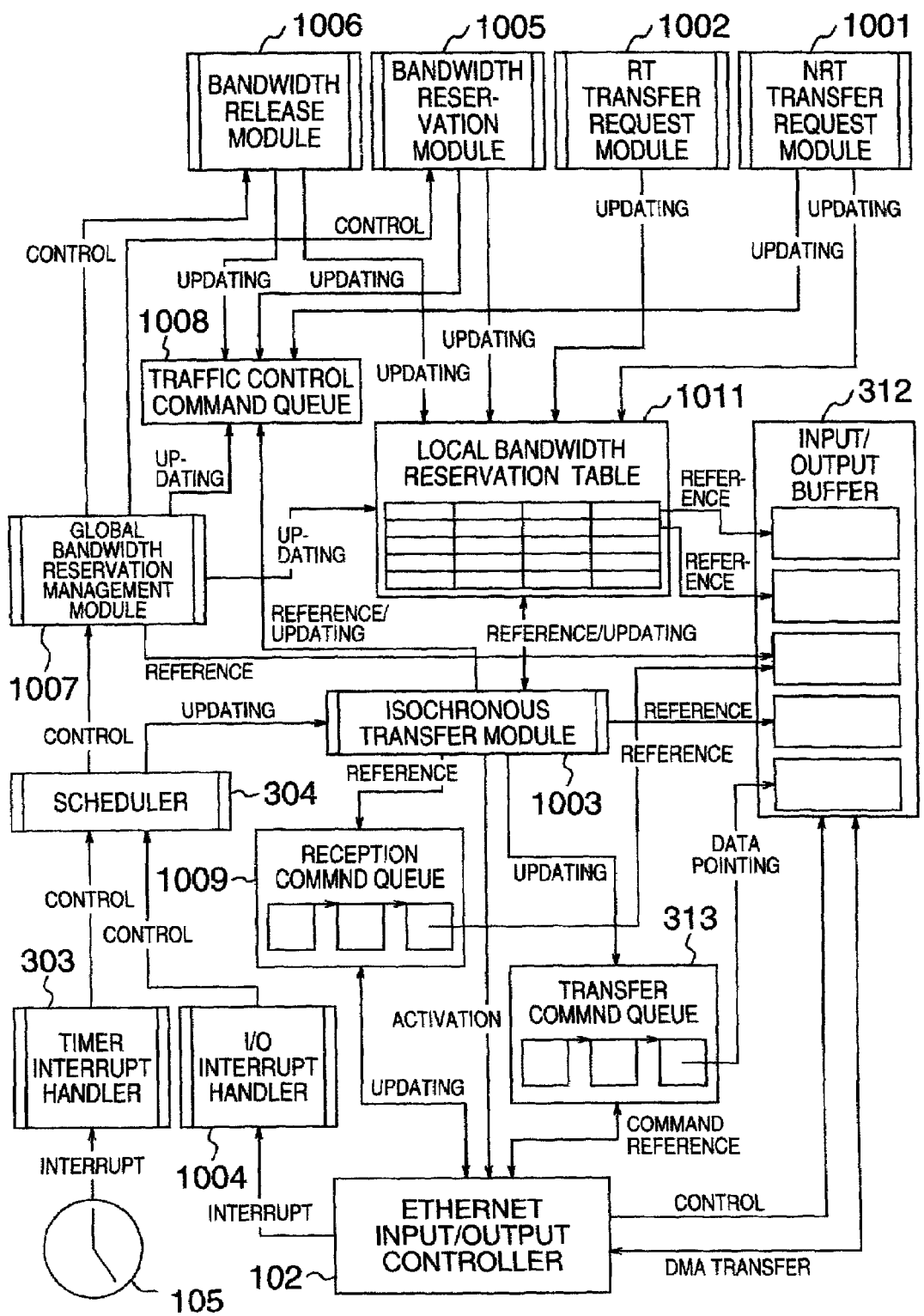
FIG. 32 is a block diagram of software constituent elements of ordinary nodes in the embodiment 5.
Figure 33:
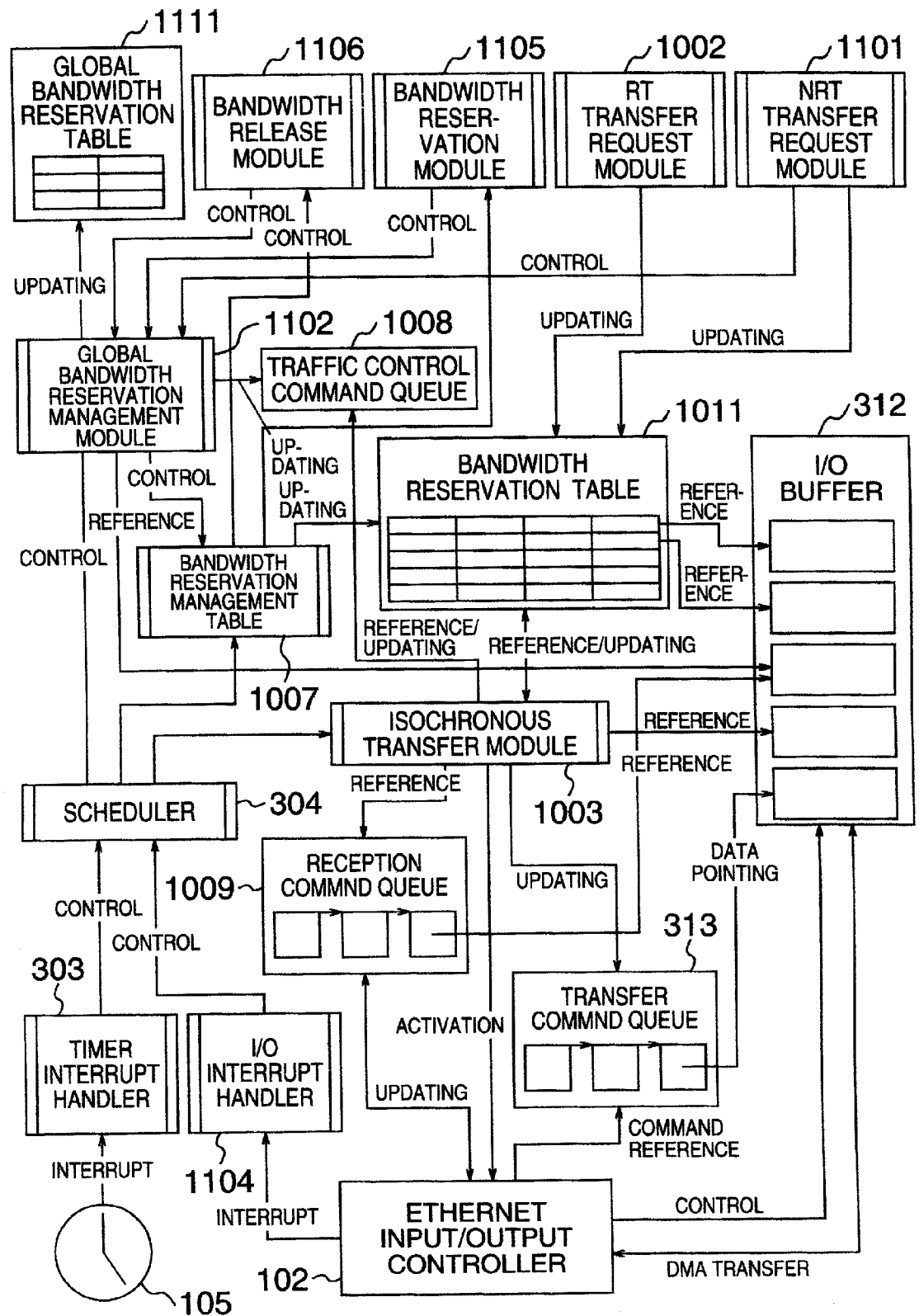
FIG. 33 is a block diagram of software constituent elements of a bandwidth reservation management node in the embodiment 5.

FIGS. 32 and 33 show the software constituent and 101c as the nodes and FIG. 33 shows the software constituent elements of the computer 901 as the global bandwidth reservation management node.

Referring to FIG. 32, in order to process the transfer request of the data generated from the user process, the input/output buffer 312, the control data such as the local bandwidth reservation table 1011, the transfer request command queue 313, the reception command queue 1009, the traffic control command queue 1008, etc., and the software modules such as the NRT (Non-Real-Time) transfer request module 1001, the RT (Real-Time) transfer request module 1002, the isochronous transfer module 1003, the bandwidth reservation module 1005, the bandwidth release module 1006, the local bandwidth reservation management module 1007, the timer interrupt handler 303, the input/output interrupt handler 1004, the scheduler 304, etc., are disposed inside the operating system.

When the timer interrupt occurs, the processor 103 interrupts the program that is executed at present, and activates the timer interrupt handler 303. This handler 303 activates in turn the isochronous transfer module 1003 and the local bandwidth reservation management table 1007 through the scheduler 304.

Referring to FIG. 33, in order the process the transfer request of the data generated from the user process, the input/output buffer 312, the control data such as the local bandwidth reservation table 1011, the transfer request command queue 313, the reception command queue 1009, the traffic control command queue 1008, the global bandwidth reservation table 1111, etc., and the software modules such as the NRT (Non-Real-Time) transfer request module 1101, the RT (Real-Time) transfer request module (1002), the isochronous transfer module 1003, the bandwidth reservation module 1105, the bandwidth release module 1106, the local bandwidth reservation management table 1007, the global bandwidth reservation management module 1102, the timer interrupt handler 303, the input/output interrupt handler 1104, the scheduler 304, etc., are disposed inside the operating system.

When the input/output completion interrupt occurs, the processor 103 interrupts the program that is executed at present, and activates the input/output interrupt handler 1104. This handler 1104 activates in turn the global bandwidth reservation management module 1102 through the scheduler 304.

Figure 59:
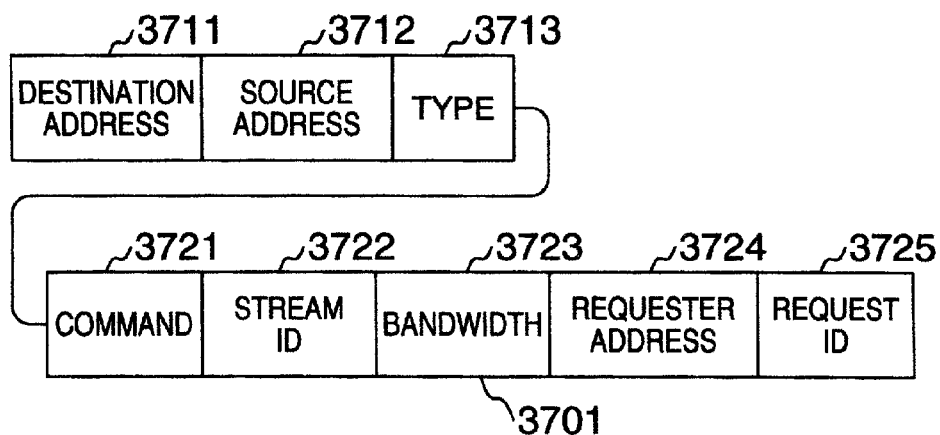
FIG. 59 shows the structure of a request packet in the embodiment 5.
Figure 60:
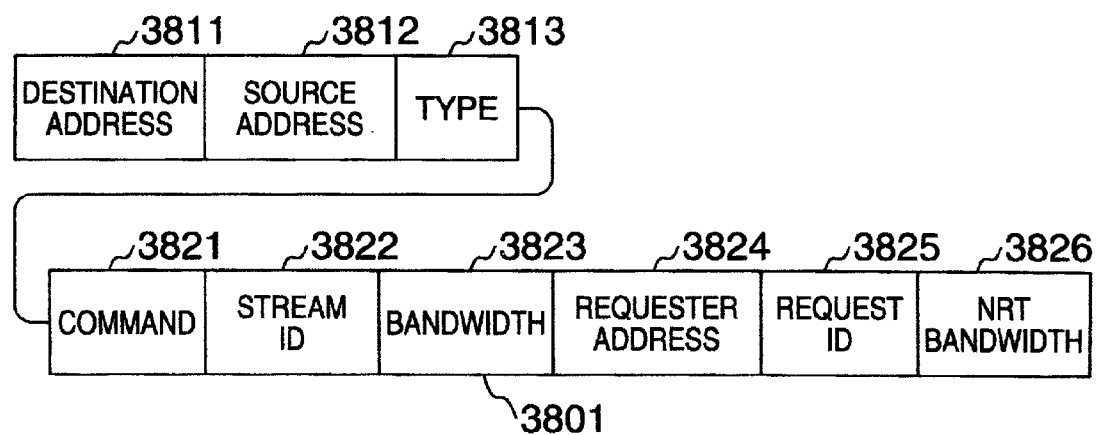
FIG. 60 shows the structure of an acknowledgement packet in the embodiment 5.

The nodes 110a, 110b and 101c and the global bandwidth reservation manager 901 exchange the reservation procedure of the bandwidth used for the data transfer before the data is transferred. FIGS. 59 and 60 show the structure of the control packet used for this procedure.

FIG. 59 shows the structure of the request packet 3701. The address which is used for identifying the destination node on the network 111 is stored in a destination address 3711, and the address used for identifying the source node on the network 111 is stored in a source address 3712. The value for judging that the data stored in the packet is the request packet when the node receives the packet is stored in a type 3713. The value for identifying the processing which the request packet requests to the global bandwidth reservation management node is stored in a command 3721. An identifier for identifying a communication stream as the object of the processing for allocating the communication stream is stored in a stream ID 3722. A requested bandwidth is stored in a bandwidth 3723. The address used for identifying a requester node on the network 111 is stored in a requester address 3724. The value which is primarily set by a requester so as to established correspondence to the acknowledgement packet is set to a request ID 3725.

FIG. 60 shows the structure of an acknowledgement packet 3801. The address used for identifying a destination node on the network 111 is stored in a destination address 3811. The address for identifying a source node on the network 111 is stored in a source address 3812. The value used for judging that the data stored in a packet is an acknowledgement packet when the node receives this packet is stored in a type 3813. The value used by the receiving node to identify a processing for bandwidth management is stored in a command 3821. An identifier for identifying a communication stream as the object of processing is stored in a stream ID 3822. An allocated RT bandwidth is stored in a bandwidth 3823. The address used for identifying a requester node on the network 111 is stored in a requester address 3824. The designated request ID 3725 is set to a request ID 3825 when a request packet exists and 0 is set when the corresponding request packet does not exist.

Next, the principal data structures shown in FIG. 10 will be explained.

The traffic control command queue 1008 and the reception command queue 1009 have exactly the same structure as the transfer request queue shown in FIG. 26.

FIG. 34 shows the structure of the local bandwidth reservation table 1011. This table 1011 has entries 1211 to 1215 for each stream of the RT transfer and for the NRT transfer. Each entry comprises a stream ID field 1201 representing an identifier of the stream, a bandwidth field 1202 representing an allocated communication bandwidth, a bandwidth updating time field 1203 for storing the time of permission of the allocation or continuation of the bandwidth, a status flag field 1204 representing the status of each entry and a transfer request queue 401 for queuing the transfer requests. The first entry 1211 of the local bandwidth reservation table 1011 is a specific entry which represents the information on the NRT transfer request.

Next, each module shown in FIG. 10 will be explained with reference to FIGS. 35 to 45.

FIG. 35 shows the processing flow of the NRT transfer request module 1001. This is the module which the user of the NRT transfer calls. The processor sets a pointer for the first entry 1211 of the local bandwidth reservation table 1011 to a local variable P representing the pointer to the entries of this table 1011, at the step 1301.

At the next step 1311, the value of the stream ID represented by the local variable P is checked. When it is 0, the flow proceeds to the step 1312 so as to secure the NRT bandwidth and when it is not 0, the flow proceeds to the step 1302. The processor secures the input/output buffer 312 at the step 1312 for the packet request for bandwidth reservation which is the request packet 3701 for the bandwidth reservation. Next, the processor sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth reservation to the command field 3721, 0 to the bandwidth field 3723 and the values which can be mutually identified to the request ID field 3725. At the next step 1313, the processor secures the transfer request command 402 for the traffic control command that requests the transfer of the bandwidth reservation packet 3701, and sets the address of the bandwidths reservation packet 3701 to the pointer field 412 for the buffer of the transfer request command 402 so secured and the data length of the bandwidth reservation packet 3701 to the transfer data length field 413. At the step 1314, 1 is set to the stream ID represented by the local variable P while 0 is set to the bandwidth represented by the local variable P lest the bandwidth reservation occurs in multiplicity and the bandwidth is used before the bandwidth reservation is confirmed. At the step 1315, the transfer request command 402 secured at the step 1313 is connected to the traffic control command queue 1008.

At the step 1302, the transfer request command 402 designated by the user program is connected to the transfer request queue 401 of the entry designated by the local variable P.

At the step 1316, the value representing that the transfer exists is set to the status flag field 1204 designated by the local variable P.

The NRT transfer request module 1001 can provide the interface for accepting the NRT data transfer to the user program in the following way. Namely, the user program activates the NRT transfer request module by using the following function.

```
<function name>
    send_NRT (qh)
<argument>
    qh:pointer for the queue connecting transfer
request command
<explanation>
```

The module is activated when data transfer is made by using NRT stream. User program uses queue qh chaining transfer requests and accepts a plurality of transfer requests at one time. NRT transfer is executed in the sequence of acceptance.

Figure 36:
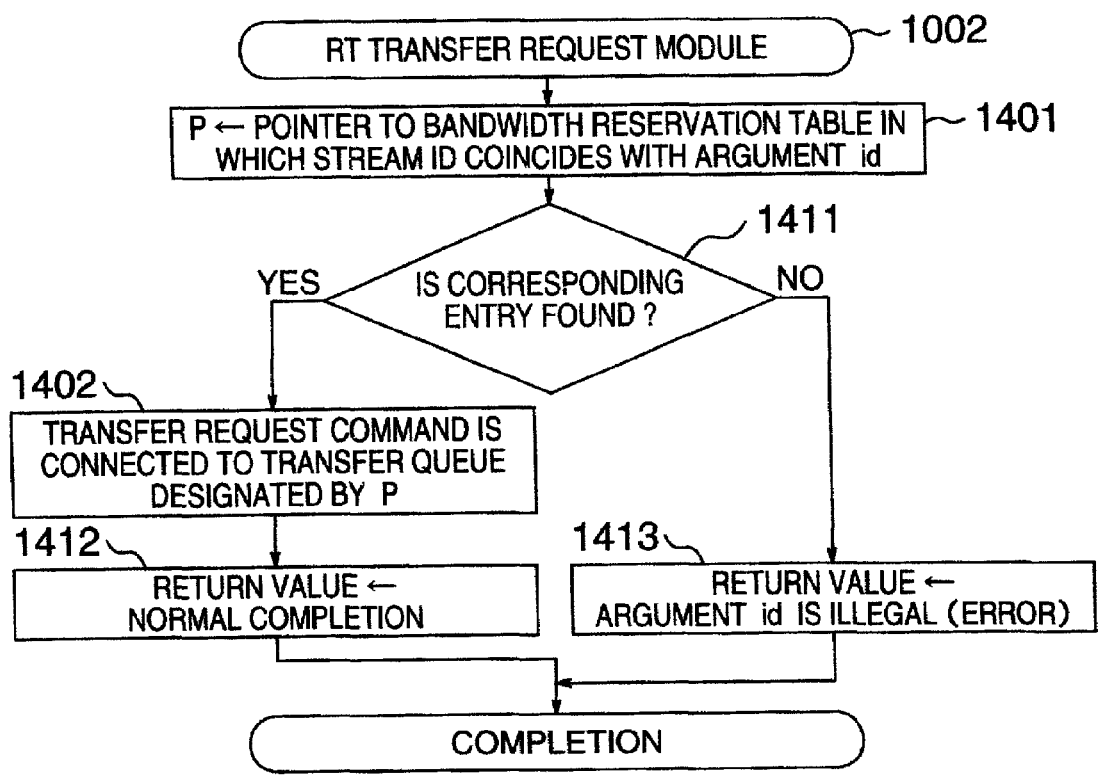
FIG. 36 is a flowchart of an RT transfer request module in the embodiment 5.

FIG. 36 shows a processing flow of the RT transfer request module 1002. At the step 1401, a pointer for the entry of the local bandwidth reservation table 1011 whose argument id coincides with the stream ID of this table 1011 is set to the local variable P representing the pointer to the entries of this table 1011.

At the step 1411, whether or not the entry of the local bandwidth reservation table 1011 whose argument id coincides with the stream ID of the local bandwidth reservation table 1011 exists is checked, and when it does, the flow proceeds to the step 1402 and when it does not, the flow proceeds to the step 1413.

At the step 1402, the transfer request command 402 designated by the user program is connected to the transfer request queue 401 of the entry designated by the local variable P.

At the step 1412, the value representing normal completion is set to a return value and a series of processings are completed. The value representing that the argument id is illegal is set to the return value at the step 1413 and a series of processings are completed.

The RT transfer request module 1002 provides an interface for accepting the RT data transfer to the user program in the following way.

```
<function name>
    send_RT(id, qh)
<argument>
    id:stream ID representing stream having
secured bandwidth
<explanation>
```

RT data transfer is executed by using a stream having stream ID id. User program uses queue qh changing transfer requests and accepts once a plurality of transfer requests.

Figure 37:
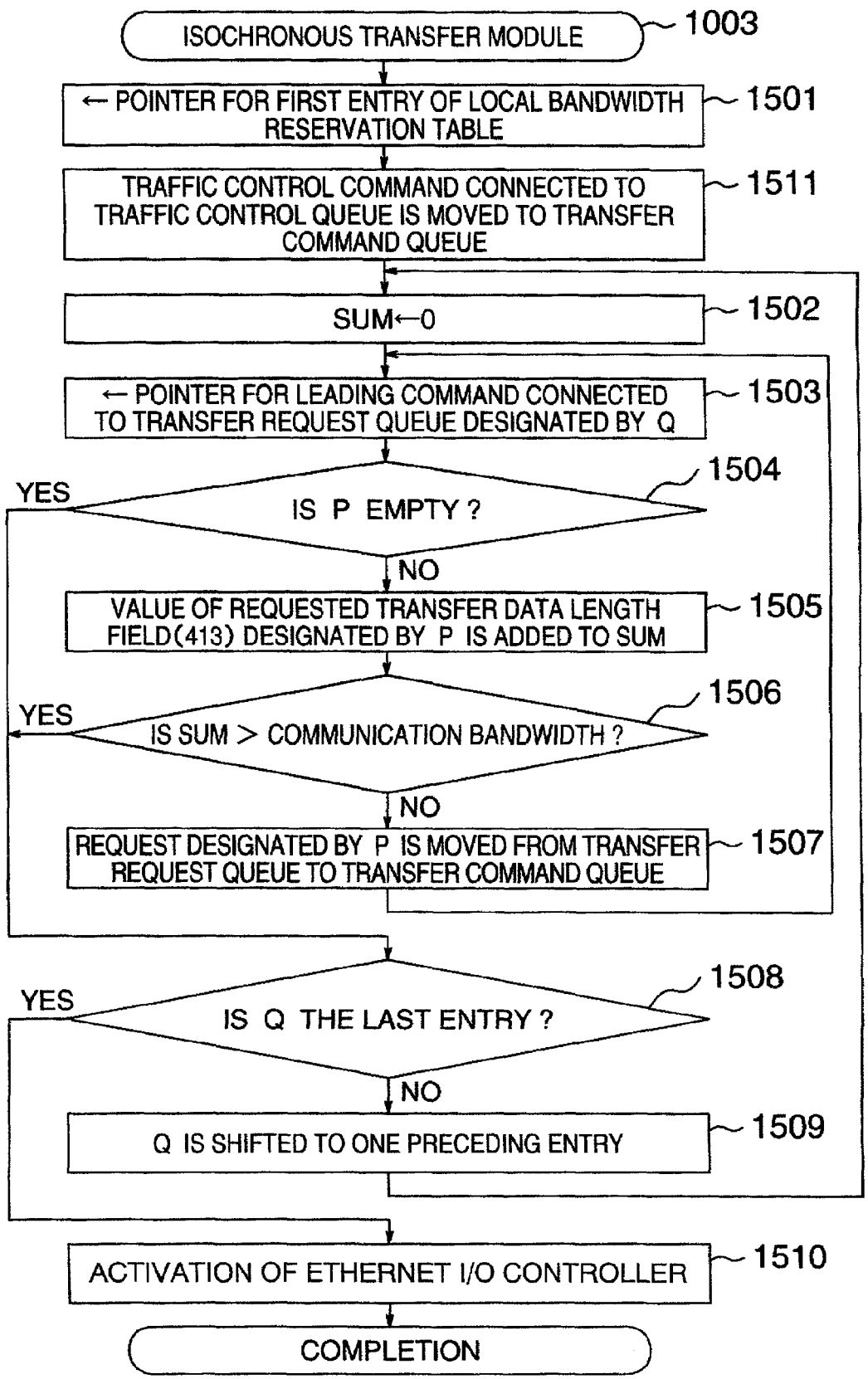
FIG. 37 is a flowchart of an isochronous transfer module in the embodiment 5.

FIG. 37 shows a processing flow of the isochronous transfer module 1003. The isochronous transfer module 1003 is activated in the interval set to the timer interrupt handler 303, such as in a 40-msec interval. At the step 1501, the processor sets the pointer for the first entry 1211 of the local bandwidth reservation table 1011 to the local variable P representing the pointer to the entries of the local bandwidth reservation table 1011.

At the step 1511, the transfer request command 402 connected to the traffic control command queue 1008 is moved to the transfer command queue 313.

At the step 1502, the value of the local variable sum representing the transfer request data length is cleared to 0. At the next step 1503, the address for the leading transfer request command 402 connected to the transfer request queue 401 of the entry designated by the local variable Q is substituted for the local variable P representing the pointer to the transfer request. At the step 1504, when the value of the local variable P is an invalid value, the flow proceeds to the step 1508 and when it is a value other than the invalid value, the flow proceeds to the step 1505. At this step 1505, the value of the transfer data length field 413 of the transfer request 402 designated by the local variable P is added to the local variable sum. Whether or not the value of the local variable sum exceeds the value of the bandwidth field 1202 of the entry designated by the local variable Q is checked at the step 1506. When it does not, the flow proceeds to the step 1507 and when it does, the flow proceeds to the step 1508. At the step 1507, the transfer request 402 designated by the local variable P is moved to the transfer command queue 313 from the transfer request queue 401 of the entry designated by the local variable Q and the flow proceeds to the step 1503. Whether or not the local variable Q is the last entry of the local bandwidth reservation table 1011 is checked at the step 1508 and when it is the last entry, the flow proceeds to the step 1510 and when it is not, the flow proceeds to the step 1509. At this step 1509, the local variable Q is set to the pointer for the entry next to the entry designated by this local variable Q and then the flow proceeds to the step 1502. At the step 1510, the pointer of the leading transfer request command 402 of the transfer request command queue 313 is designated to the Ethernet input/output controller 102 to activate it, and a series of processings are completed.

Figure 38:
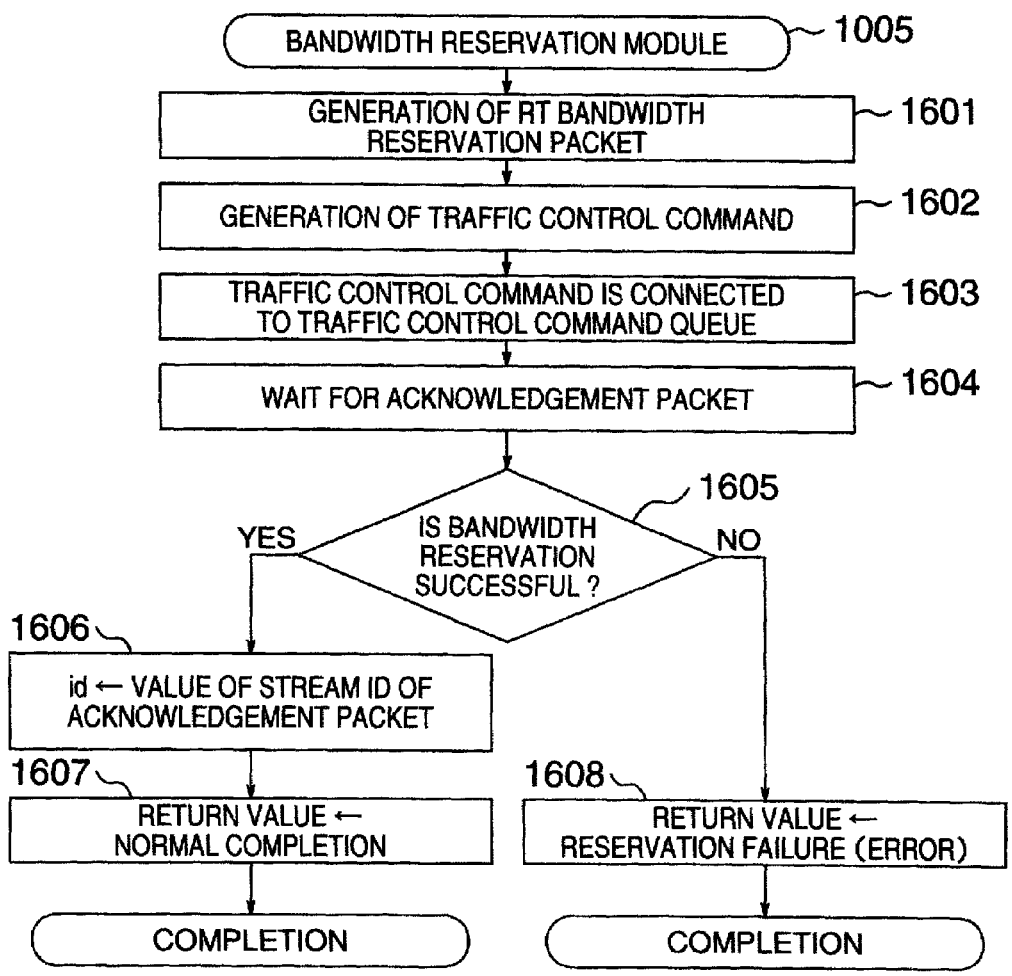
FIG. 38 is a flowchart of a bandwidth reservation module of ordinary nodes in the embodiment 5.

FIG. 38 shows a processing flow of the bandwidth reservation module 1005. At the step 1601, the processor secures the input/output buffer 312 for the bandwidth reservation packet as the request packet 3701 for the bandwidth reservation, and sets the address of the bandwidth reservation manager 901 to the destination address field 3711 of the request packet 3701 so secured, the address of its own to the source address field 3712 and to the requester address field 3712, the value representing the request packet to the type field 3713, the value representing the bandwidth reservation to the command field 3721, the value designated by the argument bw to the bandwidth field 3723, and a primary value to the request ID field 3725. At the step 1602, the processor secures the transfer request command 402 for the traffic control command requesting the transfer of the bandwidth reservation packet 3701 and sets the address of the bandwidth reservation packet 3701 to the pointer field 412 for the buffer of the transfer request command 402 so secured and the data length of the bandwidth reservation packet 3701 to the transfer data length field 413. At the step 1603, the processor connects the transfer request command 402 secured at the step 1602 to the traffic control command queue 1008. The processor waits for the arrival notification of the acknowledgement packet 3801 representing the coincidence of the request ID field of the bandwidth reservation packet 3701 with the request ID field 3825 of the acknowledgement packet 3801 at the step 1604. When the value of the bandwidth field 3823 of the acknowledgement packet 3801 receiving the arrival notification coincides with the value designated by the argument bw at the step 1605, the flow proceeds to the step 1606 and when it does not, the flow proceeds to the step 1608. The value of the identifier field 3822 of the acknowledgement packet 3801 is set to the area designated by the argument id at the step 1606. At the step 1607, the value representing normal completion is set at a return value and a series of processings are completed. On the other hand, a value representing the failure of the bandwidth reservation is set as the return value and a series of processings are completed at the step 1608.

The bandwidth reservation module 1005 provides the interface for accepting the bandwidth reservation to the user program in the following way.

```
<function name>
    reserve_bandwidth (bw, id)
<argument>
    bw:bandwidth requested by user
    id:pointer to area for storing stream ID
    representing stream having secured bandwidth
<explanation>
```

The stream having the bandwidth bw is secured. When this securing proves successful, the return value representing normal completion is obtained and when securing proves unsuccessful, a return value representing the failure of the bandwidth reservation is obtained. To execute the RT communication, the RT transfer request module is activated by using the stream ID obtained by this function, and the RT communication is thereafter executed.

Figure 39:
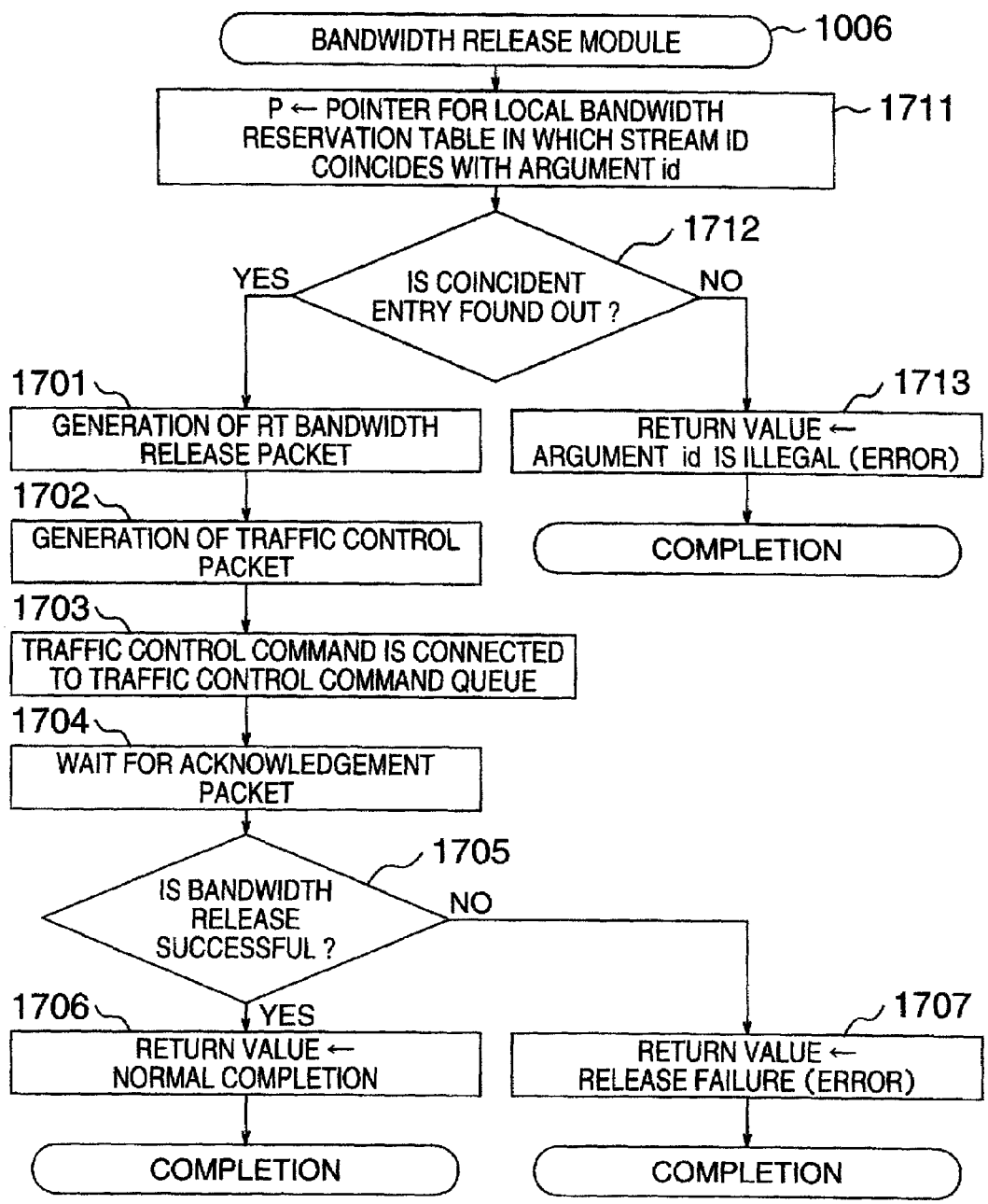
FIG. 39 is a flowchart of a bandwidth release module of ordinary nodes in the embodiment 5.

FIG. 39 shows a processing flow of the bandwidth release module 1006. At the step 1711, the processor sets the pointer for the entries of the local bandwidth reservation table 1011 in which the argument id coincides with the stream ID of the local bandwidth reservation table 1011 to the local variable P representing the pointer for the entries of the local bandwidth reservation table 1011. At the step 1712, whether or not the entry of the local bandwidth reservation table 1011 in which the argument id coincides with the stream ID of the local bandwidth reservation table 1011 exists is checked, and when such an entry exists, the flow proceeds to the step 1701 and when it does not, the flow proceeds to the step 1713, from the step 1712.

At the step 1701, the processor secures the input/output buffer 312 for the bandwidth release packet as the request packet 3701 for releasing the bandwidth, and sets the address of the global bandwidth reservation manager 901 to the destination address field 3711 of the request packet 3701 so secured, the address of its own node to the source address field 3712 and to the requester address field 3724, the value representing the request packet to the type field 3713, the value representing the bandwidth release to the command field 3721, the value of the stream ID field 1201 designated by the local variable P to the stream ID field, the value of the bandwidth field 1202 designated by the local variable P to the bandwidth field 3723 and a primary value to the request ID field 3725.

At the step 1702, the processor secures the transfer request command 402 for the traffic control command requesting the transfer of the bandwidth release packet 3701, and sets the address of the bandwidth release packet 3701 to the pointer field 412 for the buffer of the transfer request command 402 so secured and the data length of the bandwidth release packet 3701 to the transfer data length field 413. At the step 1703, the transfer request command 402 secured at the step 1702 is connected to the traffic control command queue 1008. At the step 1704, the processor waits for the arrival notification of the acknowledgement packet 3801 in which the request ID field 3725 of the bandwidth release packet 3701 coincides with the value of the request ID field 3825 of the acknowledgement packet 3801 from the local bandwidth reservation management module 1007. At the step 1705, whether or not the value of the bandwidth field 3823 of the acknowledgement packet 3801 receiving the arrival notification is 0 is checked, and when this value is other than 0, the flow proceeds to the step 1706 and when it is 0, the flow proceeds to the step 1707. At the step 1706, the processor sets the value representing normal completion as the return value and completes a series of processings. At the step 1706, the processor sets the value representing the failure of the bandwidth reservation as the return value and completes a series of processings. At the step 1713, the processor sets the value representing that the argument id is illegal to the return value and completes a series of processings.

The bandwidth release module 1006 provides the interface for accepting the bandwidth release to the user program in the following way.

```
<function name>
    cancel_bandwidth(id)
<argument>
    id: stream ID representing stream having
    bandwidth to be released
<explanation>
```

This module is activated when the stream having the stream ID id is released after completion of the transfer. When this release proves successful, a return value representing normal completion is obtained and when the release proves unsuccessful, a value representing the failure of the bandwidth release is obtained. The stream ID which has succeeded in the release by using this function becomes invalid.

Figure 40:
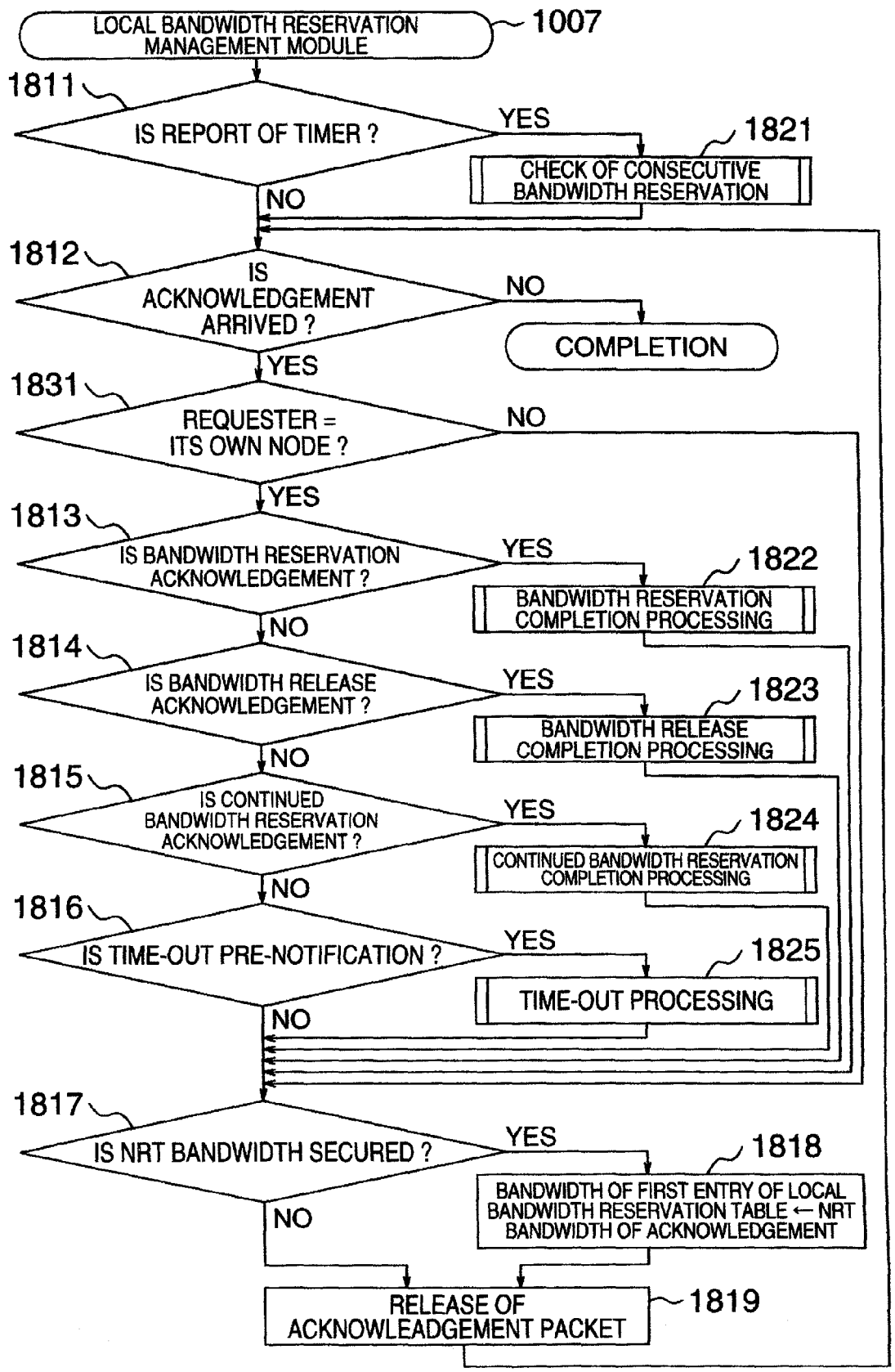
FIG. 40 is a flowchart of a local bandwidth reservation management module in the embodiment 5.

FIG. 40 shows a processing flow of the local bandwidth reservation management module 1007. This local bandwidth reservation management module 1007 is activated in the interval set to the timer interrupt handler 303, such as 40 msec, for example, through the scheduler 304. The local bandwidth reservation management module 1007 is also activated through the scheduler 304 whenever the packet to be processed by this module 1007 arrives. At step 1811, the processor judges whether or not the call of the module results from the timer interrupt and when it does, the flow proceeds to the step 1821 and when it does not, the flow proceeds to the step 1812. A series of processings for requesting the consecutive bandwidth reservation are executed at the step 1821 before the term of use of the bandwidth shown in FIG. 41 expires.

Figure 42:
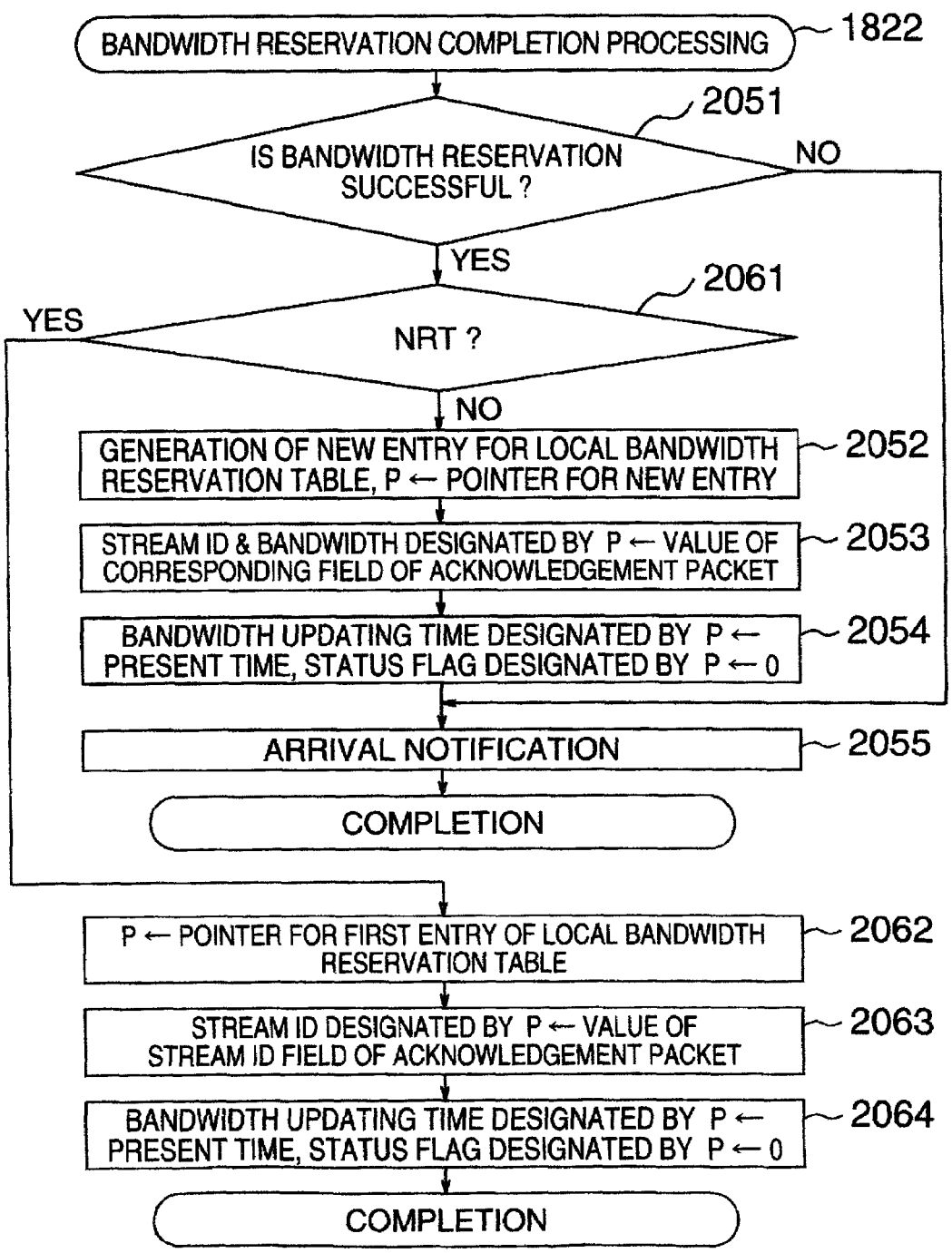
FIG. 42 shows the detail of a bandwidth reservation completion processing in the embodiment 5.

Whether or not the acknowledgement arrives from the global bandwidth reservation manager 901 is checked at the step 1812 and when it does, the flow proceeds to the step 1831 and when it does not, a series of processings are completed. At the step 1831, whether or not the value of the requester address field 3824 of the arriving acknowledgement packet 3801 coincides with the address of its own node is checked and when it does, the flow proceeds to the step 1813 and when it does not, the flow proceeds to the step 1817. Whether or not the value of the command field 3821 of the arriving acknowledgement packet 3801 coincides with the value representing the bandwidth reservation acknowledgement is checked, and when it dies, the flow proceeds to the step 1822 and when it does not, the flow proceeds to the step 1814. A series of processings depending on the result of the bandwidth reservation request shown in FIG. 42 are executed at the step 1182. At the step 1814, whether or not the value of the command field 3821 of the arriving acknowledgement packet 3801 coincides with the value representing the bandwidth release acknowledgement is checked, and when it does, the flow proceeds to the step 1823 and when it does not, the flow proceeds to the step 1815.

Figure 43:
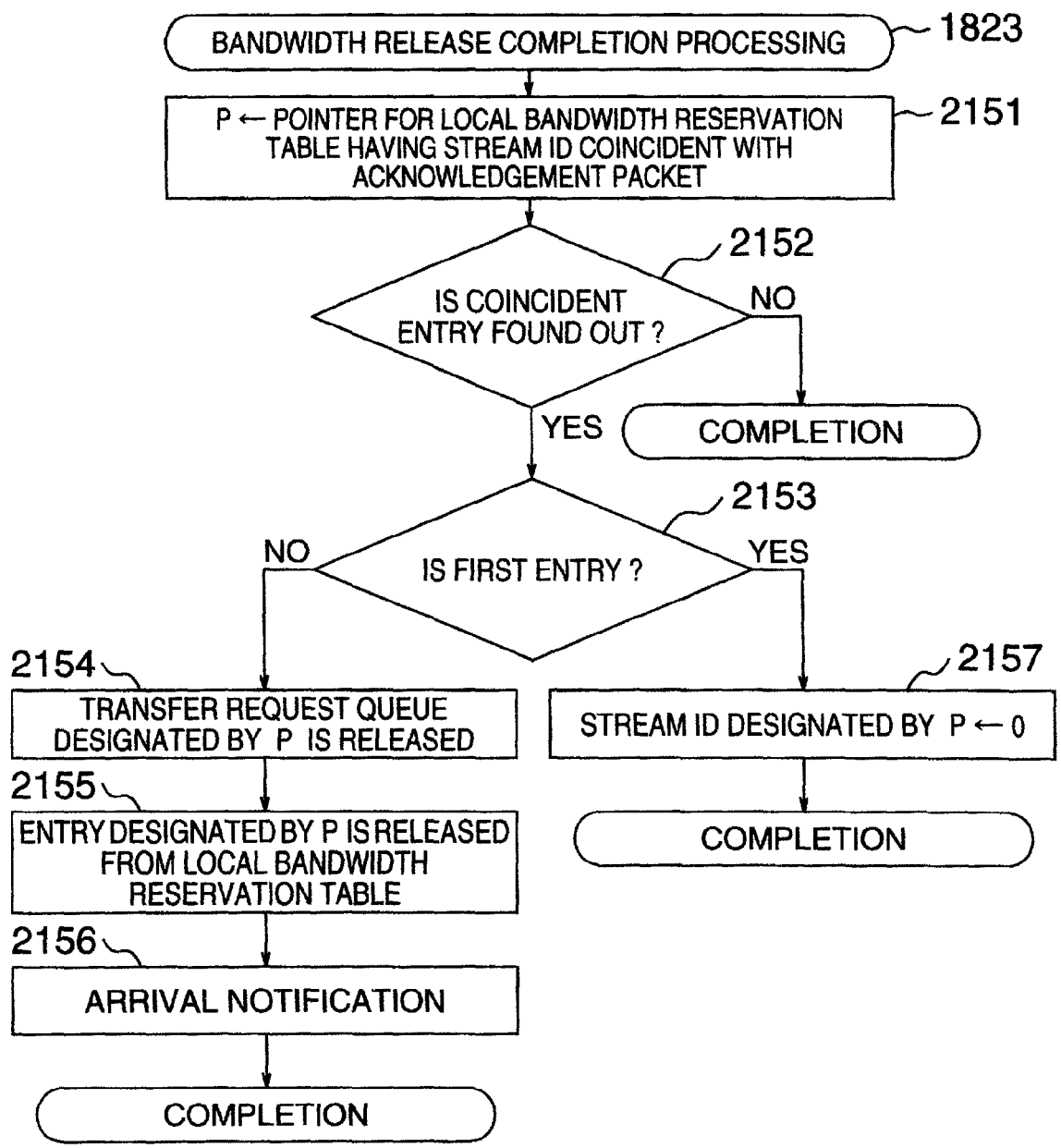
FIG. 43 shows the detail of a bandwidth release completion processing in the embodiment 5.
Figure 44:
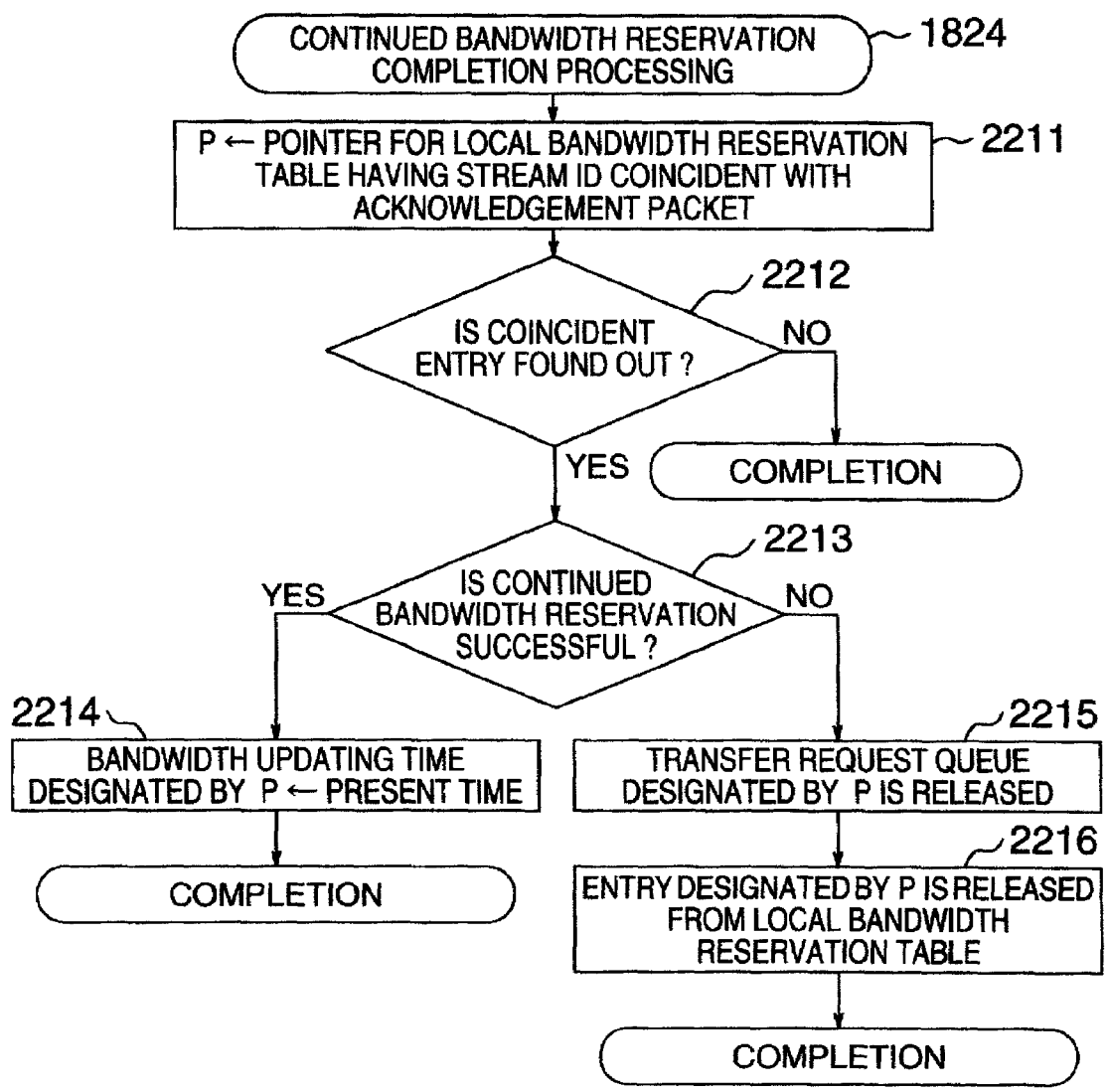
FIG. 44 shows the detail of a bandwidth consecutive reservation completion processing.
Figure 45:
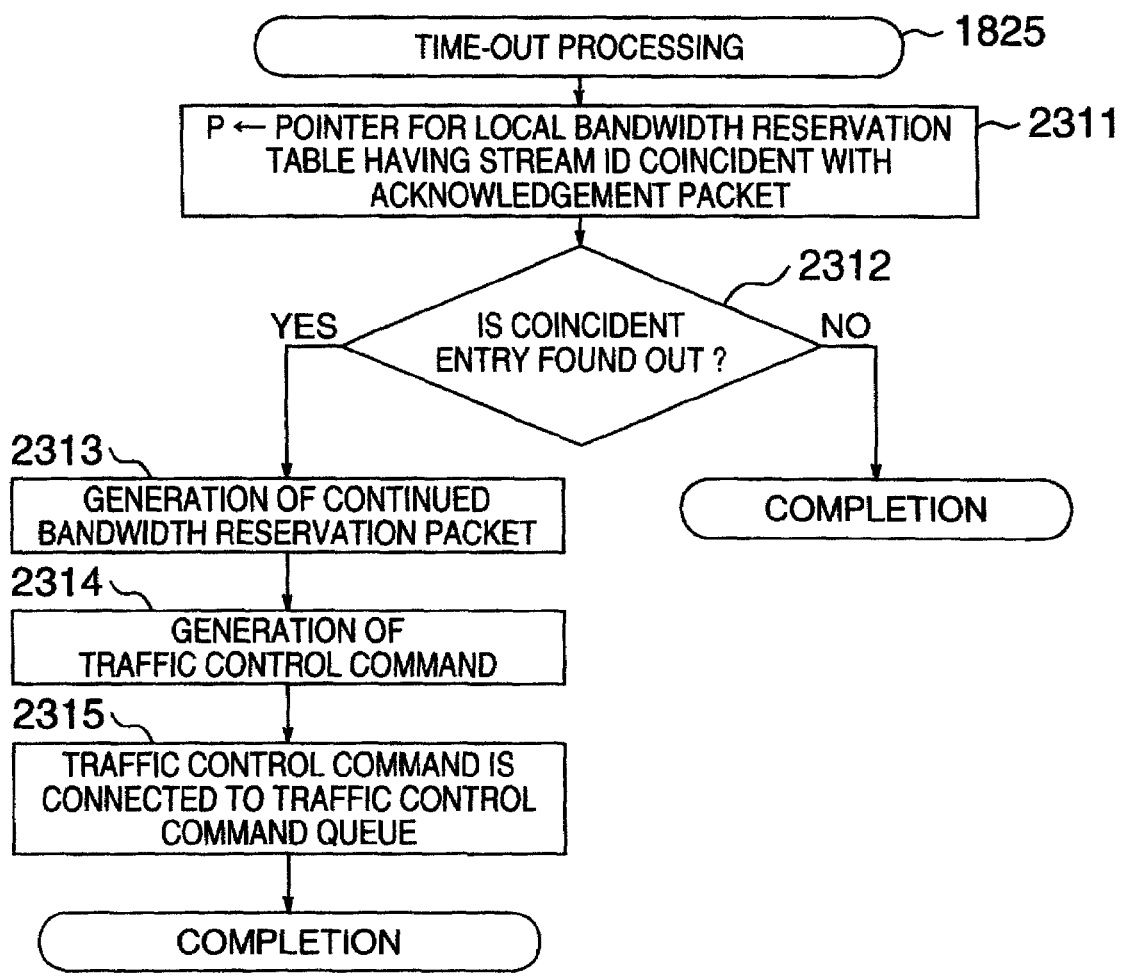
FIG. 45 shows the detail of a time-out processing in the embodiment 5.

At the step 1823, a series of processings depending on the result of the bandwidth release request shown in FIG. 43 are executed. At the step 1815, whether or not the value of the command field 3821 of the arriving acknowledgement packet 3801 coincides with the value representing the continued bandwidth reservation is checked and when it does, the flow proceeds to the step 1824 and when it does not, the flow proceeds to the step 1816. A series of processings depending on the result of the continued bandwidth reservation request shown in FIG. 44 are executed at the step 1824. Whether or not the value of the command field 3821 of the arriving acknowledgement packet 3801 coincides with the value representing the time-out pre-notification is checked at the step 1816 and when it does, the flow proceeds to the step 1825 and when it does not, the flow proceeds to the step 1817. At the step 1825, a series of processings by the time-out notification shown in FIG. 45 are executed. At the step 1817, whether the value of the stream ID 1201 of the first entry 1211 of the local bandwidth reservation table 1011 is 0 or 1 is checked and whether or not the NRT bandwidth is allocated is judged. When the NRT bandwidth is allocated, the flow proceeds to the step 1818 and when it is not, the flow proceeds to the step 1819. At the step 1818, the value of the NRT bandwidth field 3826 of the acknowledgement packet 3801 is set to the bandwidth field 1202 of the first entry 1211 of the local bandwidth reservation table 1011, and at the step 1819, on the other hand, the input/output buffer 312 allocated to the acknowledgement packet 3801 is released and the flow proceeds to the step 1812.

Figure 41:
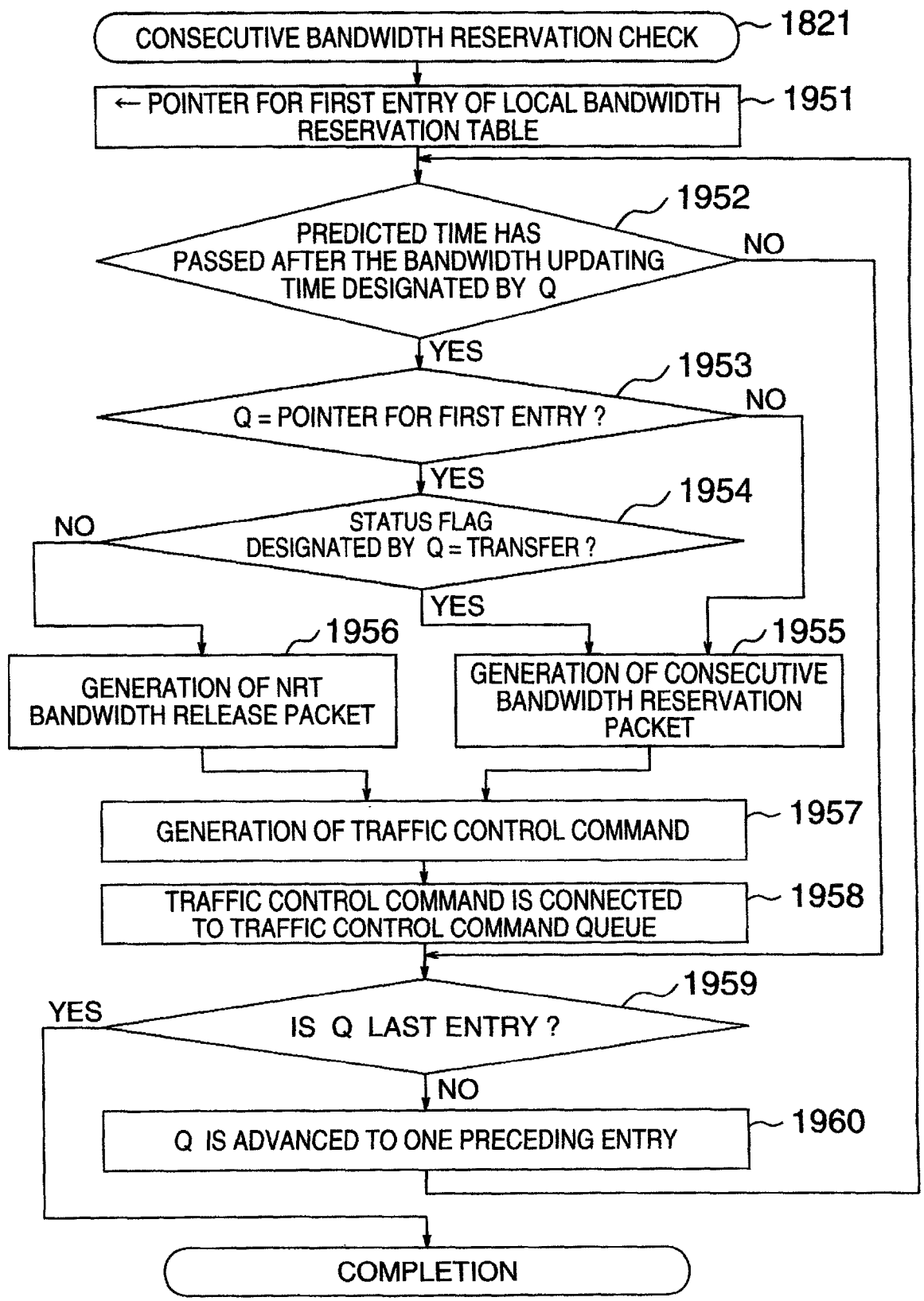
FIG. 41 shows the detail of a consecutive bandwidth reservation check processing in the embodiment 5.

FIG. 41 shows the detail of a consecutive bandwidth reservation check processing 1821. At the step 1951, the processor sets the pointer for the first entry 1211 of the local bandwidth reservation table 1011 to the local variable Q representing the pointer to the entries of this table 1011. At the step 1952, it is checked by the client by himself before the generation of the transfer packet whether or not the time inputted by the prediction of the client, such as 9 seconds, has passed after the time marked in the bandwidth updating time field 1203 of the entry designated by the local variable Q, and when it does, the flow proceeds to the step 1953 and when it does not, the flow proceeds to the step 1959. The time is put into this updating time field at the step 2054 or 2064 in FIG. 20 and at step 2214 is FIG. 44 (as will be later explained). At the step 1953, whether or not the pointer designated by the local variable Q points the first entry 1211 of the local bandwidth reservation table 1011, that is, the entry of the NRT bandwidth, is checked, and when it does, the flow proceeds to the step 1954 and when it points the entries other than the NRT bandwidth, the flow proceeds to the step 1955. At the step 1954, whether or not the value of the status flag field 1204 of the entry designated by the local variable Q is the value representing that the transfer exists is checked, and when it is that value, the flow proceeds to the step 1955 and when it is not, the flow proceeds to the step 1956.

At the step 1955, the processor secures the input/output buffer 312 for the bandwidth continued reservation packet as the request packet 3701 for continued bandwidth reservation, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the continued bandwidth reservation to the command field 3712, the value of the stream ID field 1201 designated by the local variable P to the stream ID field, the value of the bandwidth field 1202 designated by the local variable P to the bandwidth field 3723, and a primary value to the request ID field 3725.

At the step 1956, the processor secures the input/output buffer 312 for the bandwidth release packet as the request packet 3701 for the bandwidth release, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth release to the command field 3721, the value of the stream ID field 1201 designated by the local variable P to the stream ID field, the value of the bandwidth field 1202 designated by the local variable P to the bandwidth field 3723 and a primary value to the request ID field 3725.

At the step 1957, the processor secures the transfer request packet 402 for the bandwidth release packet or for the traffic control command requesting the transfer of the continued bandwidth reservation packet 3701, and then sets the address of the band release packet of the continued bandwidth reservation packet 3701 to the pointer field 412 for the buffer of the transfer request command 402 so secured, and the data length of the band release packet or the continued bandwidth reservation packet 3701 to the transfer data length field 413. At the step 1958, the transfer request command 402 secured at the step 1957 is connected to the traffic control command queue 1008. At the next step 1959, whether or not the entry designated by the local variable Q is the final entry is checked, and when it is, a series of processings are completed and when it is not, the flow proceeds to the step 1960. At this step 1960, the pointer for the next entry designated by the local variable Q is set to the local variable Q.

FIG. 42 shows the detail of the bandwidth reservation completion processing 1822. At the step 2051, the processor checks whether or not the value of the stream ID field 3821 of the acknowledgement packet 3801 is 0, and when it is other than 0, the flow proceeds to the step 2061 and when it is 0, the flow proceeds to the step 2055. At the step 2061, whether or not the value of the bandwidth field 3823 of the acknowledgement packet 3801 is 0 is checked, and when it is other than 0, the flow proceeds to the step 2052 and when it is 0, the flow proceeds to the step 2062. At the step 2052, a new entry 1215 is generated afresh for the local bandwidth reservation table 1011 and the pointer for this entry 1215 is set to the local variable P designating the entries of the local bandwidth reservation table 1011. At the step 2053, the value of the stream ID 3822 of the acknowledgement packet 3801 is set to the stream ID field 1201 designated by the local variable P, and the value of the bandwidth field 3823 of the acknowledgement packet 3801 is set to the bandwidth field 1202 designated by the local variable P.

At the step 2054, the present time is set to the bandwidth updating time field 1203 designated by the local variable P and the status flag 1204 designated by the local variable P is initiated to 0. At the step 2055 the arrival notification is given to the bandwidth reservation module 1005 waiting for the arrival of the acknowledgement packet 3801 having the value of the request ID field 3825, which coincides with the value set to the request ID field 3725 of the bandwidth reservation packet 3701, and a series of processings are completed. At the step 2062, the pointer for the first entry 1211 of the local bandwidth reservation table 1011 is set to the local variable P designating the pointer to the entries of this table 1011. At the step 2063, the value of the stream ID 3822 of the acknowledgement packet 3801 is set to the stream ID field 1201 designated by the local variable P, and the value of the NRT bandwidth field 3826 of the acknowledgement packet 3801 is set to the bandwidth field 1202 designated by the local variable P. At the step 2064, the present time is set to the bandwidth updating time field 1203 designated by the local variable P, the status flag 1204 designated by the local variable P is initialized to 0 and a series of processings are completed.

FIG. 43 shows the detail of the bandwidth release completion processing 1823. At the step 2151, the processor sets the pointer for the entry of the local bandwidth reservation table 1011 in which the stream ID 1201 of this table 1011 coincides with the stream ID field 3822 of the acknowledgement packet 3801 is set to the local variable P designating the pointer for the entries of the local bandwidth reservation table 1011. Whether or not the entry of the local bandwidth reservation table 1011 in which the stream ID 1201 of the table 1011 coincides with the stream ID field 3822 of the acknowledgement packet 3801 exists is checked at the step 2151, and when it does, the flow proceeds to the step 2153 and when it does not, a series of processings are completed at the step 2152. At the next step 2153, whether or not the entry designated by the local variable P coincides with the first entry 1211 of the local bandwidth reservation table 1011 as the NRT bandwidth is checked, and when it does, the flow proceeds to the step 2157 and when it does not, the flow proceeds to the step 2154. At the step 2154, the transfer request command 402 of the transfer request queue 401 designated by the local variable P is released. The entry designated by the local variable P is released at the step 2155. At the step 2156, the arrival notification given to the bandwidth release module 1006 that waits for the arrival of the acknowledgement packet 3801 having the value of the request ID field 3825, which is coincident with the value set to the request ID field 3725 of the bandwidth release packet 3701, and a series of processings are completed. At the step 2157, 0 is set to the stream ID 1201 designated by the local variable P, and a series of processings are completed.

FIG. 44 shows the detail of the continued bandwidth reservation completion processing 1824. At the step 2211, the processor sets the pointer for the entry of the local bandwidth reservation table 1011 in which the stream ID 1201 of the local bandwidth reservation table 1011 coincides with the stream ID field 3822 of the acknowledgement packet 3801 to the local variable P designating the pointer for the entries of this table 1011. Whether or not the entry of the local bandwidth reservation table 1011 in which the stream ID 1201 of the table 1011 coincides with the stream ID field 3822 of the acknowledgement packet 3801 exists is checked at the step 2211, and when it does, the flow proceeds to the step 2213 and when it does not, a series of processings are completed at the step 2211. At the step 2213, whether or not the value of the bandwidth field 3823 of the acknowledgement packet 3801 coincides with the value of the bandwidth field 1202 designated by the local variable P is checked, and when it does, the flow proceeds to the step 2214 and when it does not, the flow proceeds to the step 2215. At the step 2214, the present time is set to the bandwidth updating time field 1203 and a series of processings are completed. At the step 2215, the transfer request command 402 of the transfer request queue 401 designated by the local variable P is released. The entry designated by the local variable P is released and a series of processings are completed at the step 2216.

FIG. 45 shows the detail of the time-out processing. At the step 2311, the processor sets the pointer for the entry of the local bandwidth reservation table 1011 in which the stream ID 1201 of this table 1011 coincides with the stream ID field 3822 of the acknowledgement packet 3801 to the local variable P designating the pointer for the entries of the table 1011. At the step 2211, whether or not the entry of the local bandwidth reservation table 1011 in which the stream ID 1201 of this table 1011 coincides with the stream ID field 3822 of the acknowledgement packet 3801 exists is checked, and when it does, the flow proceeds to the step 2313 and when it does not, a series of processings are completed.

At the step 2313, the processor secures the input/output buffer 312 for the continued bandwidth reservation packet as the request packet 3801 for the continued bandwidth reservation, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the continued bandwidth reservation to the command field 3721, the value of the stream ID field 1201 designated by the local variable P to the stream ID field, the value of the bandwidth field 1202 designated by the local variable P to the bandwidth field 3723 and a primary value to the request ID field 3725. At the step 2314, the processor secures the transfer request command 402 for the traffic control command requesting the transfer of the continued bandwidth reservation packet 3701, and then sets the address of the bandwidth release packet or the continued bandwidth reservation packet 3701 to the pointer field 412 for the buffer of the transfer request command 402 so secured, and the data length of the bandwidth release packet of the continued bandwidth reservation packet 3701 to the transfer data length field 413. At the step 2315, the transfer request command 402 secured at the step 2314 is connected to the traffic control command queue 1008 and a series of processings are completed.

In the explanation given above, the address of the bandwidth reservation manager 901 is assumed to be known is advance, but it is easily possible to apply a method which uses broadcast for this address, a method which uses the address detected at the activation of a local bandwidth reservation management 101 or the address detected periodically, by using means for detecting the address of the bandwidth reservation manager 901, or a method which uses a specific address using the address of the bandwidth reservation manager 901.

Next, the principal data structures shown in FIG. 33 will be explained with reference to FIGS. 46 to 48.

Figures 46, 47, 48:
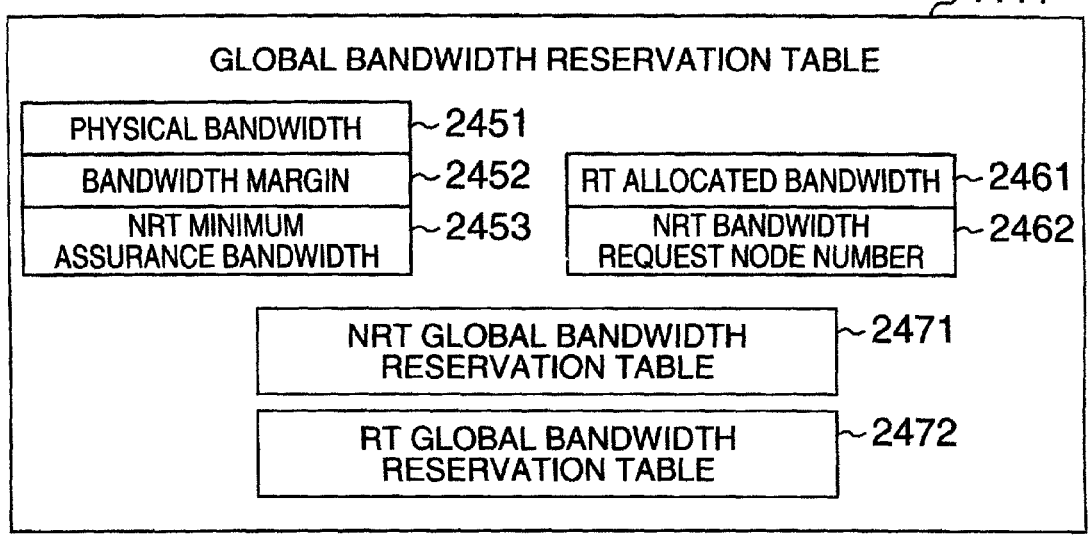
FIG. 46 shows the structure of a global bandwidth reservation table in the embodiment 5.
FIG. 47 shows the structure of an NRT global bandwidth reservation table in the embodiment 5.
FIG. 48 shows the structure of an RT global bandwidth reservation table in the embodiment 5.

FIG. 46 shows the structure of the global bandwidth reservation table 1111. The value representing the total of the data quantity that can be transferred by the network 111 per unit time is stored in the physical bandwidth 2451. The data quantity that is secured as a margin per unit time is secured in the bandwidth margin 2452. The lower limit value of the quantity of the data allocated to the NRT transfer that can be transferred per unit time is set to the NRT minimum assurance bandwidth 2453. The quantity of the data allocated to the RT transfer that can be transferred per unit time is stored in the RT allocated bandwidth 2461. The number of nodes allocating the data quantity for the NRT transfer that can be transferred per unit time is stored in the NRT request node number 2462. The detailed data for each node to which the data quantity, that can be transferred per unit time for the NRT communication and is allocated to the NRT transfer, is stored in the NRT global bandwidth reservation table 2471 as will be described in detail with reference to FIG. 47. Further, the detailed data for each node to which the data quantity transferrable per unit time for the RT communication is stored in the RT global bandwidth reservation table 2472 as will be described in detail with reference to FIG. 48.

FIG. 47 shows the structure of the NRT global bandwidth reservation table 2471. The NRT global bandwidth reservation table 2471 includes the entries 2521 to 2525 for the nodes to which the bandwidth are allocated for the NRT communication. Each entry comprises a stream ID field 2511 representing an identifier of the stream, a requester address field 2512 for storing the address of the node to which the bandwidth is allocated, an acceptance time field 2513 for storing the bandwidth allocation time and the acceptance time of the bandwidth continuation, a status flag field 2514 representing the status of each entry and a request ID field 2515 for primarily recognizing the request when the bandwidth is allocated.

FIG. 48 shows the structure of the RT global bandwidth reservation table 2472. The RT global bandwidth reservation table 2472 includes entries 2621 to 2625 for the streams to which the bandwidth is allocated for the RT communication. Each entry comprises a stream ID field 2611 representing an identifier of the stream, a requester address field 2612 for storing the address of the node to which the bandwidth is allocated, an acceptance time field 2613 for storing the bandwidth allocation time and the acceptance time of the bandwidth continuation, a status flag field 2614 representing the status of each entry, a request ID field 2615 for recognizing primarily the requests when the bandwidth is allocated, and an allocated bandwidth field 2616 for storing the allocated bandwidth.

Next, each of the modules shown in FIG. 33 will be explained with reference to FIGS. 49 to 58.

Figure 49:
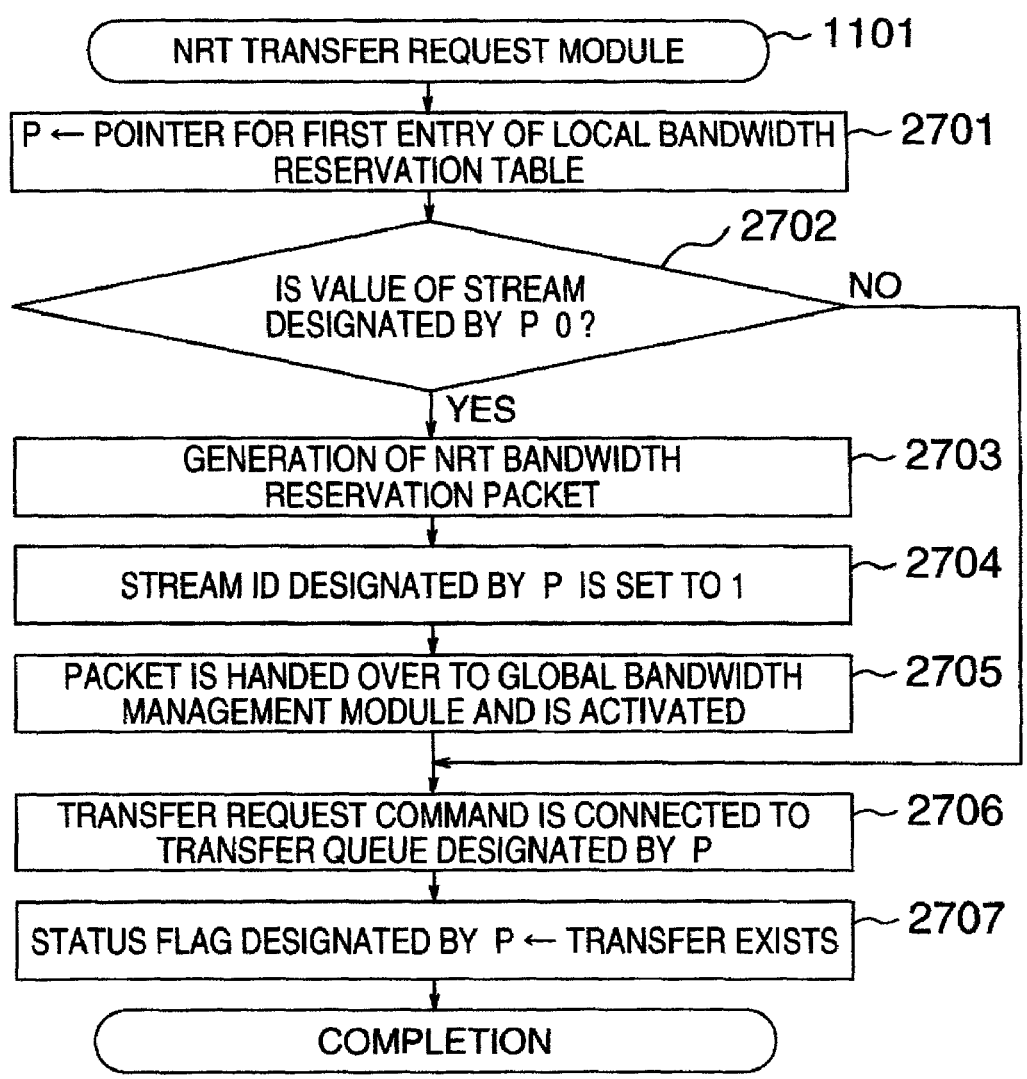
FIG. 49 is a flowchart of an NRT transfer request module of a bandwidth reservation management node in the embodiment 5.

FIG. 49 shows a processing flow of the NRT transfer request module 1101. At the step 2701, the processor sets the pointer for the first entry 1211 of the local bandwidth reservation table 1011 to the local variable P representing the entries of the local bandwidth reservation table 1011. At the step 2702, the value of the stream ID designated by the local variable P is checked. When it is 0, the flow proceeds to the step 2703 so as to secure the NRT bandwidth and when it is not, the flow proceeds to the step 2706. At the step 2703, the processor secures the input/output buffer 312 for the bandwidth reservation packet as the request packet 3701 for reserving the bandwidth, and then sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth reservation to the command field 3721, 0 to the bandwidth field 3723 and a primary value to the request ID field 3725.

At the step 2704, 1 is set to the stream ID designated by the local variable P while 0 is set to the bandwidth designated by the local variable P lest the bandwidth reservation occurs in multiplicity and the bandwidth is used before the bandwidth reservation is confirmed. At the step 2705, the bandwidth reservation packet 3701 secured at the step 2703 is handed over to the global bandwidth reservation management module 1102 and this module 1102 is activated. At the step 2706, the transfer request command 402 designated by the user program is connected to the transfer request queue 402 of the entry designated by the local variable P. After the value representing that the transfer exists is set to the status flag field 1204 designated by the local variable P, a series of processings are completed at the step 2707.

Figure 50:
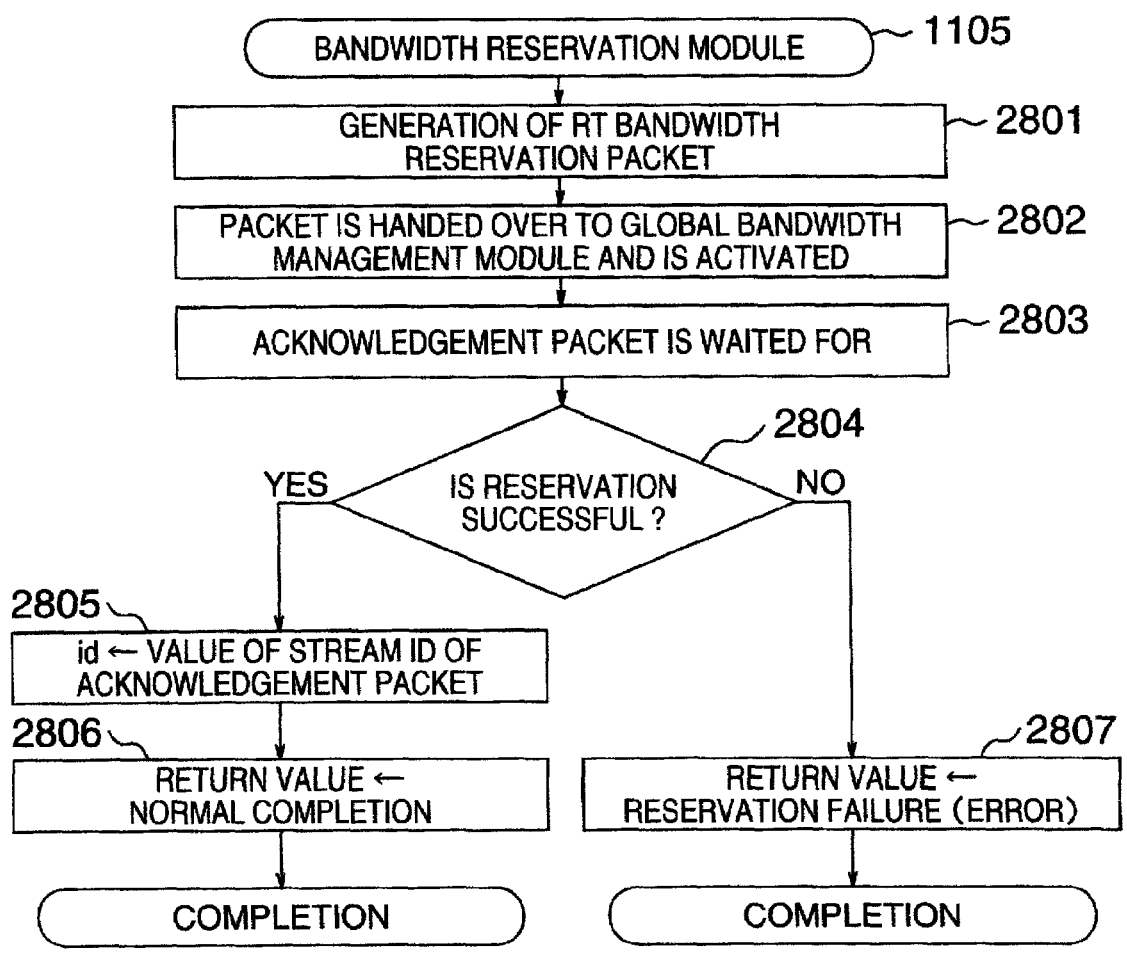
FIG. 50 is a flowchart of a bandwidth reservation module of a bandwidth reservation management node in the embodiment 5.

FIG. 50 shows a processing flow of the bandwidth reservation module 1105. At the step 2801, the processor secures the input/output buffer 312 for the bandwidth reservation packet as the request packet 3701 for reserving the bandwidth and then sets the address of the local bandwidth reservation manager 901 to the destination address field 3711 of the request packet 3701 so secured, the address of its own node to the source address field 3712 and to the requester address field 3724, the value representing the request packet to the type field 3713, the value representing the bandwidth reservation to the command field 3721, the value designated by the argument bw to the bandwidth field 3723 and a primary value to the request ID field 3725. At the step 2802, the bandwidth reservation packet 3701 secured at the step 3801 is handed over to the global bandwidth reservation management module 1102 and this module 1102 is activated. At the step 2803, the arrival notification of the acknowledgement packet 3801, in which the request ID field 3725 of the bandwidth reservation packet coincides with the request ID field 3825 of the acknowledgement packet 380-1, is awaited from the local bandwidth reservation management module 1007. When the value of the bandwidth field 3823 of the acknowledgement packet 3801 receiving the arrival notification coincides with the value designated by the argument bw, the flow proceeds to the step 2805 and when it does not, the flow proceeds to the step 2807. At the step 2805, the value of the identifier field 3822 of the acknowledgement packet 3801 is set to the area designated by the argument id. At the step 2806, the value representing normal completion is set as the return value and a series of processings are completed. At the step 2807, the value representing the failure of the bandwidth reservation is set as the return value and a series of processings are completed.

Figure 51:
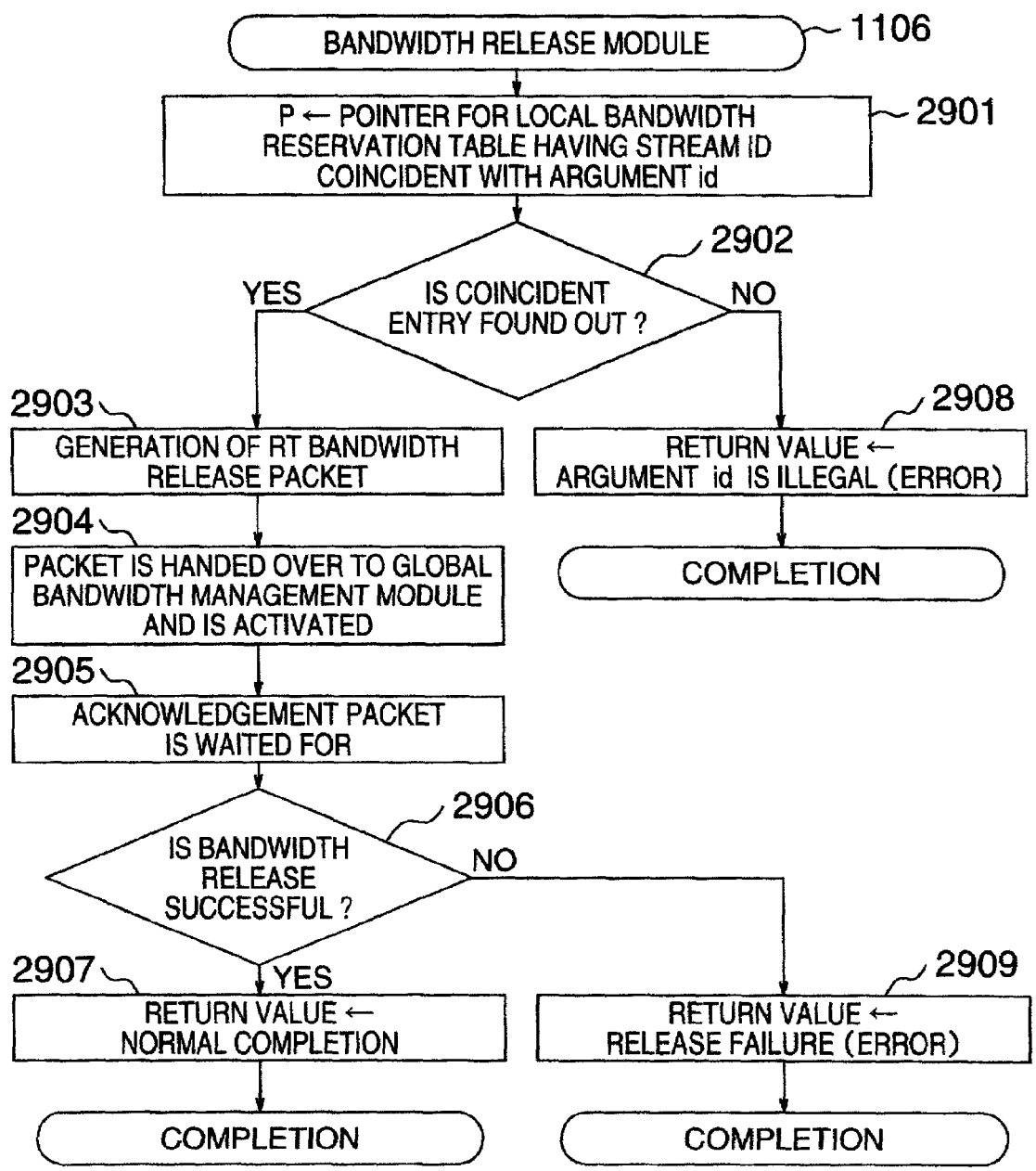
FIG. 51 is a flowchart of a bandwidth release module of a bandwidth reservation management node in the embodiment 5.

FIG. 51 shows a processing flow of the bandwidth release module 1106. At the step 2901, the processor sets the pointer for the entries of the local bandwidth reservation table 1011 having the argument id which coincides with the stream ID 1201 of this table 1011 to the local variable P representing the pointer to the entries of the table 1011. At the step 2902, whether or not the entry of the local bandwidth reservation table 1011 having the argument id which coincides with the stream ID 1201 of this table 1011 exists is checked, and when it does, the flow proceeds to the step 2903 and when it does not, the flow proceeds to the step 2908. At the step 2903, the processor secures the input/output buffer 312 for the bandwidth release packet as the request packet 3701 for releasing the bandwidth, and sets the address of the bandwidth reservation manager 901 to the destination address field 3711 of the request packet 3701 so secured, the address of its own node to the source address field 3712 and to the requester address field 3724, the value representing the request packet to the type field 3713, the value representing the bandwidth release to the command field 3712, the value of the stream ID field 1201 designated by the local variable P to the stream ID, the value of the bandwidth field 1202 designated by the local variable P to the bandwidth field 3723 and a primary value to the request ID field 3725.

At the step 2904, the processor hands over the bandwidth release packet 3701 secured at the step 2903 to the global bandwidth reservation management module 1102 and activates this module 1102. At the step 2905, the processor waits for the arrival notification of the acknowledgement packet 3801 in which the request ID field 3725 of the bandwidth release packet 3701 coincides with the request ID field 3825 of the bandwidth release packet 3701, from the local bandwidth reservation management module 1007. At the step 2906, whether or not the value of the bandwidth field 3823 of the acknowledgement packet 3801 receiving the arrival notification is 0 is checked, and when it is other than 0, the flow proceeds to the step 2907 and when it is 0, the flow proceeds to the step 2909. At the step 2907, the value representing normal completion is set as the return value and a series of processings are completed. At the step 2909, on the other hand, the value representing the failure of the bandwidth reservation is set as the return value and a series of processings are completed. Further, the value representing that the argument id is illegal is set as the return value and a series of processings are completed at the step 2908.

Figure 52:
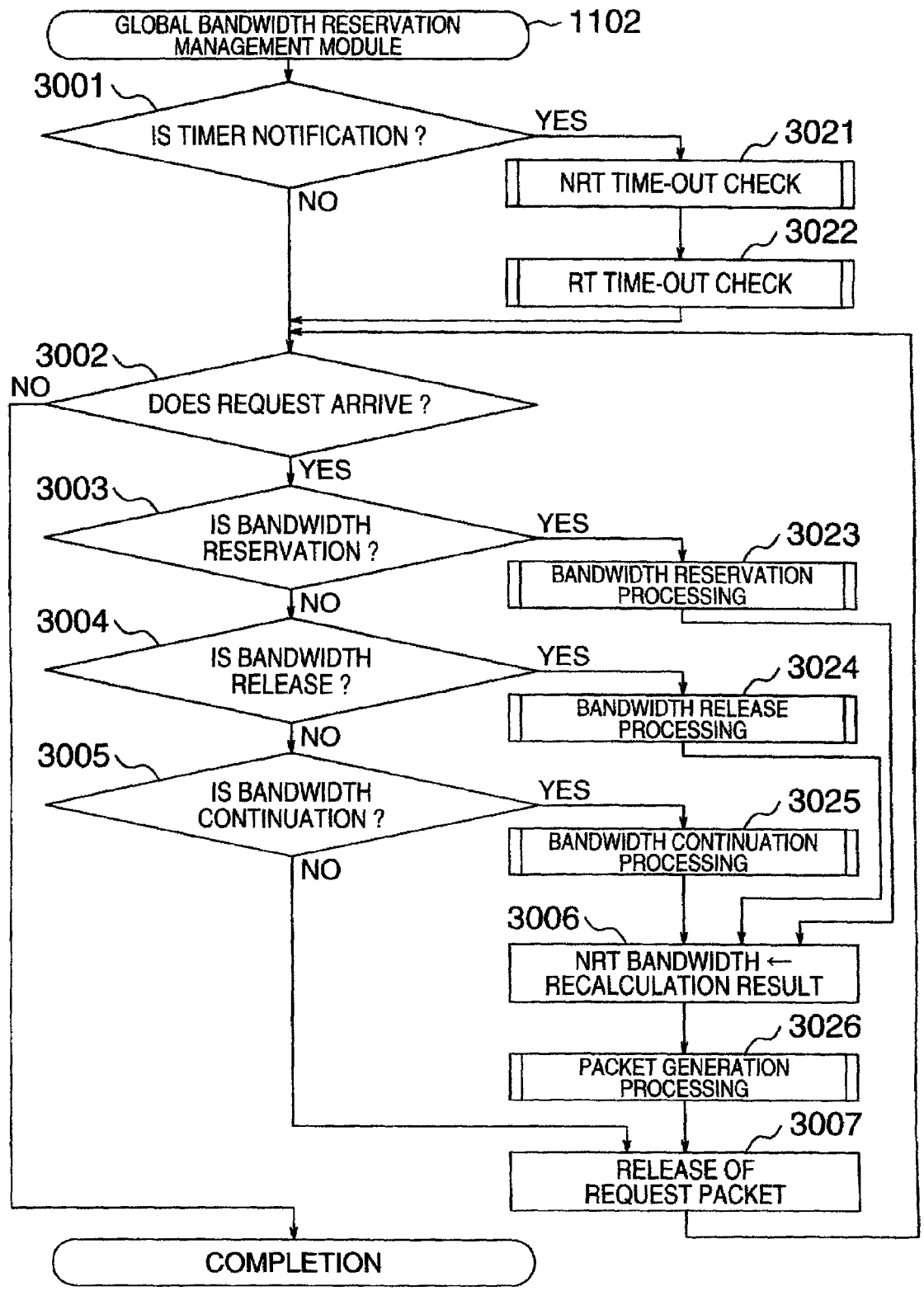
FIG. 52 is a flowchart of a global bandwidth reservation management module in the embodiment 5.

FIG. 52 shows a processing flow of the global bandwidth reservation management module 1102. This module 1102 is activated in the interval set to the timer interrupt handler 303 such as 40 msec, for example, through the scheduler 304. The global bandwidth reservation management module 1102 is also activated by the input/output interrupt handler 1104 through the scheduler 304 whenever the packet to be processed by this module 1102 arrives. At the step 3001, whether or not the call of the module originates from the timer interrupt is judged, and when it does, the flow proceeds to the step 3021 and when it does not, the flow proceeds to the step 3002. At the step 3021, a series of processings due to time-out of the NRT bandwidth are executed. At the step 3002, whether or not the request packet 3701 arrives is checked, and when it does, the flow proceeds to the step 3003 and when it does not, a series of processings are completed.

Figure 55:
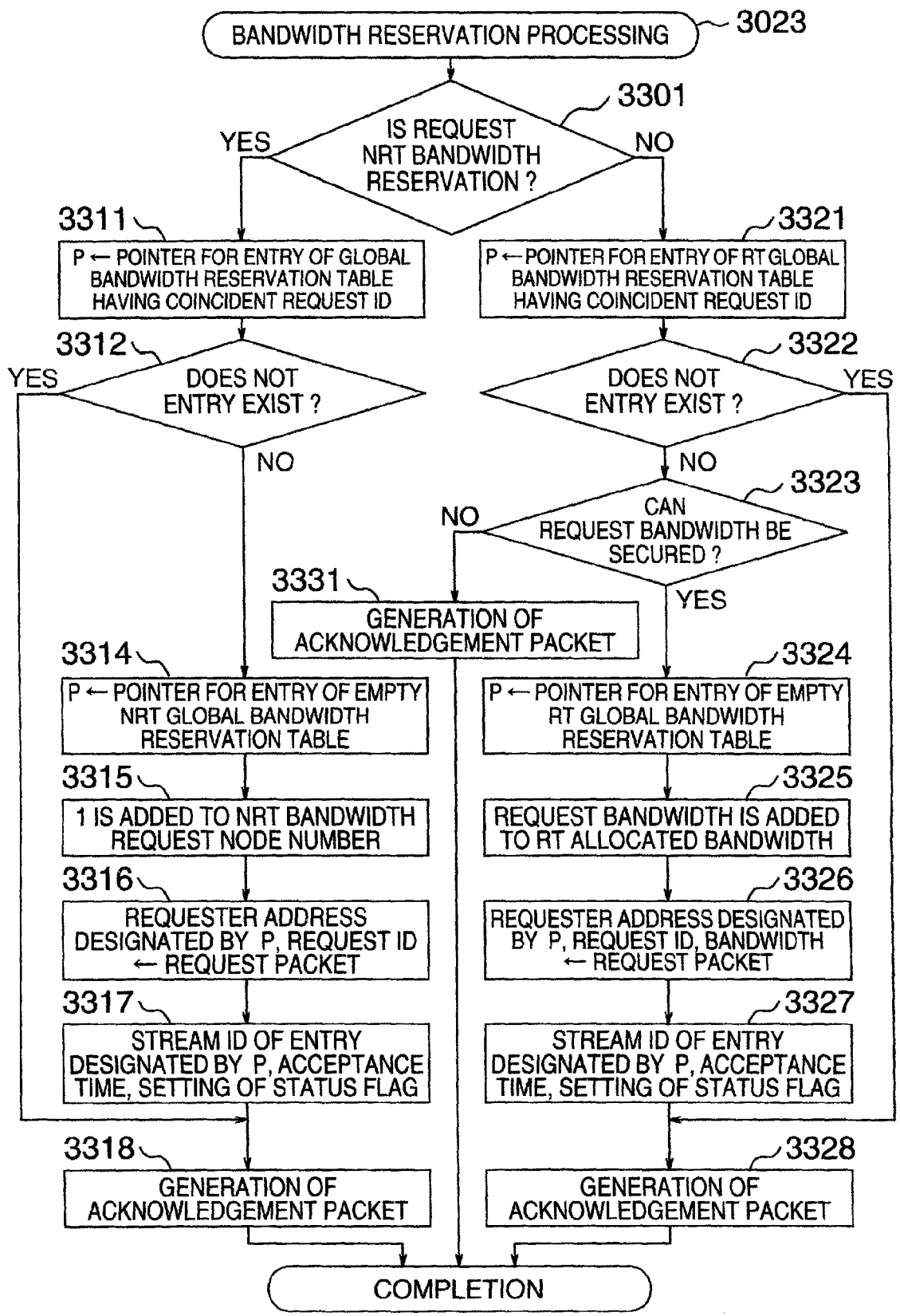
FIG. 55 is a flowchart of a bandwidth reservation processing in the embodiment 5.
Figure 56:
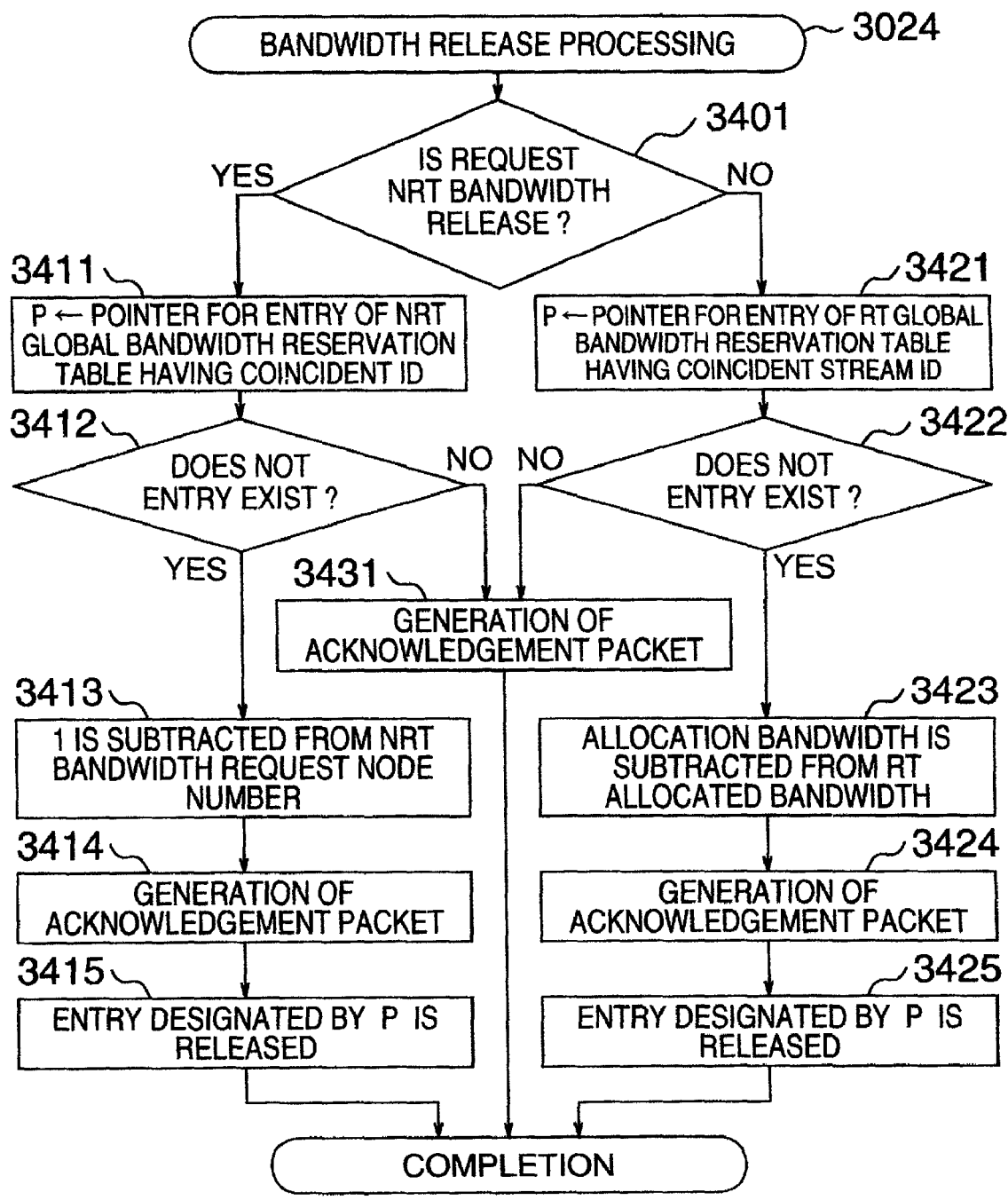
FIG. 56 is a flowchart of a bandwidth release processing in the embodiment 5.
Figure 57:
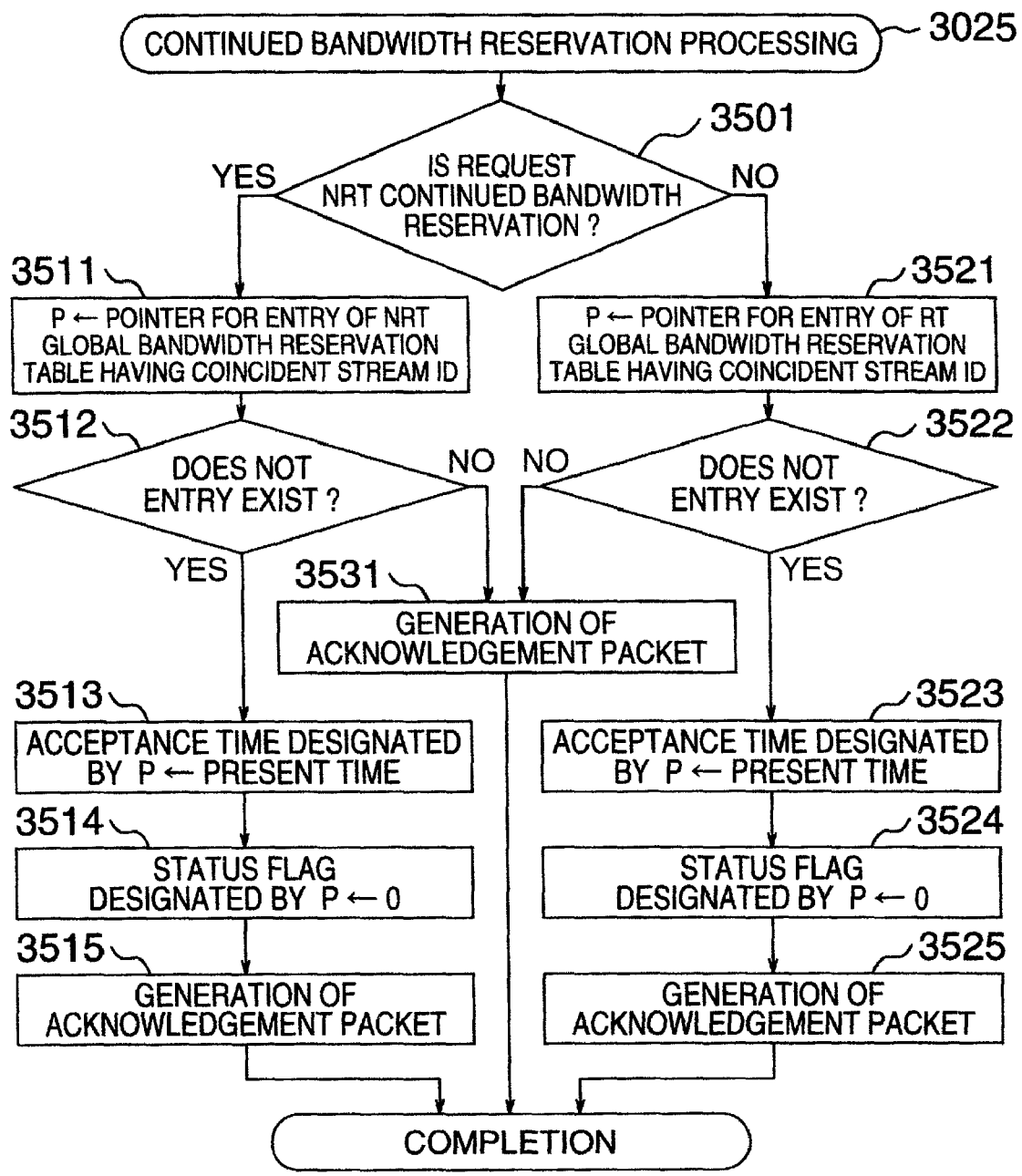
FIG. 57 is a flowchart of a bandwidth consecutive reservation processing in the embodiment 5.

At the step 3003, whether or not the value of the command field 3721 of the arriving request packet 3701 coincides with the value representing the bandwidth reservation is checked, and when it does, the flow proceeds to the step 3023 and when it does not, the flow proceeds to the step 3004. At the step 3023, a series of processings by the bandwidth reservation request shown in FIG. 55 are executed. At the step 3004, whether or not the value of the command field 3721 of the arriving request packet 3701 coincides with the value representing the bandwidth release is checked, and when it does, the flow proceeds to the step 3024 and when it does not, the flow proceeds to the step 3005. Next, a series of processings due to the bandwidth release request shown in FIG. 56 are executed at the step 3023. At the step 3005, whether or not the value of the command field 3721 of the arriving request packet 3701 coincides with the value representing the continued bandwidth reservation is checked, and when it does, the flow proceeds to the step 3025 and when it does not, the flow proceeds to the step 3007. At the step 3023, a series of processings due to the continued bandwidth reservation request shown in FIG. 57 are executed. At the step 3006, the value obtained by subtracting the bandwidth margin 2452 from the physical bandwidth 2451, the subtracting the RT allocated bandwidth 2461 from the balance and dividing further the balance so obtained by the NRT bandwidth request node number 2462 is set to the NRT bandwidth field 3826 of the acknowledgement packet 3801. At the step 3026, a series of processings for generating the packet shown in FIG. 36 are executed. At the step 3007, the input/output buffer 312 allocated to the request packet 3701 is released and the flow then proceeds to the step 3002.

Figure 53:
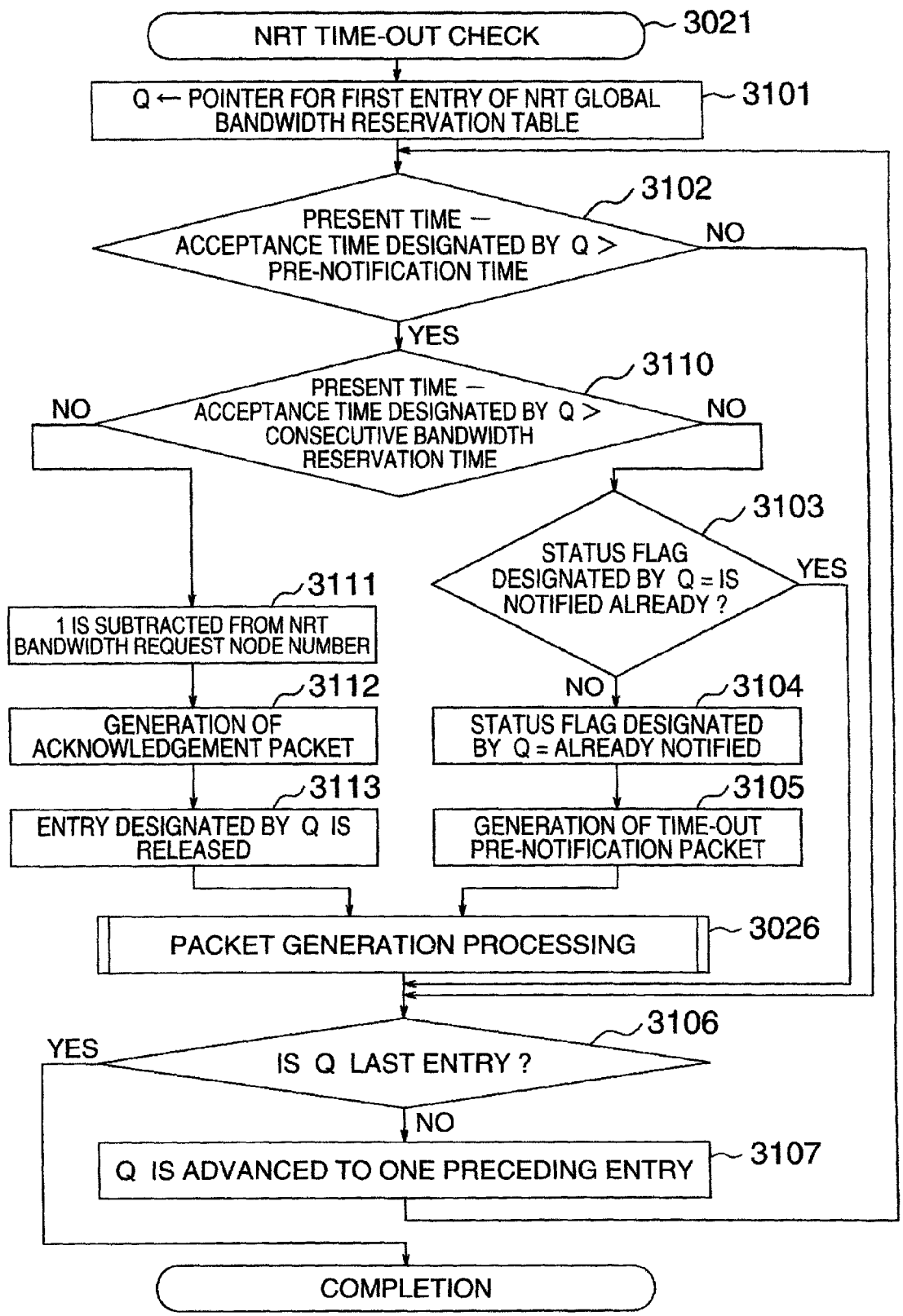
FIG. 53 is a flowchart of an NRT time-out check in the embodiment 5.

FIG. 53 shows a processing flow of the NRT time-out check 3021. At the step 3101, the processor sets the pointer for the first entry 2521 of the NRT global bandwidth reservation table 2471 to the local variable Q representing the pointer to the entries of this table 2471. At the step 3102, whether or not the difference of the value of the acceptance time field 2513 designated by the local variable Q from the present time exceeds the pre-notification time such as seconds is checked, and when it does, the flow proceeds to the step 3110 and when it does not, the flow proceeds to the step 3106. At the step 3110, whether or not the difference of the value of the acceptance time field 2513 designated by the local variable Q from the present time exceeds the consecutive bandwidth reservation time such as 12 seconds is checked, and when it does, the flow proceeds to the step 3111 and when it does not, the flow proceeds to the step 3103. At the step 3111, the balance obtained by subtracting 1 from the value of the NRT bandwidth request node number 2462 is set to the NRT bandwidth request node number 2462.

At the step 3112, the processor secures the input/output buffer 312 for the acknowledgement packet 3801, and sets the broadcast address to the destination address field 3811 of the acknowledgement packet 3801 so secured, the address of its own node to the source address field 3812, the value representing the acknowledgement packet to the type field 3813, the value representing the bandwidth release acknowledgement to the command field 3821, the value of the stream ID field 2511 designated by the local variable Q to the stream ID field 3822, 0 to the bandwidth field 3823, the value of the requester address field 2512 designated by the local variable Q to the requester address field 3824 and 0 to the request ID field 3825. The entry designated by the local variable Q is released at the step 3113. At the step 3103, whether or not the value of the status flag 2514 designated by the local variable Q coincides with the value that has been notified is checked, and when it does, the flow proceeds to the step 3106 and when it does not, the flow proceeds to the step 3104. At the step 3104, the value representing completion of the notification is set to the status flag 2514 designated by the local variable Q.

At the step 3105, the processor secures the input/output butter 312 for the acknowledgement packet 3801, and sets the value of the requester address field 2512 designated by the local variable Q to the destination address field 3811 of the acknowledgement packet 3801 so secured and to the requester address field 3824, the address of its own node to the source address field 3812, the value representing the acknowledgement packet to the type field 3813, the value representing the time-out pre-notification to the command field 3821, the value of the stream ID field 2511 designated by the local variable Q to the stream ID field 3822, 0 to the bandwidth field 3823, and 0 to the request ID field 3825. At the step 3026, a series of processings shown in FIG. 36 are executed. At the step 3106, whether or not the entry designated by the local variable Q is the last entry is checked and when it is, a series of processings are completed and when it is not, the flow proceeds to the step 3107. At the step 3107, the local variable Q is set to the pointer for the next entry and the flow proceeds to the step 3102.

Figure 54:
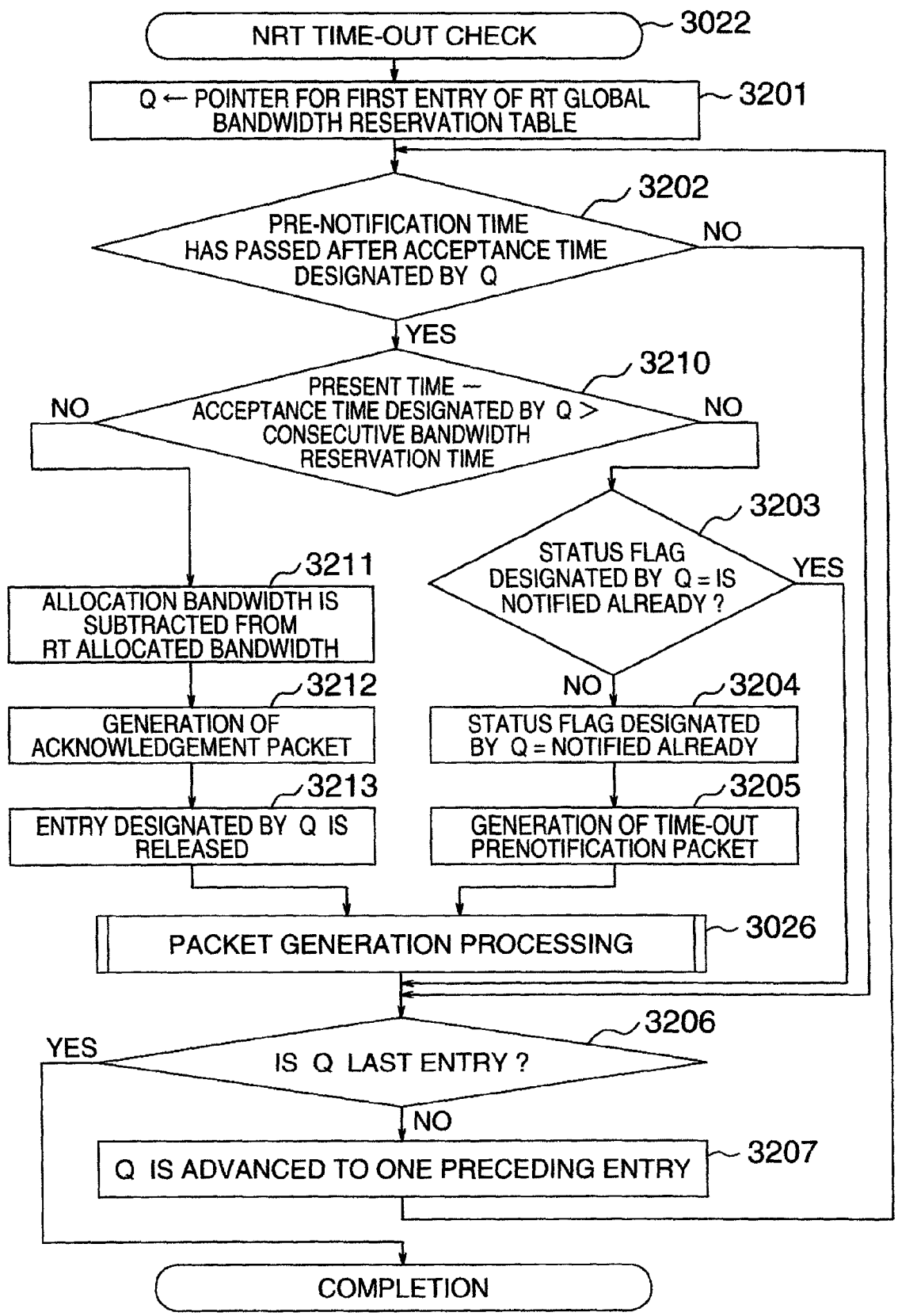
FIG. 54 is a flowchart of an RT time-out check in the embodiment 5.

FIG. 54 shows a processing flow of the RT time-out check 3022. At the step 3201, the processor sets the pointer for the first entry 2521 of the RT global bandwidth reservation table 2472 to the local variable Q representing the pointer to the entries of the RT global bandwidth reservation table 2472. At the step 3202, it is checked whether or not the pre-notification time, which is set by the server by adding a slight time to the consecutive bandwidth reservation time (FIG. 41), such as 10 seconds, has passed after the acceptance time held in the field 2613 designated by the local variable Q and when it does, the flow proceeds to the step 3210 and when it does not, the flow proceeds to the step 3206. The time field 2613 has a time inputted at step 3317 or 3327 (FIG. 55), or step 3513 or 3523 (FIG. 57). At the step 3210, whether or not the difference of the value of the acceptance time field 2613 designated by the local variable Q from the present time exceeds the maximum allowable consecutive bandwidth reservation time, which is set by the server by adding a slight time to the pre-notification time, such as 12 seconds, is checked, and when it does, the flow proceeds to the step 3211 and when it does not, the flow proceeds to the step 3203. At the step 3211, the value obtained by subtracting the allocation bandwidth 2616 designated by the local variable Q from the RT allocated bandwidth 2461 is set to the RT allocated bandwidth 2461.

At the step 3212, the processor secures the input/output buffer 312 for the acknowledgement packet 3801 and sets the broadcast address to the destination address field 3811 of the acknowledgement packet 3801 so secured, the address of its own node to the source address field 3812, the value representing the acknowledgement packet to the type field 3813, the value representing the bandwidth release acknowledgement to the command field 3821, the value of the stream ID field 2611 designated by the local variable Q to the stream ID field 3822, the value of the allocation bandwidth field 2616 designated by the local variable Q to the bandwidth field 3823, the value of the requester address field 2612 designated by the local variable Q to the requester address field 3824 and 0 to the request ID field 3825. Then, the entry designated by the local variable Q is released at the step 3213. At the step 3203, whether or not the value of the status flag 2614 designated by the local variable Q coincides with the value that has been notified, and when it does, the flow proceeds to the step 3206 and when it does not, the flow proceeds to the step 3204. At this step 3204, the value representing completion of the notification is set to the status flag 2614 designated by the local variable Q.

Figure 58:
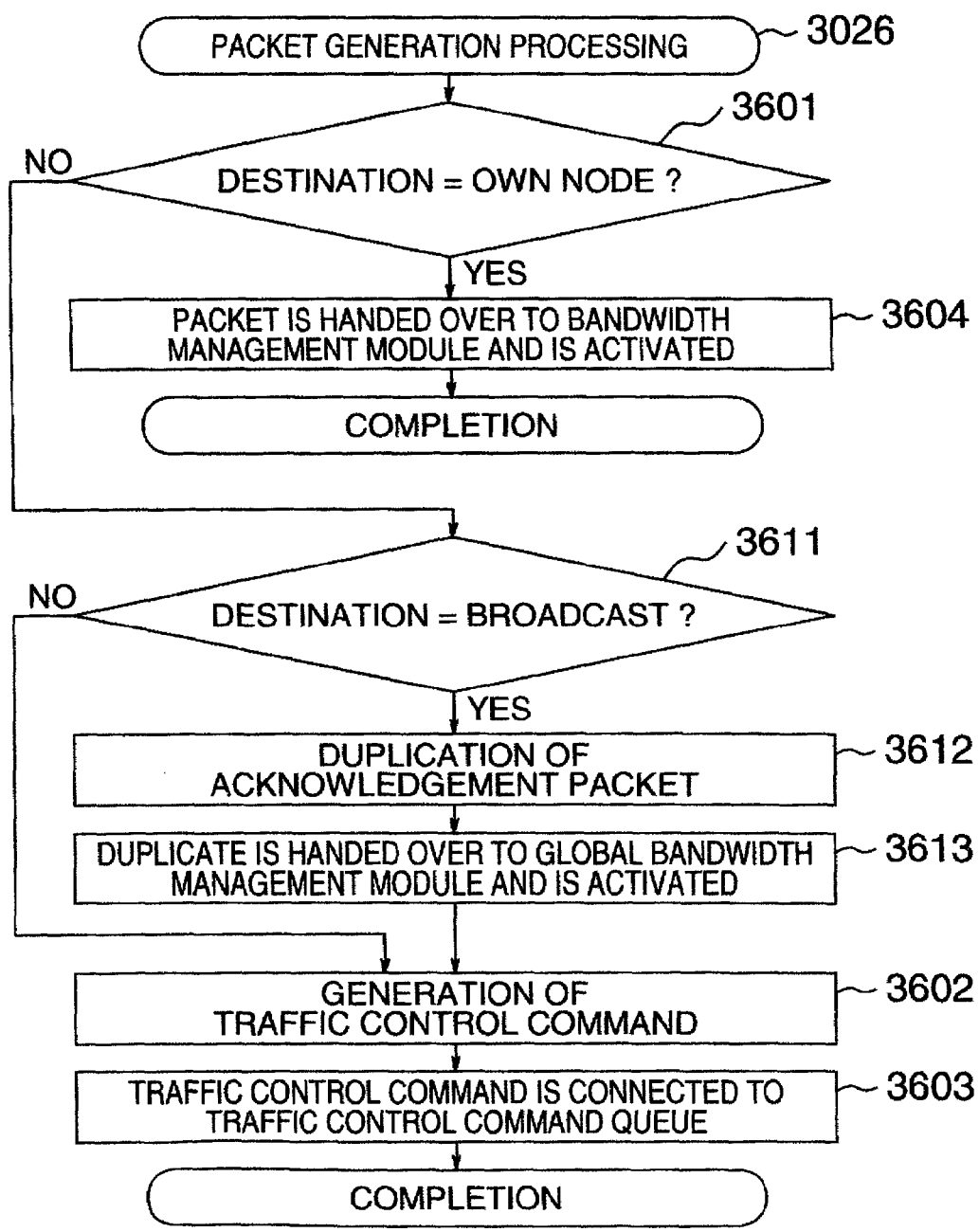
FIG. 58 is a flowchart of a packet generation processing in the embodiment 5.

At the step 3205, the processor secures the input/output buffer 312 for the acknowledgement packet 3801, and sets the value of the requester address field 2612 designated by the local variable Q to the destination address field 3811 of the acknowledgement packet 3801 so secured and to the requester address field 384, the address of its own node to the source address field 3812, the value representing the acknowledgement packet to the type field 3183, the value representing the time-out pre-notification to the command field 3821, the value of the stream ID field 2611 designated by the local variable Q to the bandwidth field 3823 and 0 to the request ID field 3825. At the step 3026, a series of processings for generating the packet shown in FIG. 58 are executed. At the step 3206, whether or not the entry designated by the local variable Q is the last entry is checked, and when it does, a series of processings are completed and when it is not, the flow proceeds to the step 3207. At this step 3207, the local variable Q is set to the pointer for the next entry and the flow proceeds to the step 3202.

FIG. 55 shows a processing flow of the bandwidth reservation processing 3023. At the step 3301, whether or not the value of the bandwidth field 3723 of the request packet 3701 is 0 is checked, and when it is 0, the flow proceeds to the step 3311 and when it is not, the flow proceeds to the step 3321. At the step 3311, the pointer for the entry in which the value of the request ID field 3725 of the request packet 3701 coincides with the value of the request ID field 2515 of the NRT global bandwidth reservation table 2471 is set to the local variable P representing the pointer to the entries of this table 2471. Whether or not the entry in which the value of the request ID field 3725 of the request packet 3701 coincides with the value of the request ID field 2515 of the NRT global bandwidth reservation table 2471 exists is checked at the step 3311, and when it does, the flow proceeds to the step 3318 and when it does not, the flow proceeds to the step 3314 from the step 3312. At the step 1314, the pointer for the empty entry of the NRT global bandwidth reservation table 2471 is set to the local variable P. At the step 3315, the value as the sum of 1 and the NRT bandwidth request node number 2462 is set to the NRT bandwidth request number 2462. At the step 3316, the processor sets the value of the requester address field 3324 of the request packet 3701 to the requester address field 2512 designated by the local variable P and the value of the request ID field 3725 of the request packet 3701 is set to the request ID field 2515 designated by the local variable P. At the step 3317, a primary value is set to the stream ID field 2511 designated by the local variable P, the present time is set to the acceptance time field 2513 designated by the local variable P, and 0 is set to the status flag 2514 designated by the local variable P.

At the step 3318, the processor secures the input/output buffer 312 for the acknowledgement packet 3801, and sets the broadcast address to the destination address field 3811 of the acknowledgement packet 3801 so secured, the address of its own node to the source address field 3812, the value representing the acknowledgement packet to the type field 3813, the value representing the bandwidth reservation acknowledgement to the command field 3821, the value of the stream ID field 2511 designated by the local variable P to the stream ID field 3822, 0 to the bandwidth field 3823, the value of the requester address field 2512 designated by the local variable P to the requester address field 3824 and the value of the request ID field 2515 designated by the local variable P to the request ID field 3825. Thereafter, the processor completes a series of processings.

At the step 3321, the pointer for the entry in which the value of the request ID field 3725 of the request packet 3701 coincides with the value of the request ID field 2615 of the RT global bandwidth reservation table 2472 is set to the local variable P representing the pointer for the entries of the RT global bandwidth reservation table 2472. Whether or not the entry in which the value of the request ID field 3725 of the request packet 3701 coincides with the value of the request ID field 2615 of the global bandwidth reservation table 2472 exists is checked at the step 3322, and when it does, the flow proceeds to the step 3328 and when it does not, the flow proceeds to the step 3323, from the step 3321. At the step 3323, whether or not the sum of the value of the RT allocated bandwidth 2461, the value of the NRT minimum assurance bandwidth 2453, the value of the bandwidth field 3723 of the request packet 3701 and the value of the bandwidth margin 2452 exceeds the value of the physical bandwidth 2451 is checked, and when it does, the flow proceeds to the step 3331 and when it does not, the flow proceeds to the step 3324.

At the step 3324, the pointer for the empty entry of the RT global bandwidth reservation table 2472 is set to the local variable P. At the step 3325, the sum of the RT allocated bandwidth 2461 and the value of the bandwidth field 3723 of the request packet 3701 is set to the RT allocated bandwidth 2461. At the step 3326, the processor sets the value of the requester address field 3724 of the request packet 3701 to the requester address field 2612 designated by the local variable P, the value of the request ID field 3725 to the request ID field 2615 designated by the local variable P and the value of the bandwidth field 3723 of the request packet 3701 to the allocation bandwidth field 2616 designated by the local variable P. At the step 3327, a primary value is set to the stream ID field 2611 designated by the local variable P, the present time is set to the acceptance time field 2613 designated by the local variable P and 0 is set to the status flag field 2614 designated by the local variable P.

At the step 3328, the processor secures the input/output buffer 312 for the acknowledgement packet 3801, and sets the broadcast address to the destination address field 3811 of the acknowledgement packet 3801 so secured, the address of its own node to the source address field 3812, the value representing the acknowledgement packet to the type field 3813, the value representing the bandwidth reservation acknowledgement to the command field 3821, the value of the stream ID field 2611 designated by the local variable P to the stream ID field 3822, the value of the bandwidth allocation field 2616 designated by the local variable P to the bandwidth field 3823, the value of the requester address field 2612 designated by the local variable P to the requester address field 3824 and the value of the request ID 2615 designated by the local variable P to the request ID field 3825. Thereafter, the processor completes a series of processings. At the step 3331, the processor secures the input/output buffer 312 for the acknowledge packet 3801, and sets the value of the requester address field 3724 of the request packet 3701 to the destination address field 3811 of the acknowledgement packet 3801 so secured and to the requester address field 3824, the address of its own node to the source address field 3812, the value representing the acknowledgement packet to the type field 3813, the value representing the bandwidth reservation acknowledgement to the command field 3821, 0 to the stream ID field 3822, 0 which represents that the RT transfer bandwidth cannot be secured to the bandwidth field 3823 and the value of the request ID field 3725 of the request packet 3701 to the request ID field 3825. Thereafter, the processor completes a series of processings.

FIG. 56 shows a processing flow of the bandwidth release processing 3024. At the step 3401, whether or not the value of the bandwidth field 3723 of the request packet 3701 is 0 is checked, and when it is 0, the flow proceeds to the step 3411 and when it is not, the flow proceeds to the step 3421. At the step 3411, the pointer for the entry in which the value of the stream ID field 3722 of the request packet 3701 coincides with the value of the stream ID field 2511 of the NRT global bandwidth reservation table 2471 is set to the local variable P representing the pointer for the entries of the NRT global bandwidth reservation table 2471. At the step 3411, whether or not the entry in which the value of the stream ID 3722 of the request packet 3701 coincides with the value of the stream ID field 2511 of the NRT global bandwidth reservation table 2471 exists is checked, and when it exists, the flow proceeds to the step 3413 and when it does not, the flow proceeds to the step 3431 from the step 3412. At the step 3413, the balance obtained by subtracting 1 from the NRT bandwidth request node number 2462 is set to the RT bandwidth request node number 2462.

At the step 3414, the processor secures the input/output buffer 312 for the acknowledgement packet 3801 and sets the broadcast address to the destination address field 3811 of the acknowledgement packet 3801 so secured, the address of its own node to the source address field 3812, the value representing the release packet to the type field 3821, the value representing the bandwidth release acknowledgement to the command field 3821, the value of the stream ID field 2511 designated by the local variable P to the stream ID field 3822, 0 to the bandwidth field 3823, the value of the requester address field 2512 designated by the local variable P to the requester address field 3824 and the value of the request ID field 3725 of the request packet 3701 to the request ID field 3825. At the step 3415, the processor releases the entry designated by the local variable P and completes a series of processings.

At the step 3421, the pointer for the entry in which the value of the stream ID field 3722 of the request packet 3701 coincides with the value of the stream ID field 2611 of the RT global bandwidth reservation table 2472 is set to the local variable P representing the pointer for the entries of the RT global bandwidth reservation table 2472. Whether or not the entry in which the value of the stream ID field 3722 of the request packet 3701 coincides with the value of the stream ID field 2611 of the RT global bandwidth reservation table 2427 exists is checked at the step 3421, and when it does, the flow proceeds to the step 3423 and when it does not, the flow proceeds to the step 3423 and when it does not, the flow proceeds to the step 3431, from the step 3422. At the step 3423, the value obtained by subtracting the value of the allocation bandwidth field 2616 designated by the local variable P from the RT allocated bandwidth 2461 is set to the RT allocated bandwidth 2461.

At the step 3424, the processor secures the input/output buffer 312 for the acknowledgement packet 3801, and sets the broadcast address to the destination address field 3811 of the acknowledgement packet 3801 so secured, the address of its own node to the destination address field 3812, the value representing the acknowledgement packet to the type field 3813, the value representing the bandwidth release acknowledgement to the command field 3821, the value of the stream ID field 2611 designated by the local variable P to the stream ID field 3822, 0 to the bandwidth field 3823, the value of the requester address field 2612 designated by the local variable P to the requester address field 3824 and the value of the request ID field 3725 of the request packet 3701 to the request ID field 3825. At the step 3425, the entry designated by the local variable P is released and a series of processings are completed.

At the step 3431, the processor secures the input/output buffer 312 for the acknowledgement packet 3801, and sets the value of the requester address field 3724 of the request packet 3701 to the destination address field 3811 of the acknowledgement packet 3801 so secured and to the requester address field 3824, the address of its own node to the source address field 3812, the value representing the acknowledgement packet to the type field 3813, the value representing the bandwidth release acknowledgement to the command field 3821, 0 to the stream ID 3822, 0 to the bandwidth field 3823 and the value of the request ID field 3725 of the request packet 3701 to the request ID field 3825, and a series of processings are completed.

FIG. 57 shows a processing flow of the consecutive bandwidth reservation processing 3025. At the step 3501, whether or not the value of the bandwidth field 3723 of the request packet 3701 is 0 is checked, and when it is 0, the flow proceeds to the step 3511 and when it is not, the flow proceeds to the step 3521. At the step 3511, the pointer for the entry in which the value of the stream ID field 3722 of the request packet 3701 coincides with the value of the stream ID field 2511 of the NRT global bandwidth reservation table 2471 is set to the local variable P representing the pointer for the entries of the NRT global bandwidth reservation table 2471. At the step 3511, whether or not the entry in which the value of the stream ID field 3722 of the request packet 3701 coincides with the value of the stream ID 2511 of the NRT global bandwidth reservation table 2471 exists is checked, and when it does, the flow proceeds to the step 3513 and when it does not, the flow proceeds to the step 3531, from the step 3512. At the step 3513, the present time is set to the acceptance time field 2513 designated by the local variable P. At the step 3514, 0 is set to the status flag field 2514 designated by the local variable P.

At the step 3515, the processor secures the input/output buffer 312 for the acknowledge packet 3801, and sets the value of the requester address field 2512 designated by the local variable P to the destination address field 3811 of the acknowledgement packet 3801 so secured and to the requester address field 3824, the address of its own node to the source address field 3812, the value representing the acknowledgement packet to the type field 3813, the value representing the consecutive bandwidth reservation acknowledgement to the command field 3821, the value of the stream ID field 2511 designated by the local variable P to the stream ID field 3822 and the value of the request ID field 3725 of the request packet 3701 to the request ID field 3825. Thereafter, the processor completes a series of processings.

At the step 3521, the pointer for the entry in which the value of the stream ID field 3722 of the request packet 3701 coincides with the value of the stream ID field 2611 of the RT global bandwidth reservation table 2472 is set to the local variable P representing the pointer to the entries of the RT global bandwidth reservation table 2472. Next, whether or not the entry in which the value of the stream ID field 3722 of the request packet 3701 coincides with the value of the stream ID field 2611 of the RT global bandwidth reservation table 2472 exists is checked at the step 3521, and when it does, the flow proceeds to the step 3523 and when it does not, the flow proceeds to the step 3531, from the step 3521. At the step 3523, the present time is set to the acceptance time field 2613 designated by the local variable P and at the step 3524, 0 is set to the status flag field 2614 designated by the local variable P.

At the step 3525, the processor secures the input/output buffer 312 for the acknowledgement packet 3801, and sets the value of the requester address field 2612 designated by the local variable P to the destination address field 3811 of the acknowledgement packet 3801 so secured and to the requester address field 3824, the address of its own node to the source address field 3812, the value representing the acknowledgement packet to the type field 3813, the value representing the consecutive bandwidth reservation acknowledgement to the command field 3821, the value of the stream ID field 2611 designated by the local variable P to the stream ID field 3822, the value of the allocation bandwidth field 2616 designated by the local variable P to the bandwidth field 3823 and the value of the request ID field 3725 of the request packet 3701 to the request ID field 3825. Thereafter, the processor completes a series of processings.

At the step 3531, the processor secures the input/output buffer 312 for the acknowledgement packet 3801, and sets the value of the requester address field 3724 of the request packet 3701 to the destination address field 3811 of the acknowledgement packet 3801 so secured and to the requester address field 3824, the address of its own node to the source address field 3812, the value representing the acknowledgement packet to the type field 3813, the value representing the consecutive bandwidth reservation acknowledgement to the command field 3821, 0 to the stream ID field 3822, 0 to the bandwidth field 3823 and the value of the request ID field 3725 of the request packet 3701 to the request ID field 3825. Thereafter, the processor completes a series of processings.

FIG. 58 shows a processing flow of the packet generation processing 3026. At the step 3601, whether or not the destination address field 3811 of the acknowledgement packet 3801 coincides with the address of its own node is checked, and when it does, the flow proceeds to the step 3604 and when it does not, the flow proceeds to the step 3611. At the step 3604, the acknowledgement packet 3801 is handed over to the local bandwidth reservation management module 1007, this module 1007 is activated and a series of processings are completed. At the step 3611, whether or not the destination address field 3811 of the acknowledgement packet 3801 coincides with the broadcast address is checked, and when it does, the flow proceeds to the step 3612 and when it does not, the flow proceeds to the step 3602.

At the step 3612, the processor secures the input/output buffer 312 for duplication 3801 of the acknowledgement packet and sets the value of the acknowledgement packet 3801 to each of the fields 3811 to 3813 and 3821 to 3826 of the duplication 3801 of the acknowledgement packet so secured. At the step 3613, the duplication 3801 of the acknowledgement packet secured at the step 3612 is handed over to the local bandwidth reservation management module 1007, this module 1007 is actuated and the flow proceeds to the step 3602. At this step 3602, the processor secures the transfer request command 402 for the traffic control command requesting the transfer of the acknowledgement packet 3801 and sets the address of the acknowledgement packet 3801 to the pointer field 412 for the buffer of the transfer request command 402 so secured and the data length of the acknowledgement packet 3801 to the transfer data length field 413. At the step 3603, the transfer request command 402 secured at the step 3602 is connected to the traffic control command queue 1008 and series of processings are completed.

The user process allocates the designated bandwidth to the stream by utilizing the interface provided by the bandwidth reservation module 1005 and transfers the data by utilizing the interface provided by the RT transfer request module 1002 to thereby utilize the real-time communication. After completing the utilization of the real-time communication, the user process releases the bandwidth from the stream by utilizing the interface provided by the bandwidth release module 1006. Further, the user process transfers the data by utilizing the interface provided by the NPT transfer request module 1001 and utilizes the existing communication which does not require the bandwidth allocation.

The scheduling method of the present invention provides a CPU time allocation algorithm simultaneously satisfying a plurality of periodic CPU allocation requests. The variation of the execution start interval of the continuous media processing corresponding to one period obtained by using this algorithm is assured of becoming shorter than the driving interval of the periodic kernel process. In addition, for a process which is shorter in requested period, i.e., for a process which should have a suppressed absolute value of a variation of the execution start interval, the CPU time is allocated in a shorter time after the periodic kernel process is driven. As the period of a process becomes shorter, the variation of the execution start interval can be suppressed to a smaller value.

In the case where the arrival rate of the continuous media data is constant, input buffer management such as input buffer switching may be conducted periodically. If the periodic process scheduling can be assured, therefore, the process conducting the continuous media processing may spontaneously switch over input buffers and notification using an interrupt of input continuous media data arrival becomes unnecessary. Improvement in performance of continuous media processing owing to reduction of interrupt overhead can be anticipated.

Furthermore, in the scheduling method of the present invention, the wakeup and sleep of each of processes conducting the continuous media processing are implemented by changing the priority. As compared with the conventional method using the IPC, the overhead required for the wakeup and sleep can be reduced. From this point as well, improvement in performance of the continuous media processing can be anticipated.

In the case where a deadline miss occurs in one process group and a signal is transmitted to the subject process, the priority of the signal handler in the scheduling method of the present invention is assured of being lower than the priority of the process conducting the continuous media processing. Therefore, it can be assured that a processing delay of one stream does not affect the processing of other streams.

Furthermore, in the CPU allocation algorithm of the present invention, time periods allocated to process groups are made continuous as far as possible. Therefore, the number of times of process switching is suppressed to a minimum. Improvement in performance of the continuous media processing owing to the reduction of the overhead required for process switching can also be anticipated.

Furthermore, in the CPU allocation algorithm of the present invention, the execution time ratio between process groups is always kept constant. Even if a synchronizing mechanism such as a rendezvous is not used, therefore, synchronizing between streams can be realized.

Furthermore, the present invention can prevent the variation of the execution interval of the process conducting the continuous media processing when an asynchronous event has occurred.

It should be noted that the scheduling program described in the above embodiments can be down-loaded from a recording medium such as a hard disk or a CD-ROM or an external server to a predetermined location of the main memory of the computer system at the time of booting or switching-on.

A bridge system of existing networks and the network according to the present invention can be easily embodied by utilizing a computer having both of the Ethernet input/output controller that utilizes the existing communication method and the Ethernet input/output controller that utilizes the communication method according to the present invention.

In the LAN that has gained a wide application, the present invention can provide the real-time communication assuring the bandwidth for the Ethernet that has become wide spread, without changing the existing hardwares. Further, the present invention can accomplish the real-time communication through the internet by disposing a bridge system having the real-time feature between the networks assuring the bandwidth by hardwares such as an ATM (Automatic Teller Machine) and the LAN to which the present invention is applied.

What is claimed is:

1. A periodic process scheduling method of a computer system, said computer system including a plurality of processes, said periodic process scheduling method comprising the steps of:
    receiving requests for periodical execution of processes each with a period of execution and execution time;
    securing an allocation time for a process having shorter period than the other processes to be executed in each of respective periods of execution for said process;
    securing another allocation time for a part of another process within first of said respective periods of execution of said process other than said allocation time in said first of said allocation time for said process if full execution time of said another process cannot be secured within said first of said respective periods of execution of said process; and
    starting execution of said plurality of processes in respective secured allocation times provided for said plurality of processes.

2. A periodic process scheduling method of a computer system, said computer system including a plurality of processes, said periodic process scheduling method comprising the steps of:
    receiving requests for periodical execution of processes each with a period of execution and execution time;
    securing an allocation time for a process having shorter period than the other processes to be executed in each of respective periods of execution for said process;
    securing another allocation time for a part of another process within first of said respective periods of execution of said process other than said allocation time in said first of said allocation time for said process if full execution time of said another process cannot be secured within said first of said respective periods of execution of said process; and
    starting execution of said process in said secured allocation time and said another process in said secured another allocation time.

3. A periodic process scheduling method according to claim 2, further comprising the steps of:
    checking whether an allocation time secured for said first of said respective periods of execution of said process expires in response to a timer interruption; and
    suspending execution of said process when said allocation time secured for said first of said respective periods of execution of said process expires.

4. A periodic process scheduling method according to claim 2, further comprising the steps of:
    creating a table for registering therein order of processes to which CPU time is allocated by taking a time slot as unit;
    selecting processes so as to allocate time slots to processes in order from processes having a shorter execution period;
    extracting adjacent free time slots in a range of execution period of the selected process group;
    responding to existence of adjacent empty time slots having a size of at least a required CPU time, obtaining, from adjacent empty time slots corresponding to at least the required CPU time and having a minimum size, adjacent empty time slots corresponding to the required CPU time beginning from head thereof, and allocating the obtained adjacent empty time slots to the selected process group; and
    responding to nonexistence of adjacent empty time slots having a size of at least a required CPU time, allocating all time slots belonging to adjacent empty time slots having a maximum size to the selected process group, and allocating a remaining time equivalent to the required CPU time minus the allocated time slots to the said process group by using the previous step and the present step.

5. A periodic process scheduling method of a computer system, said computer system including a plurality of processes, said periodic process scheduling method comprising the steps of:
    receiving requests for periodical execution of processes each with a period of execution and execution time;
    securing an allocation time for a process having shorter period than the other processes to be executed in each of respective periods of execution for said process;
    securing another allocation time for a part of another process within first of said respective periods of execution of said process other than said allocation time in said first of said allocation time for said process if full execution time of said another process cannot be secured within said first of said respective periods of execution of said process;
    starting execution of said process in said secured allocation time and said another process in said secured another allocation time;
    checking whether an allocation time secured for said first of said respective periods of execution of said process expires in response to a timer interruption; and
    suspending execution of said process when said allocation time secured for said first of said respective periods of execution of said process expires.

6. A periodic process scheduling method according to claim 5, further comprising the steps of:
    creating a table for registering therein order of processes to which CPU time is allocated by taking a time slot as unit;
    selecting processes so as to allocate time slots to processes in order from processes having a shorter execution period;
    extracting adjacent free time slots in a range of execution period of the selected process group;
    responding to existence of adjacent empty time slots having a size of at least a required CPU time, obtaining, from adjacent empty time slots corresponding to at least the required CPU time and having a minimum size, adjacent empty time slots corresponding to the required CPU time beginning from head thereof, and allocating the obtained adjacent empty time slots to the selected process group; and
    responding to nonexistence of adjacent empty time slots having a size of at least a required CPU time, allocating all time slots belonging to adjacent empty time slots having a maximum size to the selected process group, and allocating a remaining time equivalent to the required CPU time minus the allocated time slots to the said process group by using the previous step and the present step.

7. A periodic process scheduling program having computer codes to be stored in a storage for running in a computer system, said program comprising the steps of:
receiving requests for periodical execution of processes each with a period of execution and execution time;
securing an allocation time for a process having shorter period than the other processes to be executed in each of respective periods of execution for said process;
securing another allocation time for a part of another process within first of said respective periods of execution of said process other than said allocation time in said first of said allocation time for said process if full execution time of said another process cannot be secured within said first of said respective periods of execution of said process; and
starting execution of said process in said secured allocation time and said another process in said secured another allocation time.

8. A periodic process scheduling program according to claim 7, further comprising the steps of:
checking whether an allocation time secured for said first of said respective periods of execution of said process expires in response to a timer interruption; and
suspending execution of said process when said allocation time secured for said first of said respective periods of execution of said process expires.

* * * * *